(12) United States Patent
Hanzawa et al.

(10) Patent No.: US 10,044,955 B2
(45) Date of Patent: Aug. 7, 2018

(54) SIGNAL PROCESSING DEVICE, CONTROLLING METHOD, IMAGE SENSING DEVICE, AND ELECTRONIC DEVICE

(71) Applicant: SONY CORPORATION, Tokyo (JP)

(72) Inventors: Katsuhiko Hanzawa, Kanagawa (JP); Tsungling Li, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/312,299

(22) PCT Filed: May 14, 2015

(86) PCT No.: PCT/JP2015/063862
§ 371 (c)(1),
(2) Date: Nov. 18, 2016

(87) PCT Pub. No.: WO2015/182390
PCT Pub. Date: Dec. 3, 2015

(65) Prior Publication Data
US 2017/0264841 A1 Sep. 14, 2017

(30) Foreign Application Priority Data
May 26, 2014 (JP) .................................. 2014-107809

(51) Int. Cl.
*H04N 5/365* (2011.01)
*H04N 5/374* (2011.01)
(Continued)

(52) U.S. Cl.
CPC ............. *H04N 5/365* (2013.01); *H04N 5/378* (2013.01); *H04N 5/37455* (2013.01); *H04N 5/37457* (2013.01)

(58) Field of Classification Search
CPC .... H04N 5/365; H04N 5/37457; H04N 5/378; H04N 5/37455; H01L 27/146;
(Continued)

(56) References Cited

U.S. PATENT DOCUMENTS 6,535,247 B1 * 3/2003 Kozlowski ............. H04N 5/363
348/241
6,777,660 B1 * 8/2004 Lee ................... H01L 27/14609
250/208.1
(Continued)

FOREIGN PATENT DOCUMENTS

| JP | 2012-019167 A | 1/2012 |
|---|---|---|
| JP | 2012-114838 A | 6/2012 |
| JP | 2013-055589 A | 3/2013 |

OTHER PUBLICATIONS

International Search Report prepared by the Japan Patent Office dated Jul. 1, 2015, for International Application No. PCT/JP2015/063862.

*Primary Examiner* — Timothy J Henn
(74) *Attorney, Agent, or Firm* — Sheridan Ross P.C.

(57) ABSTRACT

The present technology relates to a signal processing device, a controlling method, an image sensing device, and an electronic device capable of inhibiting deterioration in image quality of a captured image. The signal processing device of the present technology connects an output of a comparing unit which compares a signal read from a unit pixel with reference voltage to a floating diffusion of the unit pixel, thereby feeding back the output of the comparing unit to the floating diffusion as a reset level, and disconnects the output of the comparing unit from the floating diffusion of the unit pixel, thereby allowing the floating diffusion to maintain the reset level. The present technology may be applied to the image sensing device and the electronic device, for example.

19 Claims, 43 Drawing Sheets

(51) Int. Cl.
*H04N 5/378* (2011.01)
*H04N 5/3745* (2011.01)

(58) Field of Classification Search
CPC ......... H01L 27/14601; H01L 27/14609; H01L 27/14612
See application file for complete search history.

(56) References Cited

U.S. PATENT DOCUMENTS

| | | | |
|---|---|---|---|
| 7,277,129 B1 * | 10/2007 | Lee | H04N 5/357 250/208.1 |
| 9,570,486 B2 * | 2/2017 | Ishii | H01L 27/14665 |
| 2004/0169740 A1 * | 9/2004 | Pain | H04N 5/357 348/229.1 |
| 2004/0174754 A1 * | 9/2004 | Lee | H04N 3/15 365/200 |
| 2009/0101798 A1 * | 4/2009 | Yadid-Pecht | H04N 5/3532 250/208.1 |
| 2013/0038760 A1 * | 2/2013 | Blanquart | H04N 5/378 348/241 |
| 2013/0107094 A1 * | 5/2013 | Yamamoto | H01L 27/1461 348/302 |
| 2015/0172573 A1 * | 6/2015 | Wang | H04N 5/363 250/208.1 |
| 2017/0099447 A1 * | 4/2017 | Smith | H04N 5/3559 |

* cited by examiner

SIGNAL PROCESSING DEVICE, CONTROLLING METHOD, IMAGE SENSING DEVICE, AND ELECTRONIC DEVICE

CROSS REFERENCE TO RELATED APPLICATIONS

This application is a national stage application under 35 U.S.C. 371 and claims the benefit of PCT Application No. PCT/JP2015/063862 having an international filing date of 14 May 2015, which is designated the United States, which PCT application claimed the benefit of Japanese Patent Application No. 2014-107809 filed 26 May 2014, the disclosures of which are incorporated herein by reference in their entirety.

TECHNICAL FIELD

The present technology relates to a signal processing device, a controlling method, an image sensing device, and an electronic device, and especially relates to the signal processing device, the controlling method, the image sensing device, and the electronic device capable of inhibiting deterioration in image quality of a captured image.

BACKGROUND ART

Conventionally, in a CMOS image sensor, fixed-pattern noise (FPN) might be generated in a captured image due to variation in threshold among metal-oxide-semiconductor field-effect transistors (MOSFETs) used in circuits of pixel cells.

Recently, methods of inhibiting such variation in the threshold are considered (refer to, for example, Patent Documents 1 to 5 and Non-Patent Document 1). In such methods, voltage of a floating diffusion (FD) is controlled by negative feedback for each pixel such that a pixel output is constant.

CITATION LIST

Patent Document

Patent Document 1: Japanese Patent Application Laid-Open No. 2012-19167
Patent Document 2: Japanese Patent Application Laid-Open No. 2012-19168
Patent Document 3: Japanese Patent Application Laid-Open No. 2012-114838
Patent Document 4: Japanese Patent Application Laid-Open No. 2012-151369
Patent Document 5: Japanese Patent Application Laid-Open No. 10-281870

Non-Patent Document

Non-Patent Document 1: "On-Chip Fixed-Pattern-Noise Canceling by Negative-Feedback Reset for CMOS Image Sensors", Ryo Kagaya, Masayuki Ikebe, Tetsuya Asai, and Yoshihito Amrnemiya, The Journal of The Institute of Image Information and Television Engineers, Vol. 59 (2005), No. 3, Hokkaido university, 2005.

SUMMARY OF THE INVENTION

Problems to be Solved by the Invention

However, the methods only support a structure in which one amplifier is arranged for one pixel column and it is difficult to apply the same to an image sensing device having another configuration.

The present technology is proposed in view of such circumstances and an object thereof is to inhibit deterioration in image quality of a captured image.

Solutions to Problems

One aspect of the present technology is a signal processing device including a connection control unit which controls connection between an output of a comparing unit which compares a signal read from a unit pixel with reference voltage and a floating diffusion of the unit pixel, and a connection unit which connects or disconnects the output of the comparing unit to or from the floating diffusion of the unit pixel according to control of the connection control unit.

The connection unit may include a MOSFET which drives as a switch to connect or disconnect the output of the comparing unit to or from the floating diffusion of the unit pixel on the basis of a control signal supplied from the connection control unit.

The connection unit may connect or disconnect the output of the comparing unit to or from a reset transistor connected to the floating diffusion of the unit pixel according to the control of the connection control unit.

The connection unit may be provided for each column of unit pixels for a pixel array in which a plurality of unit pixels is arranged in a matrix.

A plurality of unit pixel units formed of some unit pixels of the pixel array may be formed in the pixel array, and the connection unit may be provided for each column of the unit pixels for each unit pixel unit.

The connection control unit may control the connection unit to connect the output of the comparing unit to the floating diffusion of the unit pixel, thereby feeding back the output of the comparing unit to the floating diffusion as a reset level, and thereafter control the connection unit to disconnect the output of the comparing unit from the floating diffusion of the unit pixel, thereby allowing the floating diffusion to maintain the reset level.

A reset control unit which controls operation of the reset transistor for each row of the unit pixels is further provided, wherein the reset control unit may connect the reset transistor of a current row of the unit pixels of the pixel array, the connection control unit may thereafter control the connection unit to sequentially connect the output of the comparing unit to the floating diffusion of each column of the unit pixels, thereby sequentially feeding back the output of the comparing unit to the floating diffusion of each column of the unit pixels as the reset level, and thereafter control the connection unit to disconnect the output of the comparing unit from the floating diffusion of the unit pixel, thereby allowing the floating diffusion to maintain the reset level, and the reset control unit may thereafter further disconnect the reset transistor of the current row of the unit pixels of the pixel array.

A signal line connection control unit which controls connection between a signal line which transmits the signal read from the unit pixel and an input of the comparing unit, and a signal line connection unit which connects or disconnects the signal line to or from the input of the comparing unit according to control of the signal line connection control unit may be further provided.

The signal line connection unit may be provided for each column of unit pixels for a pixel array in which a plurality of unit pixels is arranged in a matrix.

When the connection control unit feeds back the output of the comparing unit to the floating diffusion as a reset level, the signal line connection control unit may control the signal line connection unit of the column of the unit pixels to connect the signal line of the column of the unit pixels to the input of the comparing unit.

The comparing unit, and a counter which counts until a comparison result of the comparing unit changes may be further provided.

The comparing unit and the counter may be provided for each of a plurality of unit pixel units formed of some unit pixels of a pixel array formed in the pixel array in which a plurality of unit pixels is arranged in a matrix.

A unit pixel group formed of a plurality of unit pixels may be further provided.

The unit pixel group may form a pixel array in which a plurality of unit pixels is arranged in a matrix, and the connection unit may be provided for each column of the unit pixels for the pixel array.

A plurality of unit pixel units formed of some unit pixels of the pixel array may be formed in the pixel array, and the connection unit may be provided for each column of the unit pixels for each unit pixel unit.

One aspect of the present technology is also a controlling method including connecting an output of a comparing unit which compares a signal read from a unit pixel with reference voltage to a floating diffusion of the unit pixel, thereby feeding back the output of the comparing unit to the floating diffusion as a reset level, and disconnecting the output of the comparing unit from the floating diffusion of the unit pixel, thereby allowing the floating diffusion to maintain the reset level.

Another aspect of the present technology is an image sensing device including a pixel array in which a plurality of unit pixels is arranged in a matrix, a connection control unit which controls connection between an output of a comparing unit which compares a signal read from the unit pixel with reference voltage and a floating diffusion of the unit pixel, and a connection unit provided for each column of the unit pixels for the pixel array which connects or disconnects the output of the comparing unit to or from the floating diffusion of the unit pixel according to control of the connection control unit.

The comparing unit, and a counter which counts until a comparison result of the comparing unit changes are further provided, wherein a plurality of unit pixel units formed of some unit pixels of the pixel array may be formed in the pixel array, the comparing unit and the counter may be provided for each unit pixel unit, and the connection unit may be provided for each column of the unit pixels for each unit pixel unit.

A plurality of semiconductor substrates is included, wherein the connection control unit, the connection unit, the comparing unit, and the counter may be formed on a semiconductor substrate different from the semiconductor substrate on which the pixel array is formed.

A still another aspect of the present technology is an electronic device including an imaging unit which captures an image of a subject, and an image processor which performs image processing of image data obtained by imaging by the imaging unit, the imaging unit including a pixel array in which a plurality of unit pixels is arranged in a matrix, a connection control unit which controls connection between an output of a comparing unit which compares a signal read from the unit pixel with reference voltage and a floating diffusion of the unit pixel, and a connection unit provided for each column of the unit pixels for the pixel array which connects or disconnects the output of the comparing unit to or from the floating diffusion of the unit pixel according to control of the connection control unit.

In one aspect of the present technology, the output of the comparing unit which compares the signal read from the unit pixel with the reference voltage is connected to the floating diffusion of the unit pixel, so that the output of the comparing unit is fed back to the floating diffusion as the reset level, and the output of the comparing unit is disconnected from the floating diffusion of the unit pixel, so that the floating diffusion maintains the reset level.

In another aspect of the present technology, in the image sensing device provided with the pixel array in which a plurality of unit pixels is arranged in a matrix, the output of the comparing unit which compares the signal read from the unit pixel with the reference voltage is connected to the floating diffusion of a desired unit pixel of the pixel array, so that the output of the comparing unit is fed back to the floating diffusion of the unit pixel as the reset level, and the output of the comparing unit is disconnected from the floating diffusion of the desired unit pixel of the pixel array, so that the reset level is maintained in the floating diffusion of the unit pixel.

In still another aspect of the present technology, in the image sensing device provided with the pixel array in which a plurality of unit pixels is arranged in a matrix of the electronic device, the output of the comparing unit which compares the signal read from the unit pixel with the reference voltage is connected to the floating diffusion of a desired unit pixel of the pixel array, so that the output of the comparing unit is fed back to the floating diffusion of the unit pixel as the reset level, and the output of the comparing unit is disconnected from the floating diffusion of the desired unit pixel of the pixel array, so that the reset level is maintained in the floating diffusion of the unit pixel, an image of a subject is captured, and obtained image data is subjected to image processing.

Effects of the Invention

According to the present technology, it is possible to obtain a captured image. Also, according to the present technology, deterioration in image quality of the captured image may be inhibited.

MODE FOR CARRYING OUT THE INVENTION

Figure 1:
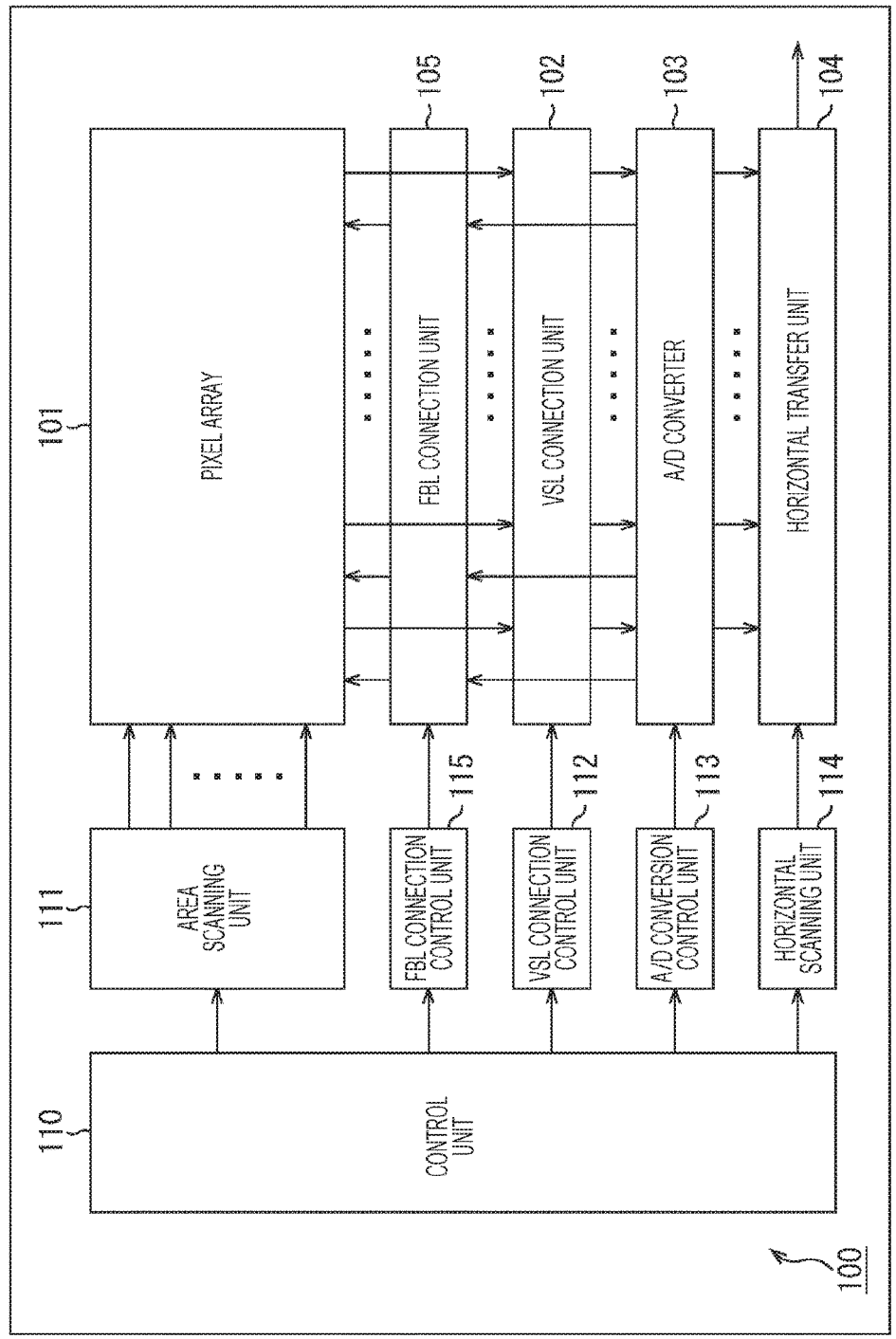
FIG. 1 is a view illustrating a principal configuration example of an image sensor.

Modes for carrying out the present disclosure (hereinafter, referred to as embodiments) are hereinafter described. Meanwhile, the description is given in the following order.
 1. First Embodiment (Image Sensor)
 2. Second Embodiment (Imaging Device)

1. First Embodiment

<Variation in Threshold Among MOSFETs>

Conventionally, in a CMOS image sensor, fixed-pattern noise (FPN) might be generated in a captured image due to variation in threshold (threshold Vth) of an amplification transistor to be described later) among metal-oxide-semiconductor field-effect transistors (MOSFETs) used in circuits of pixel cells.

Then, methods of inhibiting such variation in the threshold are considered as disclosed in Patent Documents 1 to 5 and Non-Patent Document 1, for example. In such methods, voltage of a floating diffusion (FD) is controlled by negative feedback for each pixel such that a pixel output is constant.

However, the methods only support a structure in which one amplifier is arranged for one pixel column and it is difficult to apply the same to an image sensing device having another configuration. For example, in a case of the image sensor using an area A/D converter obtained by arranging one amplifier for a plurality of pixel columns sharing a reset control signal, it is required to feed back an amplifier output to the floating diffusions (FDs) of all the pixel columns before reading a signal from the pixel; however, the floating diffusion of each pixel column cannot maintain the amplifier output which is fed back by the methods disclosed in the above-described documents, so that application thereof is difficult.

Controlling drive of a reset transistor in one pixel unit, for example, makes it possible to apply the methods disclosed in the above-described documents to the image sensor using such area A/D converter. In this case, it is required that the reset control signal may be independently supplied to each pixel in a so-called "XY address" system. That is to say, it is required to prepare an independent signal line for transmitting the reset control signal (reset control line) for each pixel or arrange the reset control lines in X and Y two directions and prepare reset transistors for the reset control lines in respective directions. Therefore, a pixel configuration and the number of wires might be increased and a cost might be increased.

<Feedback Connection Control>

Therefore, a connection control unit which controls connection between an output of a comparing unit which compares the signal read from a unit pixel with reference voltage and the floating diffusion (FD) of the unit pixel, and a connection unit which connects or disconnects the output of the comparing unit to and from the floating diffusion (FD) of the unit pixel according to control of the connection control unit are provided.

Then, the connection control unit may control the connection unit to connect the output of the comparing unit which compares the signal read from the unit pixel with the reference voltage to the floating diffusion (FD) of the unit pixel, thereby feeding back the output of the comparing unit to the floating diffusion (FD) as a reset level and disconnect the output of the comparing unit from the floating diffusion (FD) of the unit pixel, thereby allowing the floating diffusion (FD) to maintain the reset level.

In such a configuration, by disconnecting the connection unit, it is possible to allow the floating diffusion of the unit pixel to maintain a signal level. That is to say, it is possible to allow the same to maintain the amplifier output which is fed back to each unit pixel. Therefore, it is possible to inhibit the variation in the threshold of the MOSFET among the pixels even with the image sensor using the area A/D converter obtained by arranging one amplifier for a plurality of pixel columns sharing the reset control signal. That is to say, it is possible to inhibit deterioration in image quality of the captured image.

Meanwhile, the connection unit may include the MOSFET driving as a switch to connect or disconnect the output of the comparing unit to or from the floating diffusion (FD) of the unit pixel on the basis of the control signal supplied from the connection control unit. In this manner, the connection unit may be realized with a small number of elements and an increase in circuit scale may be inhibited.

The connection unit may also connect or disconnect the output of the comparing unit to or from the reset transistor connected to the floating diffusion (FD) of the unit pixel according to the control of the connection control unit. That is to say, it is possible to feed back the output of the comparing unit as the reset level of the floating diffusion (FD).

The connection unit may also be provided for each column of the unit pixels for a pixel array in which a plurality of unit pixels is arranged in a matrix. In such a configuration, it is possible to allow the floating diffusion (FD) of each of the unit pixels of each column to maintain the amplifier output (reset level) also in a case in which the reset control line is provided for each row of the unit pixels. Therefore, it is possible to inhibit the deterioration in image quality of the captured image also when the amplifier is shared by a plurality of columns of the unit pixels.

Of course, when a plurality of unit pixel units formed of some unit pixels of the pixel array is formed in the pixel array, the connection unit may be provided for each column of the unit pixels for each unit pixel unit. That is to say, even in a case in which the amplifier is provided for each unit pixel unit, it is possible to inhibit the deterioration in image quality of the captured image.

Also, the connection control unit may control the connection unit to connect the output of the comparing unit to the floating diffusion (FD) of the unit pixel, thereby feeding back the output of the comparing unit to the floating diffusion (FD) as the reset level, and thereafter control the connection unit to disconnect the output of the comparing unit from the floating diffusion (FD) of the unit pixel, thereby allowing the floating diffusion to maintain the reset level.

Furthermore, a reset control unit which controls operation of the reset transistor for each row of the unit pixels may be further provided. Then, it is possible that the reset control unit connects the reset transistor of a current row of the unit pixels of the pixel array, the connection control unit thereafter controls the connection unit to sequentially connect the output of the comparing unit to the floating diffusion (FD) of each column of the unit pixels, thereby sequentially feeding back the output of the comparing unit to the floating diffusion (FD) of each column of the unit pixels as the reset level and thereafter controls the connection unit to disconnect the output of the comparing unit from the floating diffusion (FD) of the unit pixel, thereby allowing the floating diffusion (FD) to maintain the reset level, and the reset control unit thereafter further disconnects the reset transistor of the current row of the unit pixels of the pixel array.

Meanwhile, a signal line which transmits the signal read from the unit pixel, a signal line connection control unit which controls connection to an input of the comparing unit, and a signal line connection unit which connects or disconnects the signal line to or from the input of the comparing unit according to control of the signal line connection control unit may further be provided.

Then, the signal line connection unit may be provided for each column of the unit pixels for the pixel array in which a plurality of unit pixels is arranged in a matrix.

Also, when the connection control unit feeds back the output of the comparing unit to the floating diffusion (FD) as the reset level, the signal line connection control unit may control the signal line connection unit of the column of the unit pixels to connect the signal line of the column of the unit pixels to the input of the comparing unit.

Also, the above-described comparing unit and a counter which counts until a comparison result of the comparing unit changes may further be provided. That is to say, the A/D converter which performs A/D conversion of the signal read from the pixel may further be provided.

Then, it is possible that the comparing unit and the counter (that is to say, the A/D converter) are provided for each of a plurality of unit pixel units formed of some unit pixels of the pixel array formed in the pixel array in which a plurality of unit pixels is arranged in a matrix. That is to say, a so-called area A/D converter may be provided.

It is also possible that a unit pixel group formed of a plurality of unit pixels is further provided.

It is possible that the unit pixel group forms the pixel array in which a plurality of unit pixels is arranged in a matrix and the connection unit is provided for each column of the unit pixels for the pixel array.

In the pixel array, it is also possible that a plurality of unit pixel units formed of some unit pixels of the pixel array is formed and the connection unit is provided for each column of the unit pixels for each unit pixel unit.

<Image Sensor>

A principal configuration example of the image sensor being one embodiment of the image sensing device to which such present technology is applied is illustrated in FIG. 1. An image sensor 100 illustrated in FIG. 1 is a device which performs photoelectric conversion of light from a subject to output as image data. For example, the image sensor 100 is configured as a CMOS image sensor in which a complementary metal oxide semiconductor (CMOS) is used, a CCD image sensor in which a charge coupled device (CCD) is used and the like.

As illustrated in FIG. 1, the image sensor 100 includes a pixel array 101, a VSL connection unit 102, an A/D converter 103, a horizontal transfer unit 104, a FBL connection unit 105, a control unit 110, an area scanning unit 111, a VSL connection control unit 112, an A/D conversion control unit 113, a horizontal scanning unit 114, and a FBL connection control unit 115.

The pixel array 101 is a pixel area in which pixel configurations (unit pixels 111) each having a photoelectric conversion element such as a photo diode are arranged in a planer manner or a curved manner.

The VSL connection unit 102 is controlled by the VSL connection control unit 112 to connect or disconnect a vertical signal line (VSL) which transmits the signal read from each unit pixel of the pixel array 101 to or from the A/D converter 103.

The A/D) converter 103 is controlled by the A/D conversion control unit 113 to perform the A/D conversion of an analog signal read from each unit pixel of the pixel array 101 to be transmitted through the vertical signal line (VSL) and outputs digital data thereof to the horizontal transfer unit 104.

The horizontal transfer unit 104 is controlled by the horizontal scanning unit 114 to transfer the digital data supplied from the A/D converter 103 and output the same to a processor on a subsequent stage or out of the image sensor 100, for example.

The FBL connection unit 105 is controlled by the FBL connection control unit 115 to connect or disconnect the output of the amplifier (comparing unit to be described later) of the A/D converter 103 to or from the floating diffusion (FD) of the unit pixel of the pixel array 101.

The control unit 110 controls the area scanning unit 111 to the FBL connection control unit 115 to control operation of an entire image sensor 100 (operation of each unit)

The area scanning unit 111 is controlled by the control unit 110 to control operation of a transistor of each unit pixel of the pixel array 101. The VSL connection control unit 112 is controlled by the control unit 110 to control operation of each unit forming the VSL connection unit 102. The A/D conversion control unit 113 is controlled by the control unit 110 to control operation of each unit forming the A/D converter 103. The horizontal scanning unit 114 is controlled by the control unit 110 to control operation of each unit forming the horizontal transfer unit 104. The FBL connection control unit 115 is controlled by the control unit 110 to control operation of each unit forming the FBL connection unit 105.

<Pixel Array>

Figure 2:
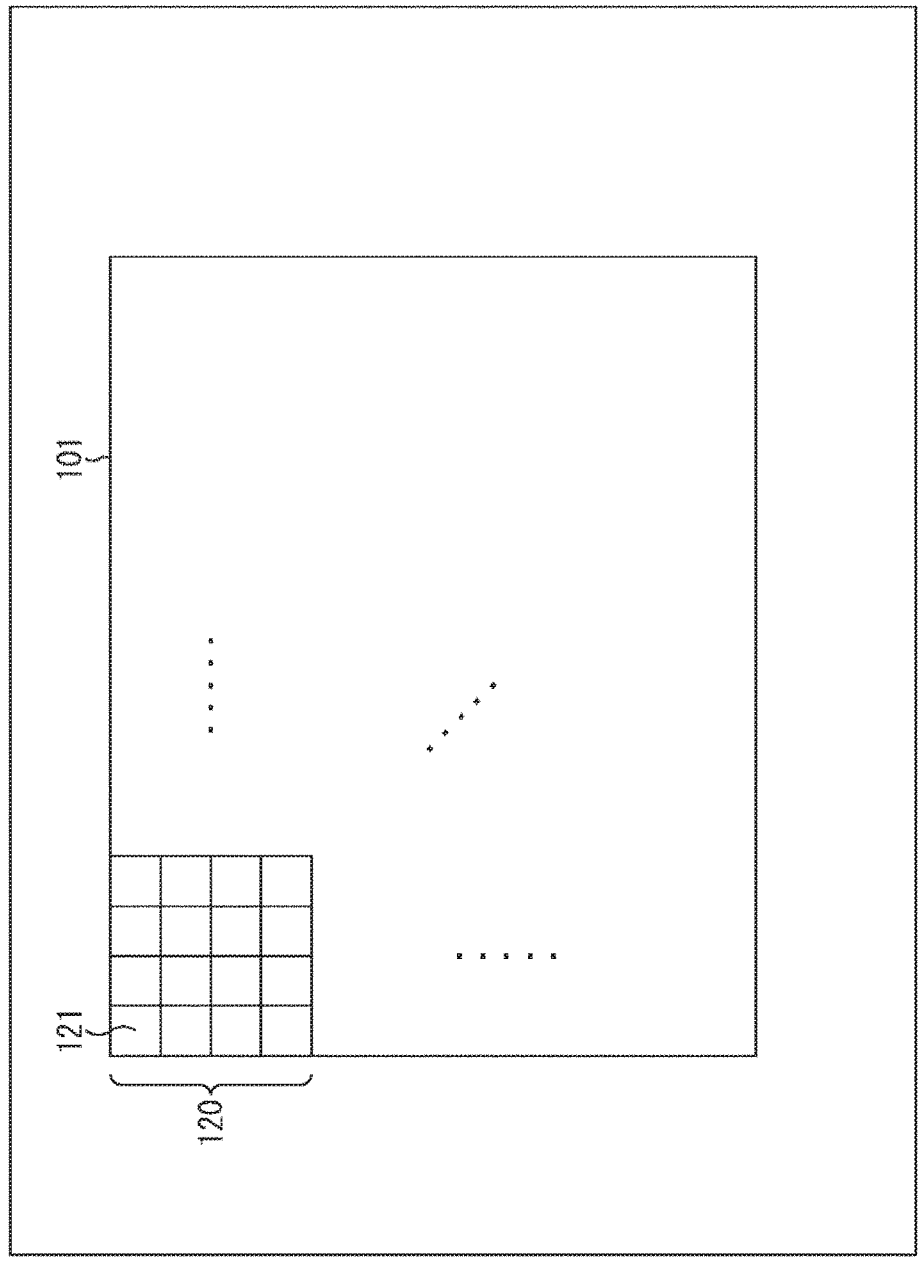
FIG. 2 is a view illustrating an example of a pixel unit.

A configuration example of the pixel array 101 is illustrated in FIG. 2. As illustrated in FIG. 2, the pixel array 101 is the area in which the pixel configurations (unit pixels 121) each having the photoelectric conversion element such as the photo diode are arranged in array. In the drawing, the unit pixels 121 in a horizontal direction and in a vertical direction form a row and a column, respectively.

Each unit pixel 121 receives the light from the subject, performs the photoelectric conversion of incident light to accumulate an electric charge, and outputs the electric charge as a pixel signal at predetermined timing.

Also, as illustrated in FIG. 2, a plurality of pixel units 120 each of which is formed of a plurality of unit pixels 121 is formed in the pixel array 101. That is to say, the pixel unit 120 is the unit pixel group included in a partial area obtained by dividing the pixel area formed of the pixel array 101 into a plurality of parts. A size of the pixel, unit 120 (the number of unit pixels 121 included in the pixel unit 120) and a shape thereof are arbitrary. Meanwhile, the sizes (the number of unit pixels 121) of the pixel units 120 and the shapes thereof may differ.

For example, although the pixel unit 120 is formed of the unit pixels 121 of four rows by four columns (4×4) in a case in FIG. 2, this may also be formed of 1×8, 2×2, 2×4, 4×2, 4×8, 8×4, 8×8, 8×1, and 16×16 unit pixels 121. Of course, the size of the pixel unit 120 is not limited to this example. Also, although only one pixel unit 120 is illustrated in FIG. 2, the pixel units 120 are actually formed in an entire pixel array 101. That is to say, each unit pixel 121 belongs to any pixel unit 120.

Also, although the unit pixels 121 are illustrated as squares of the same size in FIG. 2, the size and the shape of each unit pixel 121 is arbitrary; this is not necessarily a square and the size and the shape thereof may differ.

<Unit Pixel Configuration>

Figure 3:
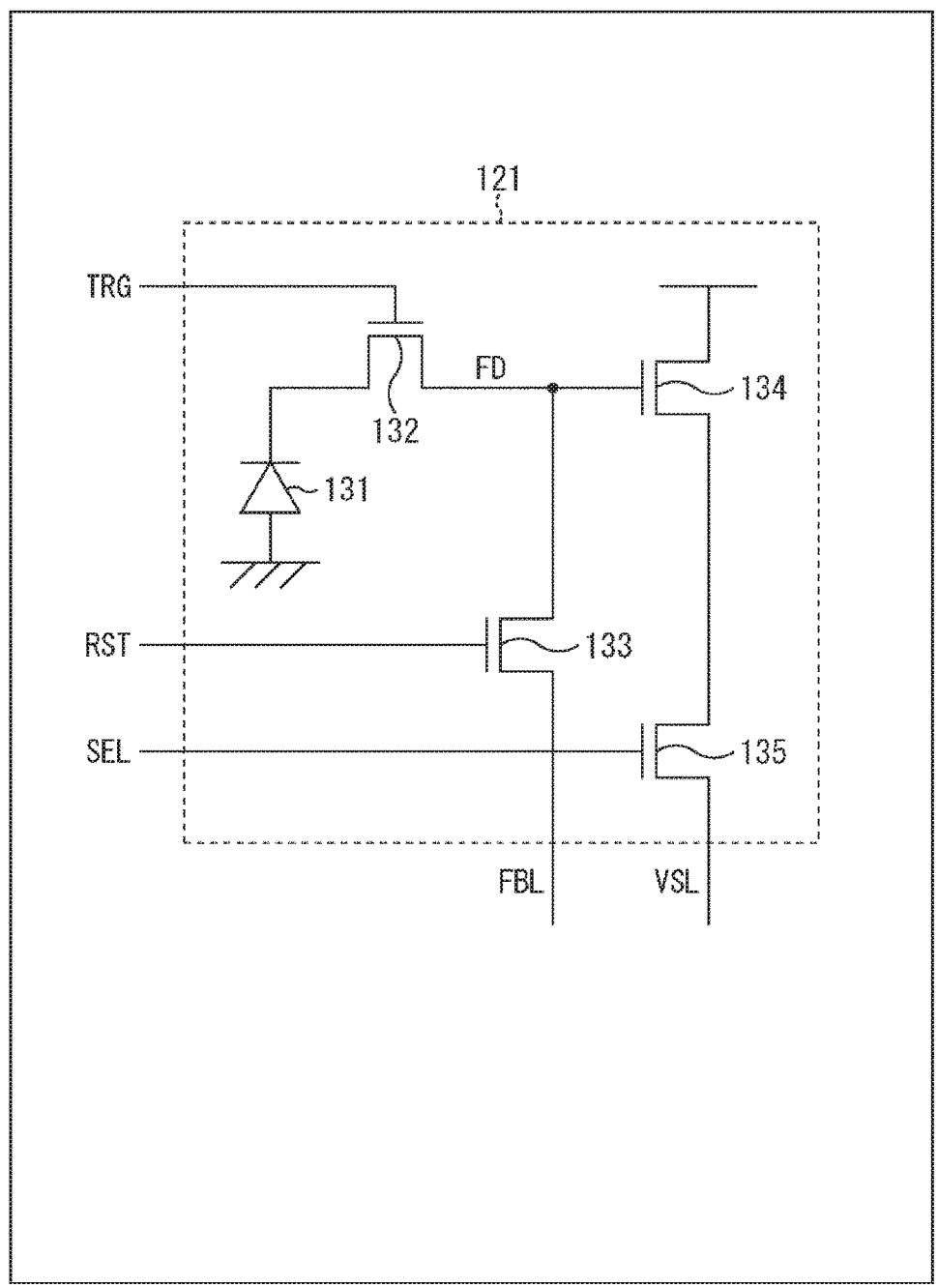
FIG. 3 is a view illustrating a principal configuration example of a unit pixel.

FIG. 3 is a view illustrating an example of a principal configuration of a circuit configuration of the unit pixel 121. In a case of the example illustrated in FIG. 3, the unit pixel 121 includes a photo diode (PD) 131, a transfer transistor 132, a reset transistor 133, an amplification transistor 134, and a select transistor 135.

The photo diode (PD) 131 performs the photoelectric conversion of the received light to obtain a photocharge (herein, a photoelectron) having a charge amount according to a light amount thereof to accumulate the photocharge. An anode electrode of the photo diode (PD) 131 is connected to a ground of the pixel area (pixel ground) and a cathode electrode thereof is connected to the floating diffusion (FD) through the transfer transistor 132. Of course, a method may be such that the cathode electrode of the photo diode (PD) 131 is connected to a power source of the pixel area (pixel power source), the anode electrode thereof is connected to the floating diffusion (FD) through the transfer transistor 132, and the photocharge is read as a photo positive hole.

The transfer transistor 132 controls reading of the photocharge from the photo diode (PD) 131. The transfer transistor 132 includes a drain electrode connected to the floating diffusion and a source electrode connected to the cathode electrode of the photo diode (PD) 131. Also, a transfer control line (TRG) which transmits a transfer control signal supplied from the area scanning unit 111 (FIG. 1) is connected to a gate electrode of the transfer transistor 132. When the transfer control line (TRG) (that is to say, gate potential of the transfer transistor 132) is in an off-state, the photocharge is not transferred from the photo diode (PD) 131 (the photocharge is accumulated in the photo diode (PD) 131). When the transfer control line (TRG) (that is to say, the gate potential of the transfer transistor 132) is in an on-state, the photocharge accumulated in the photo diode (PD) 131 is transferred to the floating diffusion (FD).

The reset transistor 133 resets potential of the floating diffusion (FD). The reset transistor 133 includes a source electrode connected to the floating diffusion (FD). Also, the reset control line (RST) which transmits the reset control signal supplied from the area scanning unit 111 (FIG. 1) is connected to a gate electrode of the reset transistor 133. Then, a feedback signal line (FBL) which transmits an output signal of the amplifier (comparing unit) which forms the A/D converter 103 through the FBL connection unit 105 is connected to a drain electrode of the reset transistor 133. When the reset control signal (RST) (that is to say, gate potential of the reset transistor 133) is in an off-state, the floating diffusion (FD) is disconnected from the feedback signal line (FBL). That is to say, the amplifier output (the output of the comparing unit) of the A/D converter 103 is not fed back to the floating diffusion (FD). When the reset control signal (RST) 130 (that is to say, the gate potential of the reset transistor 133) is in an on-state, the amplifier output (the output of the comparing unit) of the A/D converter 103 may be supplied to the floating diffusion (FD) and the floating diffusion (FD) may be reset by using the amplifier output (potential).

The amplification transistor 134 amplifies change in potential of the floating diffusion (FD) to output as an electric signal (analog signal) The amplification transistor 134 includes a gate electrode connected to the floating diffusion (FD), a drain electrode connected to source follower power source voltage, and a source electrode connected to a drain electrode of the select transistor 135. For example, the amplification transistor 134 outputs the potential of the floating diffusion (FD) reset by the reset transistor 133 to the select transistor 135 as a reset signal (reset level). The amplification transistor 134 also outputs the potential of the floating diffusion (FD) to which the photocharge is transferred by the transfer transistor 132 to the select transistor 135 as a light accumulation signal (signal level)

The select transistor 135 controls the output of the electric signal supplied from the amplification transistor 134 to the vertical signal line VSL (that is to say, the A/D converter 103). The select transistor 135 includes the drain electrode connected to the source electrode of the amplification transistor 134 and a source electrode connected to the vertical signal line VSL. Also, a select control line (SEL) which transmits a select control signal supplied from the area scanning unit 111 (FIG. 1) is connected to a gate electrode of the select transistor 135. When the select control signal (SEL) (that is to say, gate potential of the select transistor 135) is in an off-state, the amplification transistor 134 is electrically disconnected from the vertical signal line VSL. Therefore, in this state, the reset signal, the pixel signal and the like are not output from the unit pixel 121. When the select control signal (SEL) (that is to say, the gate potential of the select transistor 135) is in an on-state, the unit pixel 121 is put into a selected state. That is to say, the amplification transistor 134 is electrically connected to the vertical signal line VSL and the signal output from the amplification transistor 134 is supplied to the vertical signal line VSL as the pixel signal of the unit pixel 121. That is to say, the reset signal, the pixel signal and the like are read from the unit pixel 121.

<VSL Connection Unit, A/D Converter, and FBL Connection Unit>

Figure 4:
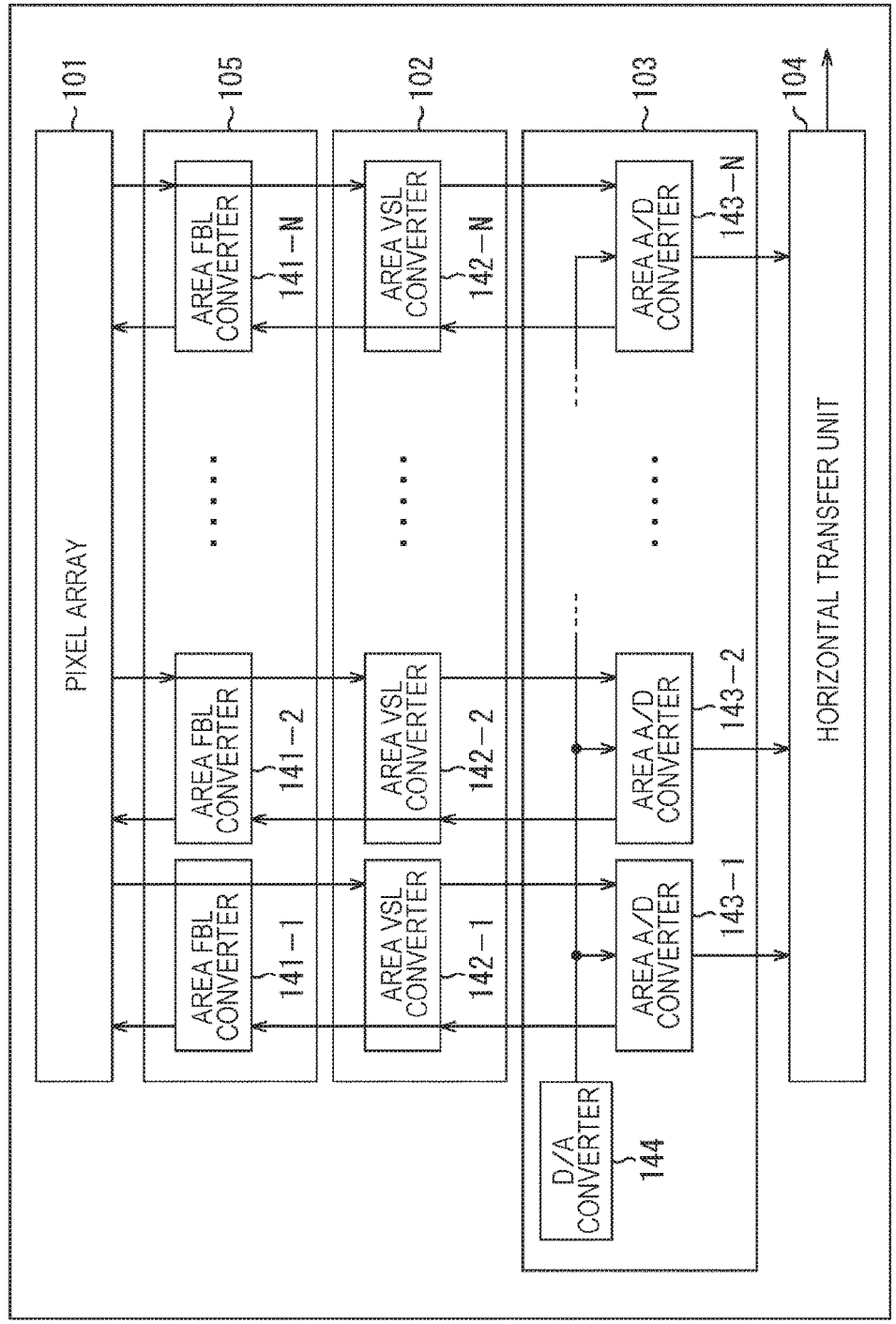
FIG. 4 is a view illustrating a principal configuration example of each unit of the image sensor.

FIG. 4 is a block diagram illustrating a principal configuration example of the VSL connection unit 102, the A/D converter 103, and the FBL connection unit 105. Meanwhile, it is hereinafter described supposing that N (N is arbitrary natural number) pixel units 120 are formed in the pixel array 101.

As illustrated in FIG. 4, the VSL connection unit 102 includes area VSL connection units 142-1 to 142-N. When it is not necessary to distinguish to describe the area VSL connection units 142-1 to 142-N, they are referred to as the area VSL connection units 142.

Similarly, the A/D converter 103 includes area A/D converters 143-1 to 143-N. When it is not necessary to distinguish to describe the area A/D converters 143-1 to 143-N, they are referred to as the area A/D converters 143. Meanwhile, the A/D converter 103 further includes a D/A converter (DAC) 144 which generates a ramp wave as reference voltage. The D/A converter (DAC) 144 supplies the generated ramp wave to each area A/D converter 143 as the reference voltage.

Also, similarly, the FBL connection unit 105 includes area FBL connection units 141-1 to 141-N. When it is not necessary to distinguish to describe the area FBL connection units 141-1 to 141-N, they are referred to as the area FBL connection units 141.

The area VSL connection units 142-1 to 142-N, the area A/D converters 143-1 to 143-N, and the area FBL connection units 141-1 to 141-N are associated with different pixel units 120 (pixel units 120-1 to 120-N) of the pixel array 101, respectively, and perform processes for the pixel units 120 to which they correspond.

That is to say, the vertical signal line (VSL) of each pixel unit 120 of the pixel array is connected to the area A/D converter 143 to which this corresponds through the area VSL connection unit 142 to which this corresponds. Also, the feedback signal line (FBL) of each area A/D converter 143 is connected to the pixel unit 120 to which this corresponds through the area FBL connection unit 141 to which this corresponds.

Each area FBL connection unit 141 connects or disconnects the feedback line (FBL) which transmits the output of the amplifier (comparing unit to be described later) included in the area A/D converter 143 to which this corresponds to or from the floating diffusion (FD) of the unit pixel 121 of the pixel unit 120 to which this corresponds of the pixel array 101 according to control of the FBL connection control unit 115 (FIG. 1).

Each area VSL connection unit 142 connects or disconnects the vertical signal line (VSL) of the unit pixel 121 of the pixel unit 120 to which this corresponds of the pixel array 101 to or from the area A/D converter 143 to which this corresponds according to control of the VSL connection control unit 112 (FIG. 1)

Each area A/D converter 143 compares the signal level of the signal read from the unit pixel 121 of the pixel unit 120 to which this corresponds transmitted through the vertical signal line (VSL) with the ramp wave (reference voltage) supplied from the D/A converter (DAC) 144 according to control of the A/D conversion control unit 113 (FIG. 1) Each area A/D converter 143 supplies the comparison result to the horizontal transfer unit 104 as the digital data. Also, each area A/D converter 143 supplies the comparison result to the floating diffusion (FD) of the unit pixel 121 of the pixel unit 120 to which this corresponds through the area FBL connection unit 141-1 to which this corresponds.

For example, the area FBL connection unit 141-1, the area VSL connection unit 142-1, and the area A/D converter 143-1 perform the processes for the pixel unit 120-1 (not illustrated). Also, for example, the area FBL connection unit 141-2, the area VSL connection unit 142-2, and the area A/D converter 143-2 perform the processes for the pixel unit 120-2 (not illustrated). Similarly, for example, the area FBL connection unit 141-N, the area VSL connection unit 142-N, and the area A/D converter 143-N perform the processes for the pixel unit 120-N (not illustrated).

As described above, the pixel array 101 and a reading circuit thereof are configured for each pixel unit 120 and the processes are performed in parallel for the respective pixel units 120.

<Substrate Configuration>

Figure 5:
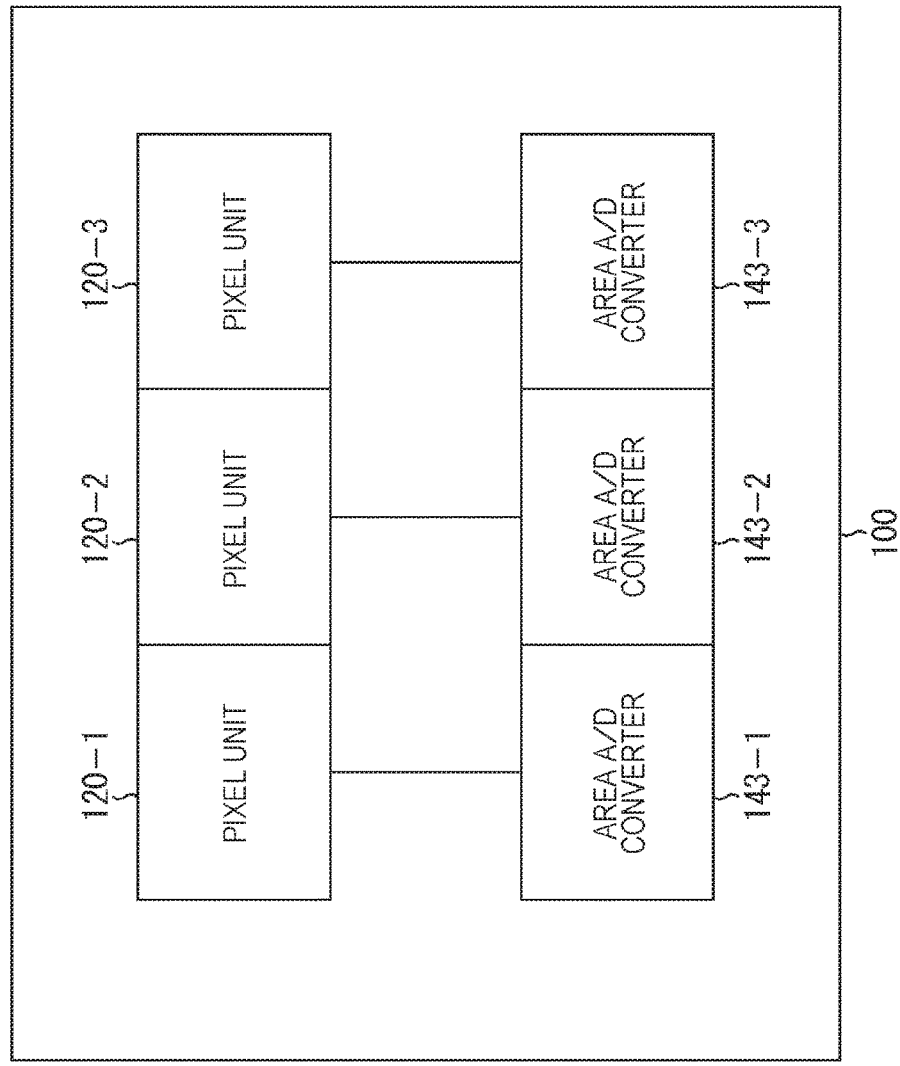
FIG. 5 is a view illustrating a principal configuration example of the image sensor.

The configuration of the image sensor 100 illustrated in FIG. 1 may also be formed on a single semiconductor substrate as illustrated in FIG. 5, for example. That is to say, the reading circuit such as the A/D converter 103 may be formed on the same semiconductor substrate as that of the pixel array 101 (that is to say, a configuration of the pixel area). Meanwhile, although other configurations illustrated in FIG. 1 such as the VSL connection unit 102 and the FBL connection unit 105 are not illustrated in FIG. 5, they actually are formed also on the same semiconductor substrate. Of course, the configuration other than that illustrated in FIG. 1 may be formed on the same semiconductor substrate.

Figure 6:
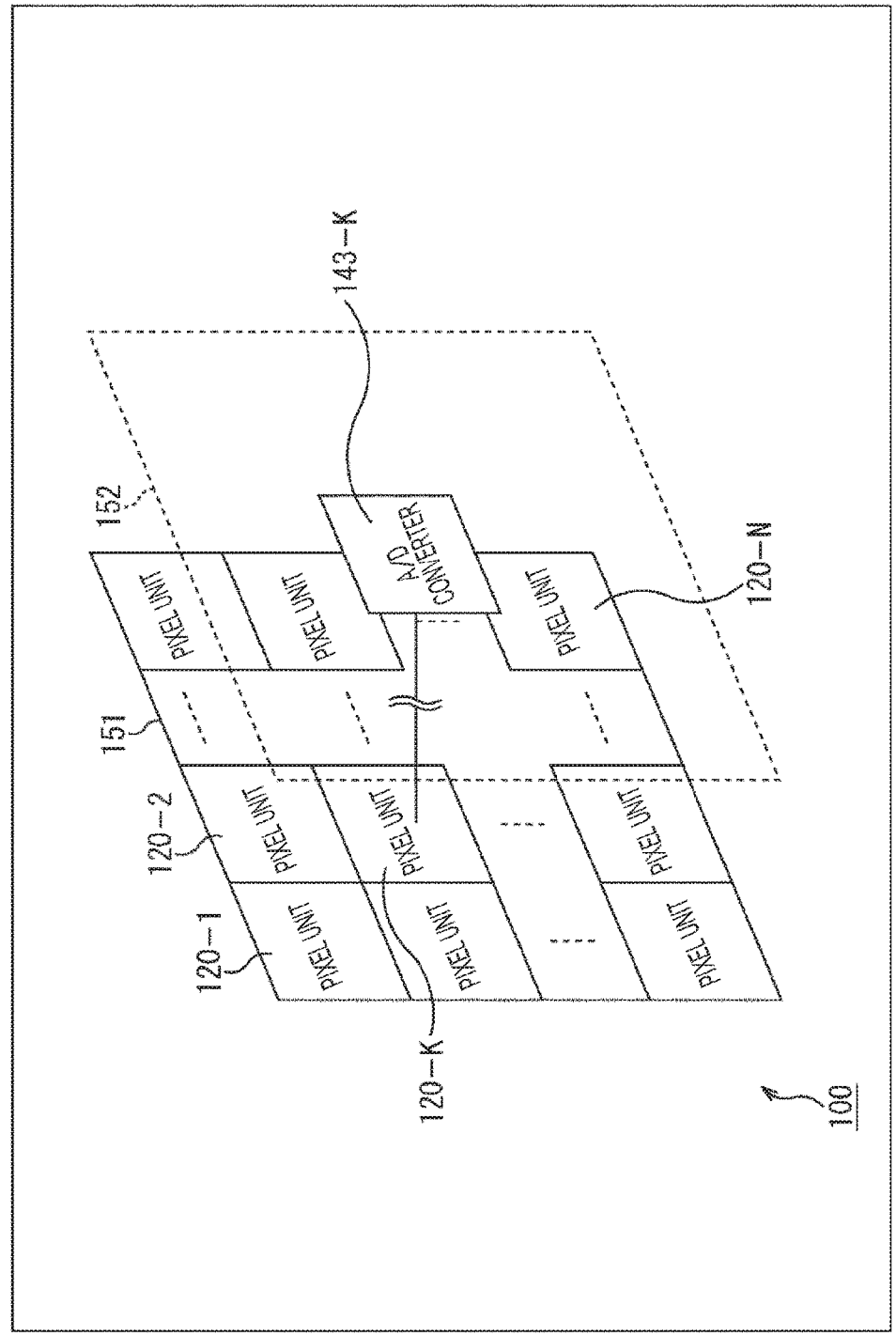
FIG. 6 is a view illustrating a principal configuration example of the image sensor.

The circuit configuration of the image sensor 100 may also be formed on two semiconductor substrates superimposed on each other (a multi-layer chip (a pixel substrate 151 and a circuit substrate 152)) as illustrated in FIG. 6, for example.

That is to say, the configuration of the image sensor 100 illustrated in FIG. 1 may be formed on a plurality of semiconductor substrates. For example, it is possible that the image sensor 100 includes the two semiconductor substrates superimposed on each other (the multi-layer chip (the pixel substrate 151 and the circuit substrate 152)) as illustrated in FIG. 6, for example, and the circuit configuration illustrated in FIG. 1 is formed on the semiconductor substrates.

For example, it is possible that the pixel area (that is to say, the pixel array 101) is formed on the pixel substrate 151 and the reading circuit such as the A/D converter 103 is formed on the circuit substrate 152. In a case of the example in FIG. 6, N pixel units 120 (the pixel units 120-1 to 120-N) are formed. The area A/D converter 143 corresponding to each pixel unit 120 is formed on the circuit substrate 152. Meanwhile, although other configurations illustrated FIG. 1 such as the VSL connection unit 102 and the FBL connection unit 105 is not illustrated in FIG. 6, they also are actually formed on the pixel substrate 151 or the circuit substrate 152. Although the configurations may be formed on any of the pixel substrate 151 and the circuit substrate 152, it is possible to form a wider pixel area (pixel array 101) on the pixel substrate 151 by forming as many configurations as possible on the circuit substrate 152. According to this, sensitivity of the pixel may be improved.

That is to say, for example, the FBL connection control unit 115, the FBL connection unit 105, and a comparing unit 171 and a counter 172 to be described later may be formed on the circuit substrate 152 different from the pixel substrate 151 on which the pixel array 101 is formed.

Also, the pixel substrate 151 and the circuit substrate 152 may have different sizes and different shapes; there may be a portion in which they are not superimposed on each other. However, it is possible to further shorten wiring distance by arranging the pixel unit 120 and the reading circuit such as the area A/D converter 143 corresponding to the same as close as possible to each other. According to this, a layout of the wiring and the element becomes easier. Also, an increase in cost may be further inhibited.

Also, it is possible to control the number of connection (micro bump, TSV and the like) between the substrates to one or a small number by providing the A/D converter (the area A/D converter 143) for each pixel unit 120 formed of a plurality of pixel rows and columns of the unit pixels 121 as in the example in FIG. 6. Therefore, it is not required that an area required for the connection matches a pixel pitch and improvement in yield may be expected because of the small number of connections.

Meanwhile, the number (number of layers) of the semiconductor substrates (multi-layer chip) is arbitrary; this may be three or larger. In this case, the FBL connection unit 105 may be formed on the semiconductor substrate different from that of the pixel array 101 to the horizontal transfer unit 104. The FBL connection control unit 115 may also be formed on the same semiconductor substrate as that of the FBL connection unit 105. The VSL connection unit 102 and the VSL connection control unit 112 may also be formed on the same semiconductor substrate as that of the FBL connection unit 105. The A/D converter 103 and the A/D conversion control unit 113 may also be formed on the same semiconductor substrate as that of the FBL connection unit 105. Furthermore, the horizontal transfer unit 104 and the horizontal scanning unit 114 may also be formed on the same semiconductor substrate as that of the FBL connection unit 105. The pixel array 101 and the area scanning unit 111 may also be formed on the same semiconductor substrate as that of the FBL connection unit 105. The control unit 110 may also be formed on the same semiconductor substrate as that of the FBL connection unit 105.

That is to say, the FBL connection unit 105 may be formed on the same semiconductor substrate as that of any of the other configurations illustrated in FIG. 1 or formed on the semiconductor substrate different from this.

<Pixel Unit Configuration>

Figure 7:
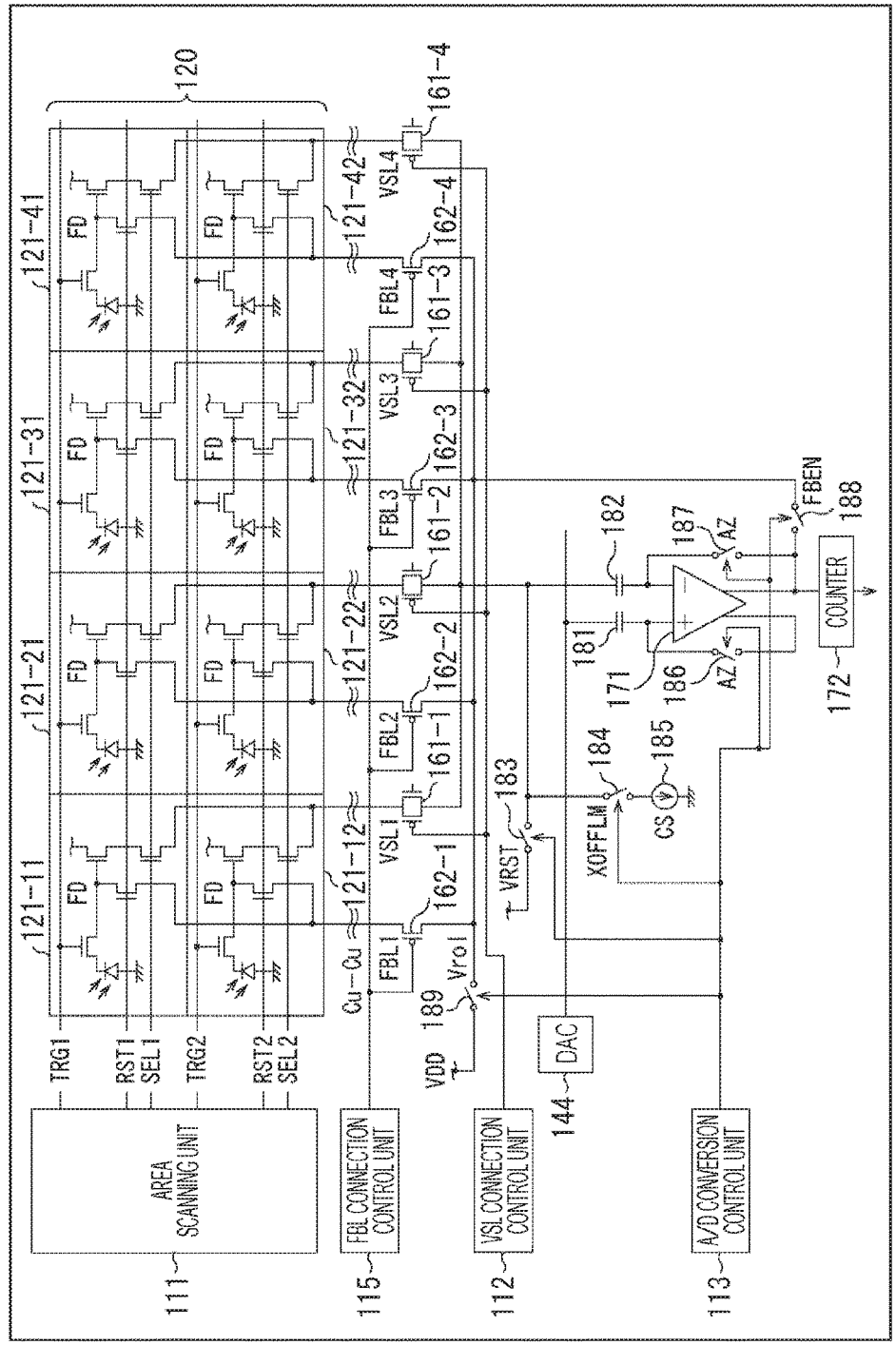
FIG. 7 is a view illustrating a principal configuration example for one pixel unit.

FIG. 7 is a view illustrating an example of the configuration of the pixel array 101 for one pixel unit and the configuration of the reading circuit corresponding to the pixel unit 120.

In the example in FIG. 7, the pixel unit 120 is formed of the unit pixels 121 of two rows by four columns (unit pixels 121-11, 121-21, 121-31, 121-41, 121-12, 121-22, 121-32, and 121-42). As described above, the number of unit pixels of the pixel unit 120 is arbitrary; however, it is hereinafter described by using this example.

Each unit pixel 121 has the configuration as in the example described with reference to FIG. 3. The area scanning unit 111 and each unit pixel 121 are connected to each other through the transfer control line (TRG), the reset control line (RST), and the select control line (SEL). The control lines are arranged for each row of the unit pixels. For example, the unit pixels 121-11 to 121-41 are connected to a transfer control line (TRG), a reset control line (RST1), and a select control line (SEL1). Also, for example, the unit pixels 121-12 to 121-42 are connected to a transfer control line (TRG2), a reset control line (RST2), and a select control line (SEL2).

The area scanning unit 111 supplies a transfer control signal (TRG1) to the gate electrodes of the transfer transistors 132 of the unit pixels 121-11 to 121-41 through the transfer control line (TRG1). Similarly, the area scanning unit 111 supplies a transfer control signal (TRG2) to the gate electrodes of the transfer transistors 132 of the unit pixels 121-12 to 121-42 through the transfer control line (TRG2).

Also, the area scanning unit 111 supplies a reset control signal (RST1) to the gate electrodes of the reset transistors 133 of the unit pixels 121-11 to 121-41 through the reset control line (RST1). Similarly, the area scanning unit 111 supplies a reset control signal (RST2) to the gate electrodes of the reset transistors 133 of the unit pixels 121-12 to 121-42 through the reset control line (RST2).

Furthermore, the area scanning unit 111 supplies a select control signal (SEL1) to the gate electrodes of the select transistors 135 of the unit pixels 121-11 to 121-41 through the select control line (SEL1) Similarly, the area scanning unit 111 supplies a select control signal (SEL2) to the gate electrodes of the select transistors 135 of the unit pixels 121-12 to 121-42 through the select control line (SEL2).

Also, as illustrated in FIG. 7, the image sensor 100 includes VSL switches 161-1 to 161-4 as configurations of the area VSL connection units 142 (FIG. 4). When it is not necessary to distinguish to describe the VSL switches 161-1 to 161-4, they are referred to as the VSL switches 161. The VSL switch 161 having an arbitrary configuration is formed of the MOSFET, for example. In this case, a VSL connection control signal (VSL) is supplied from the VSL connection control unit 112 to a gate electrode thereof. The VSL switch 161 connects or disconnects the vertical signal line (VSL) connected to the unit pixel 121 to or from the vertical signal line (VSL) connected to the input of the comparing unit 171 to be described later on the basis of a value of the VSL connection control signal (VSL).

In a case of the example in FIG. 7, the VSL switch 161 is provided for each column of the unit pixels 121. That is to say, the VSL switch 161-1 is formed on a vertical signal line (VSL1) connecting the unit pixels 121-11 and 121-12 to the input of the comparing unit 171 (more specifically, a capacitor 182). A VSL connection control signal (VSL1) is supplied from the VSL connection control unit 112 to the gate electrode of the VSL switch 161-1. For example, when the VSL connection control signal (VSL1) is in an on-state, the VSL switch 161-1 connects the source electrode of the amplification transistor 134 of one of the unit pixels 121-11 and 121-12 selected by the area scanning unit 111 (one in which the select control signal (SEL) is turned on) to the capacitor 182. On the other hand, when the VSL connection control signal (VSL1) is in an off-state, the VSL switch 161-1 disconnects them from each other.

The VSL switch 161-2 is formed on a vertical signal line (VSL2) connecting the unit pixels 121-21 and 121-22 and the input of the comparing unit 171 (more specifically, the capacitor 182). A VSL connection control signal (VSL2) is supplied from the VSL connection control unit 112 to a gate electrode of the VSL switch 161-2. For example, when the VSL connection control signal (VSL2) is in an on-state, the VSL switch 161-2 connects the source electrode of the amplification transistor 134 of one of the unit pixels 121-21 and 121-22 selected by the area scanning unit 111 (one in which the select control signal (SEL) is turned on) to the capacitor 182. On the other hand, when the VSL connection control signal (VSL2) is in an off-state, the VSL switch 161-2 disconnects them from each other.

The VSL switch 161-3 is formed on a vertical signal line (VSL3) connecting the unit pixels 121-31 and 121-32 to the input of the comparing unit 171 (more specifically, the capacitor 182). A VSL connection control signal (VSL3) is supplied from the VSL connection control unit 112 to a gate electrode of the VSL switch 161-3. For example, when the VSL connection control signal (VSL3) is in an on-state, the VSL switch 161-3 connects the source electrode of the amplification transistor 134 of one of the unit pixel 121-31 and 121-32 selected by the area scanning unit 111 (one in which the select control signal (SEL) is turned on) to the capacitor 182. On the other hand, when the VSL connection control signal (VSL3) is in an off-state, the VSL switch 161-3 disconnects them from each other.

The VSL switch 161-4 is formed on a vertical signal line (VSL4) connecting the unit pixels 121-41 and 121-42 to the input of the comparing unit 171 (more specifically, the capacitor 182). A VSL connection control signal (VSL4) is supplied from the VSL connection control unit 112 to a gate electrode of the VSL switch 161-4. For example, when the VSL connection control signal (VSL4) is in an on-state, the VSL switch 161-4 connects the source electrode of the amplification transistor 134 of one of the unit pixels 121-41 and 121-42 selected by the area scanning unit 111 (one in which the select control signal (SEL) is turned on) to the capacitor 182. On the other hand, when the VSL connection control signal (VSL4) is in an off-state, the VSL switch 161-4 disconnects them from each other.

Also, as illustrated in FIG. 7, the image sensor 100 includes FBL switches 162-1 to 162-4 as configurations of the area FBL connection units 141 (FIG. 4). When it is not necessary to distinguish to describe the FBL switches 162-1 to 162-4, they are referred to as the FBI: switches 162. The FBL switch 162 having an arbitrary configuration is formed of the MOSFET, for example. In this case, a FBL connection control signal (FBL) is supplied from the FBL connection control unit 115 to a gate electrode thereof. The FBL switch 162 connects or disconnects the feedback line (FBL) connected to the unit pixel 121 to or from the feedback line (FBL) connected to the output of the comparing unit 171 to be described later on the basis of a value of the FBL connection control signal (FBL).

In the case of the example in FIG. 7, the FBL switch 162 is provided for each column of the unit pixels 121. That is to say, the FBL switch 162-1 is formed on a feedback line (FBL1) connecting the unit pixels 121-11 and 121-12 to the output of the comparing unit 171 (more specifically, a FBEN switch 188). A FBL connection control signal (FBL1) is supplied from the FBL, connection control unit 115 to a gate electrode of the FBL switch 162-1. For example, when the FBL connection control signal (FBL1) is in an on-state, the FBL switch 162-1 connects the drain electrode of the reset transistor 133 of one of the unit pixels 121-11 and 121-12 selected by the area scanning unit 111 (one in which the select control signal (SEL) is turned on) to the FBEN switch 188. On the other hand, when the FBL connection control signal (FBL1) is in an off-state, the FBL switch 162-1 disconnects them from each other.

The FBL switch 162-2 is formed on a feedback line (FBL2) connecting the unit pixels 121-21 and 121-22 to the output of the comparing unit 171 (more specifically, the FBEN switch 188). A FBL connection control signal (FBL2) is supplied from the FBL connection control unit 115 to a gate electrode of the FBL switch 162-2. For example, when the FBL connection control signal (FBL2) is in an on-state, the FBL switch 162-2 connects the drain electrode of the reset transistor 133 of one of the unit pixels 121-21 and 121-22 selected by the area scanning unit 111 (one in which the select control signal (SEL) is turned on) to the FBEN switch 188. On the other hand, when the FBL connection control signal (FBL2) is in an off-state, the FBL switch 162-2 disconnects them from each other.

The FBL switch 162-3 is formed on a feedback line (FBL3) connecting the unit pixels 121-31 and 121-32 to the output of the comparing unit 171 (more specifically, the FBEN switch 188). A FBL connection control signal (FBL3) is supplied from the FBL connection control unit 115 to a gate electrode of the FBL switch 162-3. For example, when the FBL connection control signal (FBL3) is in an on-state, the FBL switch 162-3 connects the drain electrode of the reset transistor 133 of one of the unit pixels 121-31 and 121-32 selected by the area scanning unit 111 (one in which the select control signal (SEL) is turned on) to the FBEN switch 188. On the other hand, when the FBL connection control signal (FBL3) is in an off-state, the FBL switch 162-3 disconnects them from each other.

The FBL switch 162-4 is formed on a feedback line (FBL4) connecting the unit pixels 121-41 and 121-42 to the output of the comparing unit 171 (more specifically, the FBEN switch 188). A FBL connection control signal (FBL4) is supplied from the FBL connection control unit 115 to a gate electrode of the FBL switch 162-4. For example, when the FBL connection control signal (FBL4) is in an on-state, the FBL switch 162-4 connects the drain electrode of the reset transistor 133 of one of the unit pixels 121-41 and 121-42 selected by the area scanning unit 111 (one in which the select control signal (SEL) is turned on) to the FBEN switch 188. On the other hand, when the FBL connection control signal (FBL4) is in an off-state, the FBL switch 162-4 disconnects them from each other.

Also, as illustrated in FIG. 7, the image sensor 100 includes the comparing unit 171, the counter 172, a capacitor 181, the capacitor 182, a VRST switch 183, an XOFFLM switch 184, a current source 185, an AZ switch 186, an AZ switch 187, the FBEN switch 188, and a VROL switch 189 as configurations of the area A/D converters 143 (FIG. 4).

The comparing unit 171 compares the signal level of the signal read from the unit pixel 121 with the reference voltage (ramp wave) supplied by the D/A converter (DAC) 144 to output information indicating a larger value (the comparison result). The reference voltage (ramp wave) is input from the D/A converter (DAC) 144 to one of two inputs of the comparing unit 171. Also, the signal read from any unit pixel 121 (selected by the area scanning unit 111 out of the unit pixels 121-11 to 121-42) of the pixel unit 120 (transmitted through the vertical signal line (VSL)) is input to the other. The comparing unit 171 supplies the counter 172 with the comparison result.

The counter 172 counts until the comparison result supplied by the comparing unit 171 changes after the comparison by the comparing unit 171 starts. When the comparison result which is input changes, the counter 172 outputs a count value so far (digital data) to the horizontal transfer unit 104 (FIG. 1) The count value indicates the signal level of the signal read from the unit pixel 121. That is to say, the analog signal is converted to the digital data.

Meanwhile, hereinafter, an input terminal to which the reference voltage (ramp wave) is input of the comparing unit 171 is referred to as the input terminal on a DAC side (or a DAC side input terminal) and the input terminal to which the signal read from the unit pixel 121 is input is referred to as the input terminal on a VSL side (or a VSL side input terminal).

The capacitor 181 is capacitance series-connected upstream of the DAC side input terminal for cancelling an offset error, for example. That is to say, the reference voltage (ramp wave) supplied from the D/A converter (DAC) 144 is input to the DAC side input terminal of the comparing unit 171 through the capacitor 181.

The capacitor 182 is capacitance series-connected upstream of the VSL side input terminal for cancelling the offset error, for example. That is to say, the signal read from the unit pixel 121 is input to the VSL side input terminal of the comparing unit 171 through the capacitor 182.

The VRST switch 183 connects or disconnects predetermined power source potential VRST to or from the VSL side input terminal of the comparing unit 171 on the basis of control of the A/D conversion control unit 113. The VRST switch 183 having an arbitrary configuration is formed of the MOSFET, for example. In this case, a VRST connection control signal (VRST) is supplied from the A/D conversion control unit 113 to a gate electrode thereof.

For example, when the VRST connection control signal (VRST) is in an on-state, the VRST switch 183 connects the power source potential VRST to the capacitor 182 and applies the power source potential VRST to the VSL side input terminal of the comparing unit 171. On the other hand, when the VRST connection control signal (VRST) is in an off-state, the VRST switch 183 disconnects them from each other.

The XOFFLM switch 184 connects or disconnects the vertical signal line (VSL) to or from the current source 185 formed as a load on the basis of the control of the A/D conversion control unit 113. The XOFFLM switch 184 having an arbitrary configuration is formed of the MOSFET, for example. In this case, an XOFFLM connection control signal (XOFFLM) is supplied from the A/D conversion control unit 113 to a gate electrode thereof.

The AZ switch 186 connects or disconnects an output terminal of the comparing unit 171 to or from the DAC side input terminal on the basis of the control of the A/D conversion control unit 113. The AZ switch 187 connects or disconnects the output terminal of the comparing unit 171 to or from the VSL side input terminal on the basis of the control of the A/D conversion control unit 113. The AZ switches 186 and 187 having arbitrary configurations are formed of the MOSFETs, for example. In this case, an AZ connection control signal (AZ) is supplied from the A/D conversion control unit 113 to gate electrodes thereof.

For example, when auto zero is executed, the A/D conversion control unit 113 turns on the AZ connection control signal (AZ). According to this, the AZ switches 186 and 187 short-circuit the input and output of the comparing unit 171.

The FBEN switch 188 formed on the feedback line (FBL) connects or disconnects the output terminal of the comparing unit 171 to or from the FBL switch 162 on the basis of the control of the A/D conversion control unit 113. The FBEN switch 188 having an arbitrary configuration is formed of the MOSFET, for example. In this case, a FBEN connection control signal (FBEN) is supplied from the A/D conversion control unit 113 to a gate electrode thereof.

For example, when the FBEN connection control signal (FBEN) is in an on-state, the FBEN switch 188 short-circuits and the output (comparison result) of the comparing unit 171 is supplied to each FBL switch 162. When the FBL switch 162 short-circuits, the comparison result is supplied to the floating diffusion (FD) of the unit pixel 121 of the row selected by the area scanning unit 111 of the unit pixel column to which the FBL switch 162 corresponds. On the other hand, when the FBEN connection control signal (FBEN) is in an off-state, the FBEN switch 188 disconnects the output terminal of the comparing unit 171 from the FBL switch 162.

The VROL switch 189 connects or disconnects predetermined power source potential VDD to or from the feedback line (FBL) on the basis of the control of the A/D conversion control unit 113. The VROL switch 189 having an arbitrary configuration is formed of the MOSFET, for example. In this case, a VROL connection control signal (VROL) is supplied from the A/D conversion control unit 113 to the gate electrode.

Meanwhile, the area scanning unit 111, the VSL connection control unit 112, the A/D conversion control unit 113, and the FBL connection control unit 115 are controlled by the control unit 110 to operate.

The image sensor 100 has such configuration for each pixel unit 120. Meanwhile, the area scanning unit 111, the VSL connection control unit 112, the A/D conversion control unit 113, the FBL connection control unit 115, and the D/A converter (DAC) 144 may be provided for each pixel unit 120 to control the configuration of the pixel unit 120 to which they are assigned, or assigned to a plurality of pixel units 120 to control the configurations of the plurality of pixel units 120. For example, it is also possible that one area scanning unit 111, one VSL connection control unit 112, one A/D conversion control unit 113, one FBL connection control unit 115, and one D/A converter (DAC) 144 are provided on the image sensor 100 and they control the configurations of all the pixel units.

<Flow of Imaging Control Process>

A flow of a process executed by the image sensor 100 having the above-described configuration is described. An example of a flow of an imaging control process executed by the image sensor 100 when this obtains the captured image and the like, for example, is described with reference to the flowchart in FIG. 8 with reference to a flowchart in FIG. 8.

When the imaging control process starts, the control unit 110 controls the area scanning unit 111 and selects the pixel unit 120 not yet processed at step S101.

At step S102, the control unit 110 performs a feedback phase process for inhibiting the variation in the threshold among the amplification transistors 134 for the pixel unit 120 selected at step S101.

The image sensor 100 performs correlated double sampling (CDS) when reading the pixel signal. That is to say, at step S103, the control unit 110 performs a preset read phase process for inhibiting dark current noise and the like for the pixel unit 120 selected at step S101.

At step S104, the control unit 110 controls the area scanning unit 111 and transfers the charge accumulated in the photo diode (PD) 131 of each unit pixel 121 of the pixel unit 120 selected at step S101 to the floating diffusion (FD)

At step S105, the control unit 110 performs a data read phase process to read the pixel signal for the pixel unit 120 selected at step S101.

At step S106, the control unit 110 determines whether all the pixel units 120 of the pixel array 101 are processed. When it is determined that there is the pixel unit 120 not yet processed, the procedure returns to step S101 and subsequent processes are repeated.

Also, when it is determined that all the pixel units 120 of the pixel array 101 are processed at step S106, the imaging control process ends.

Figure 9:
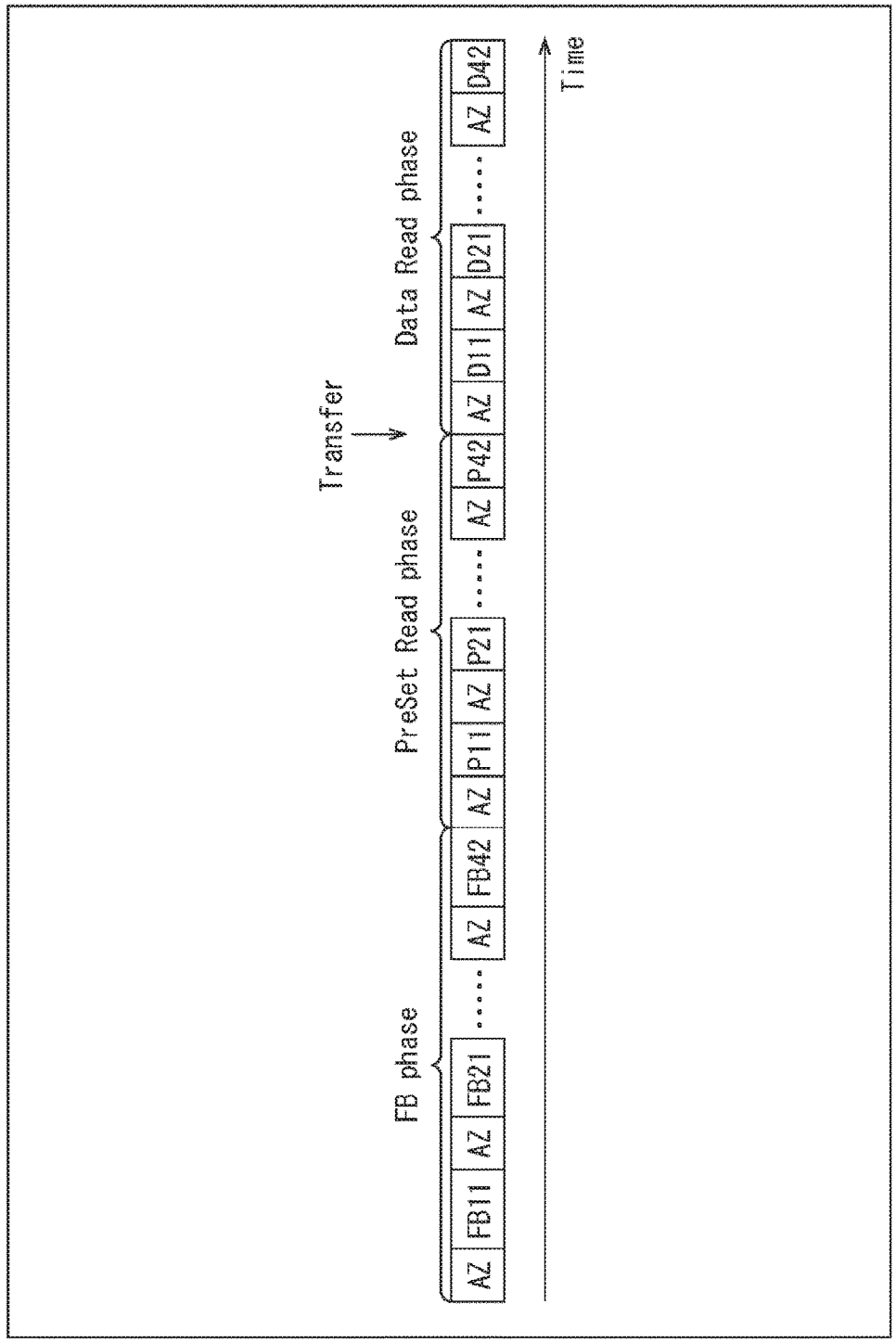
FIG. 9 is a timing chart illustrating an example of a state of imaging.

That is to say, as illustrated in FIG. 9, the feedback phase process (FB phase), the preset read phase process (PreSet Read phase), charge transfer (Transfer), and the data read phase process (Data Read phase) are performed for each pixel unit 120.

Also, as illustrated in FIG. 9, the feedback phase process (FB phase), the preset read phase process (PreSet Read phase), and the data read phase process (Data Read phase) are executed for all the unit pixels 121 in the pixel unit 120. Also, an auto zero process (AZ) is executed between the processes for each unit pixel.

<Flow of Feedback Phase Process>

Figure 8:
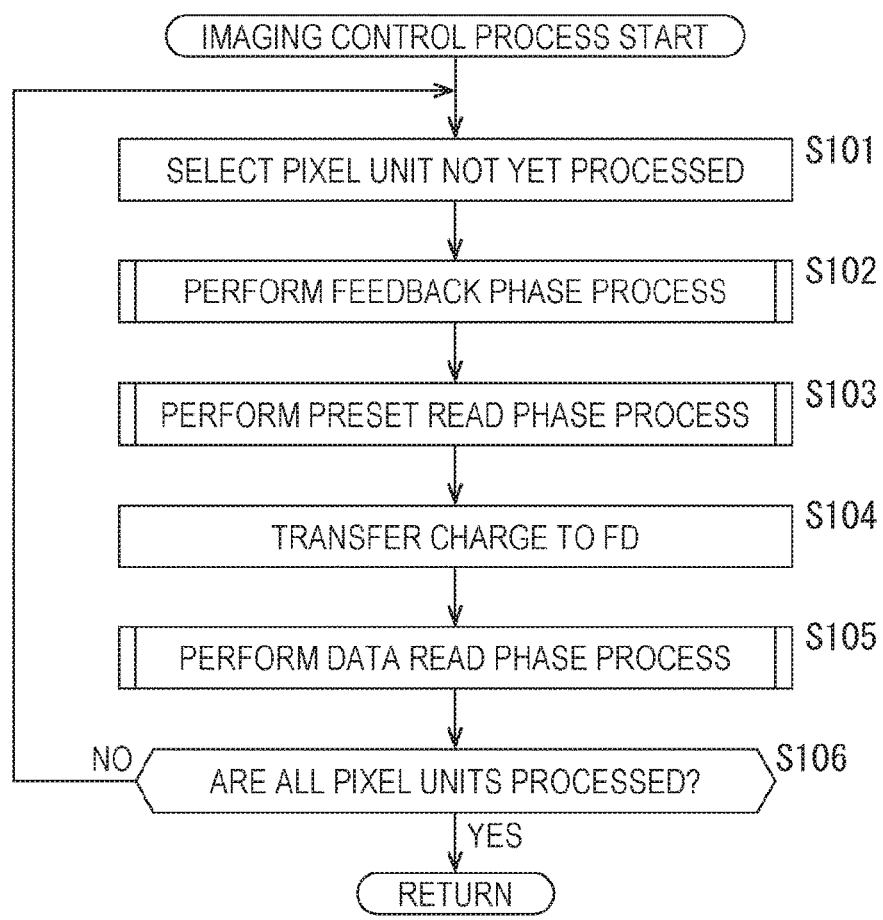
FIG. 8 is a flowchart illustrating an example of a flow of an imaging control process.
Figure 10:
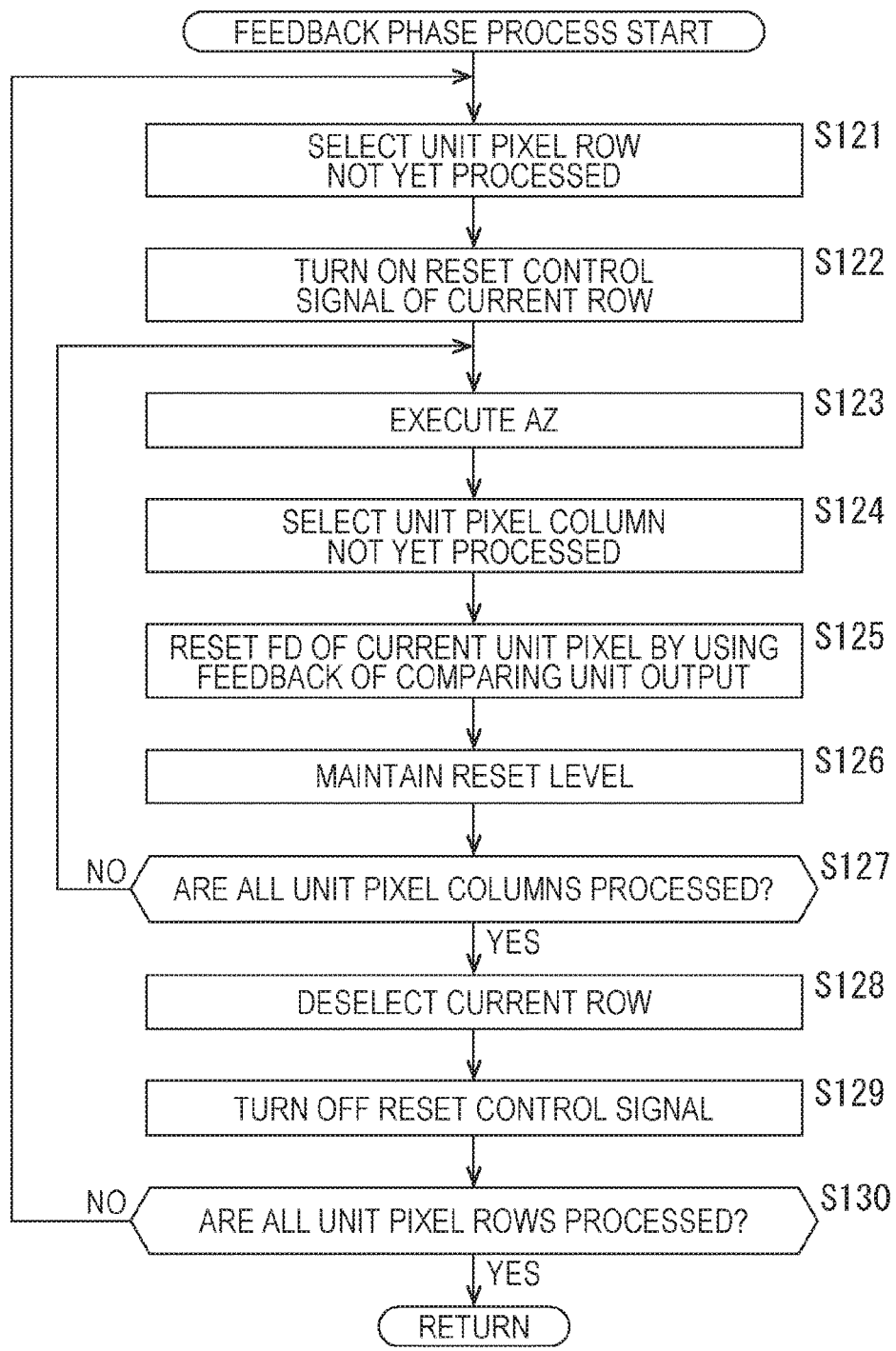
FIG. 10 is a flowchart illustrating an example of a flow of a feedback phase process.

Next, an example of a flow of the feedback phase process executed at step S102 in FIG. 8 is described with reference to a flowchart in FIG. 10. As described above, the feedback phase process is executed for each pixel unit 120.

When the feedback phase process starts, the control unit 110 controls the area scanning unit 111 and selects the unit pixel row (row of the unit pixels 121) not yet processed of the current pixel unit 120 as a target to be processed at step S121. For example, the area scanning unit 111 turns on the select control signal (SEL) of any row out of the unit pixel rows not yet processed.

At step S122, the control unit 110 controls the area scanning unit 111 and turns on the reset control signal (RST) of the current unit pixel row selected at step S121.

At step S123, the control unit 110 controls the A/D conversion control unit 113 and the like to execute the auto zero process (AZ). For example, the A/D conversion control unit 113 turns on the AZ connection control signal (AZ) for the area A/D converter 143 corresponding to the current pixel unit 120. Also, the A/D conversion control unit 113 turns on the VRST connection control signal (VRST) of the area A/D converter 143.

At step S124, the control unit 110 controls the VSL connection control unit 112 and selects the unit pixel column (column of the unit pixels 121) not yet processed as a target to be processed. For example, the VSL connection control unit 112 turns on any VSL connection control signal (VSL) of the current pixel unit 120. According to this, one unit pixel 121 out of the current unit pixel row is selected as a target to be processed.

At step S125, the control unit 110 controls the A/D conversion control unit 113 and the FBL connection control unit 115 to feed back the output of the comparing unit 171 to the current unit pixel 121 as the reset level and resets the floating diffusion (FD) thereof by using the same. For example, the A/D conversion control unit 113 turns on the FBEN connection control signal (FBEN) Also, the FBL connection control unit 115 turns on the FBL connection control signal (FBL) of the column in which the VSL connection control signal (VSL) is turned on.

At step S126, the control unit 110 controls the VSL connection control unit 112, the A/D conversion control unit 113, and the FBL connection control unit 115 to allow the floating diffusion (FD) of the current unit pixel 121 to maintain the reset level. For example, the VSL connection control unit 112 turns off the VSL connection control signal (VSL) which is turned on at step S124. Also, for example, the A/D conversion control unit 113 turns off the FBEN connection control signal (FBEN) which is turned on at step S125. Furthermore, for example, the FBL connection control unit 115 turns off the FBL connection control signal (FBL) which is turned on at step S125.

At step S127, the control unit 110 determines whether all the unit pixel columns of the current unit pixel row of the current pixel unit 120 are processed. When it is determined that there is the unit pixel column not yet processed, the procedure returns to step S123 and subsequent processes are repeated. Also, when it is determined that all the unit pixel columns of the current unit pixel row are processed at step S127, the procedure shifts to step S128.

That is to say, the processes at steps S123 to S127 are executed for all the unit pixels 121 of the current unit pixel row of the current pixel unit 120. When one unit pixel row is processed, a next unit pixel row is to be processed.

At step S128, the control unit 110 controls the area scanning unit 111 to deselect the current row selected at step S121. For example, the area scanning unit 111 turns off the select control signal (SEL) turned on at step S121.

At step S129, the control unit 110 controls the area scanning unit 111 to turn off the reset control signal (RST) which is turned on at step S122.

At step 130, the control unit 110 determines whether all the unit pixel rows of the current pixel unit 120 are processed. When it is determined that there is the unit pixel row not yet processed, the procedure returns to step S121 and subsequent processes are repeated. Also, at step S130, when it is determined that all the unit pixel rows of the current pixel unit 120 (that is to say, all the unit pixels 121 of the current pixel unit 120) are processed, the feedback phase process ends and the procedure returns to FIG. 8.

That is to say, the processes at steps S121 to S130 are performed for each unit pixel row of the current pixel unit 120. When all the unit pixel rows are processed, the procedure shifts to a next phase (the preset read phase process)

<Timing Chart of Feedback Phase>

Figure 11:
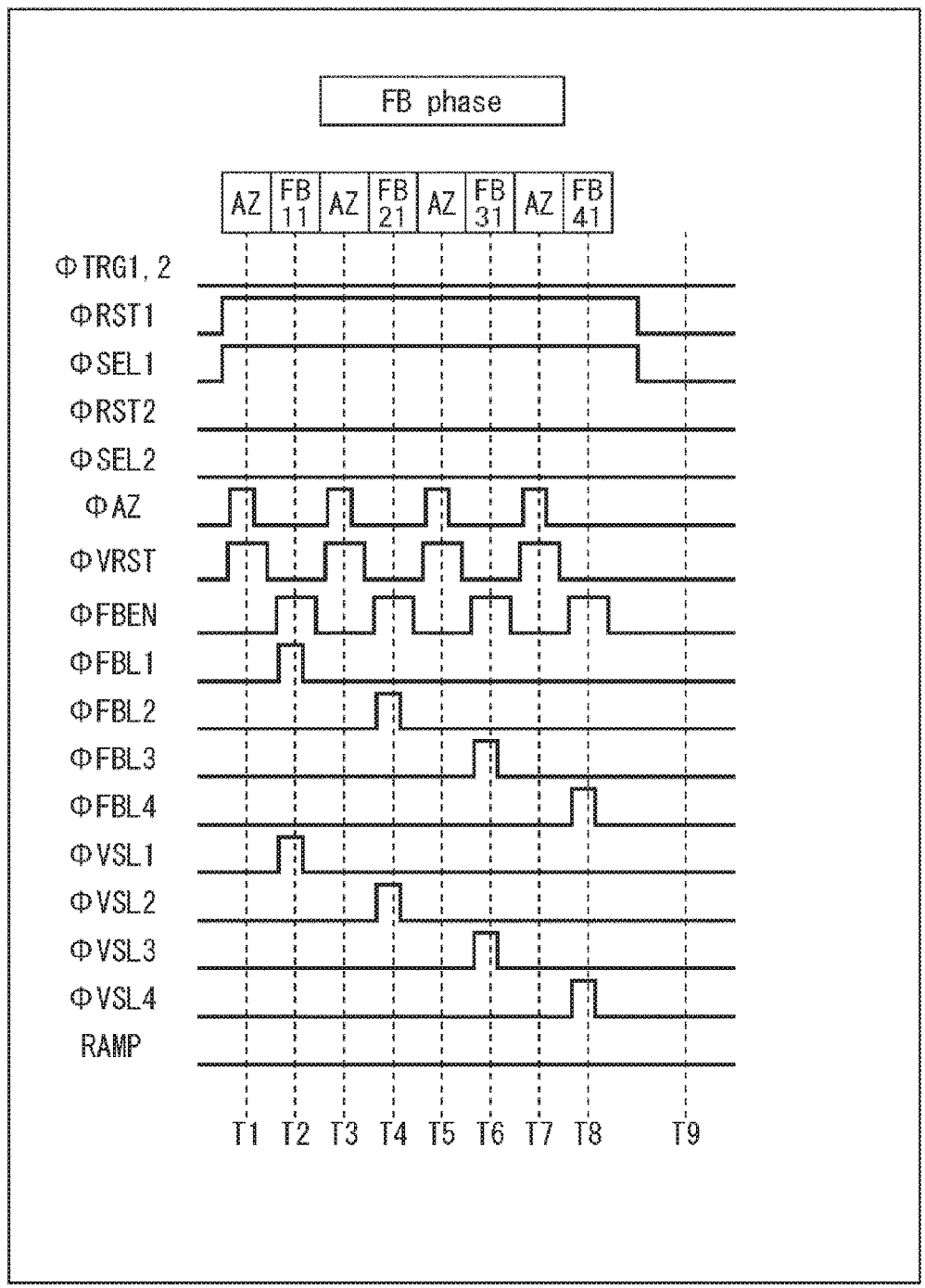
FIG. 11 is a timing chart illustrating an example of a state of a feedback phase.

FIG. 11 is a timing chart illustrating an example of the flow of the feedback phase process for the unit pixel row on the pixel unit 120.

In this case, as illustrated in FIG. 11, a select control signal (φSEL1) is turned on (step S121) and a reset control signal (φRST1) is turned on (step S122)

Thereafter, the auto zero process (AZ) is performed at time T1 (step S123). At that time, an AZ connection control signal (φAZ) and a VRST connection control signal (φVRST) are turned on.

Figure 12:
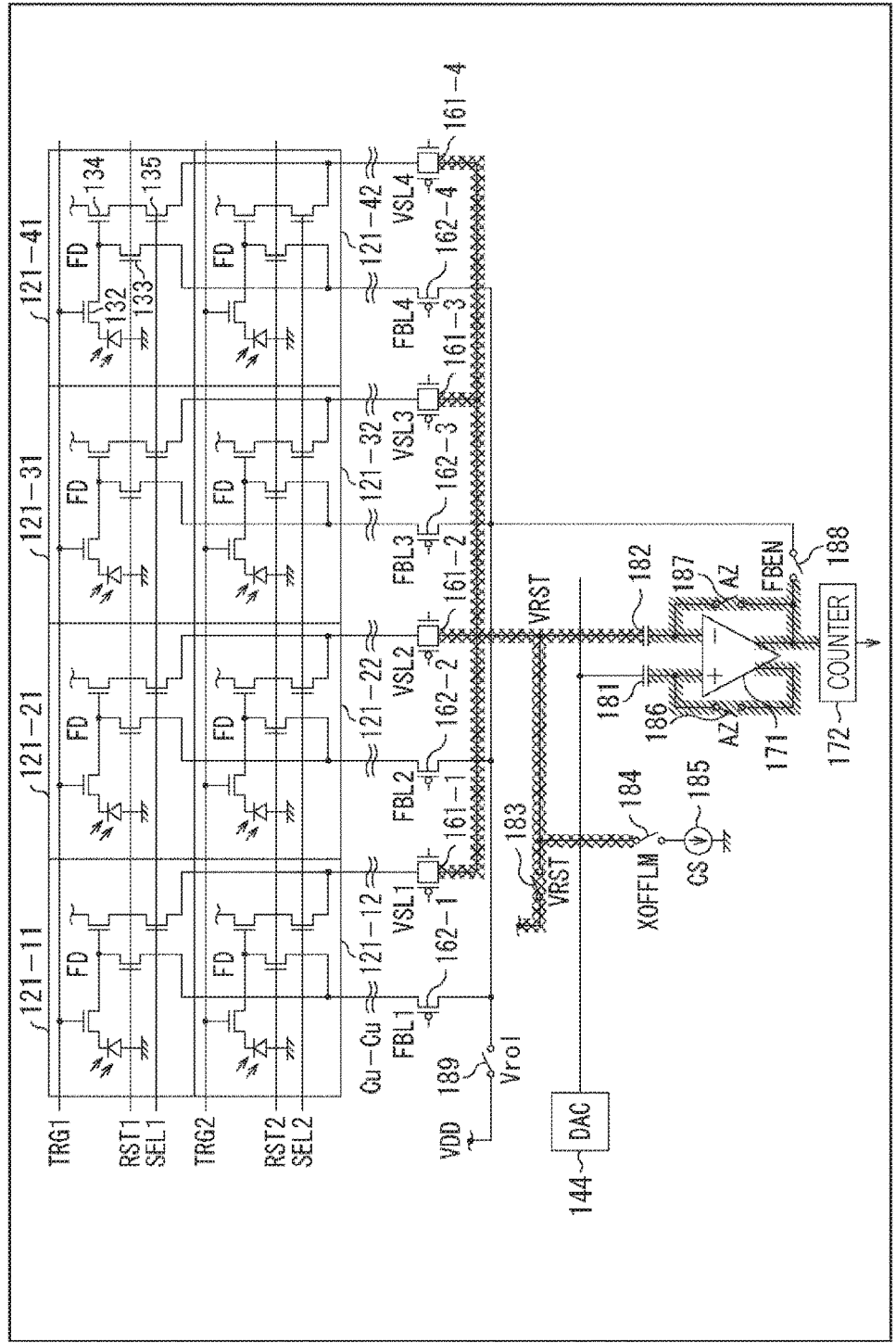
FIG. 12 is a view illustrating an example of a state at time T1.

According to this, as illustrated in FIG. 12, the input and the output of the comparing unit 171 are short-circuited and the power source potential VRST is applied between the VSL switch 161 of the vertical signal line (VSL) and the capacitor 182.

At time T2, the process for the unit pixel 121-11 is performed (steps S124 to S126). At that time, a FBEN connection control signal (φFBEN) is turned on and further a VSL connection control signal (φVSL1) and a FBL connection control signal (φFBL1) corresponding to the unit pixel 121-11 are turned on.

Figure 13:
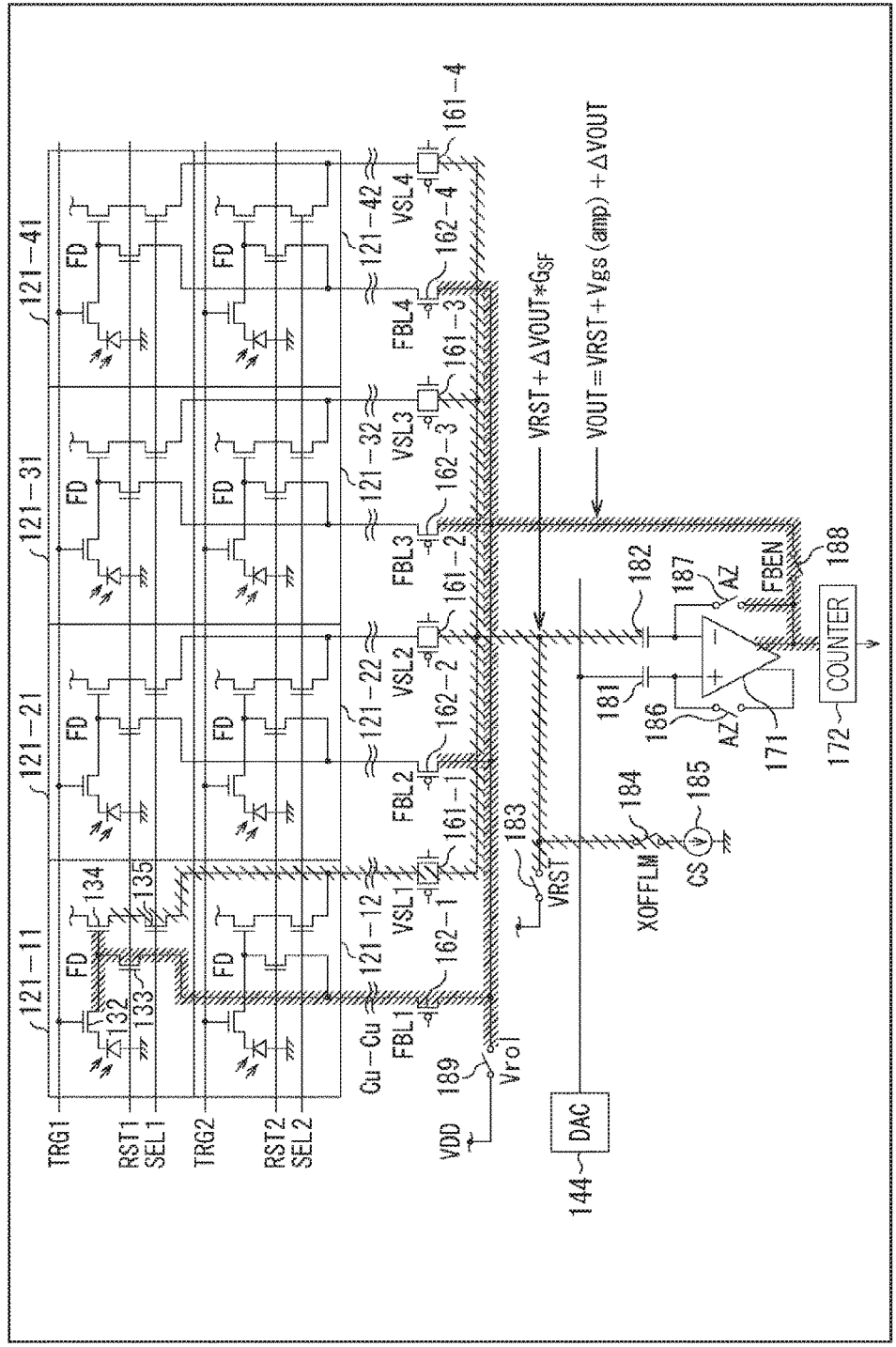
FIG. 13 is a view illustrating an example of a state at time T2.

According to this, as illustrated in FIG. 13, the output of the comparing unit 171 is fed back to the floating diffusion (FD) of the unit pixel 121-11 as the reset level. Also, the reset level is read to be supplied to the VSL side input terminal of the comparing unit 171.

At that time, the signal level of the signal read from the unit pixel 121-11 may be represented as VRST+ΔVOUT*$G_{SF}$. Also, a signal level VOUT of the output (comparison result) of the comparing unit 171 may be represented by following equation (1).

$$VOUT = VRST + Vgs(amp) + \Delta VOUT \quad (11)$$

ΔVOUT representing an error in the signal level VOUT of the output (comparison result) of the comparing unit 171 may be obtained by following equation (2)

$$\Delta VOUT = \Delta Vth / (1 + G_{SF} \times G_{CM}) \quad (2)$$

For example, when an error ΔVth in the threshold voltage Vth of the amplification transistor 134 is 100 [mV], $G_{CM}$ is 30, and $G_{SF}$ is 0.85, ΔVOUT is 3.8 [mV].

Figure 14:
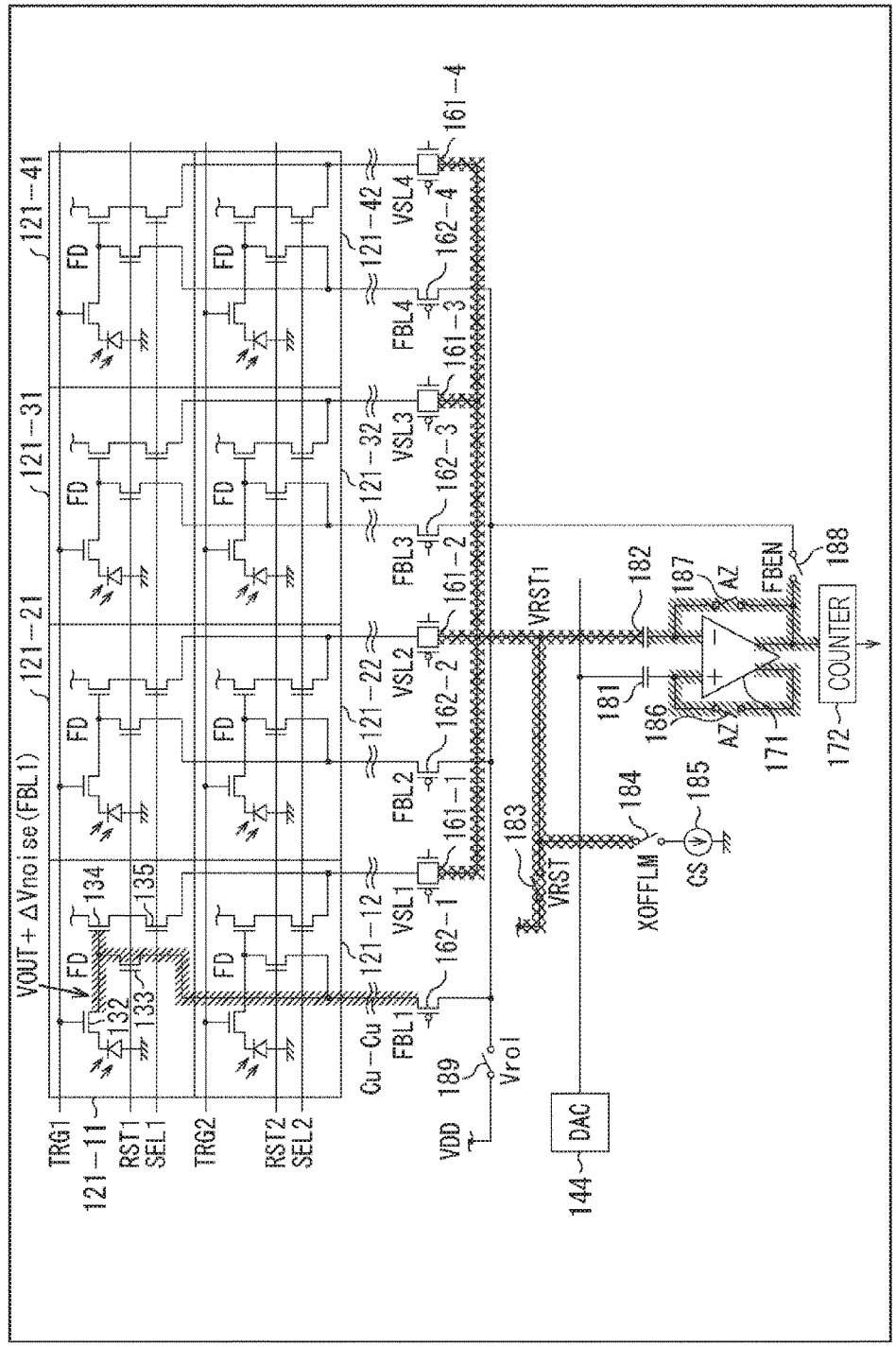
FIG. 14 is a view illustrating an example of a state at time T3.

Thereafter, the FBEN connection control signal (φFBEN), the VSL connection control signal (φVSL1), and the FBL connection control signal (φFBL1) are turned off. Especially, by turnoff of the FBL connection control signal (φFBL1), as illustrated in FIG. 14, potential [VOUT+ΔVnoise(FBL1)] is maintained as the reset level in the floating diffusion (FD) of the unit pixel 121-11 and the feedback line (FBL1) from the floating diffusion (FD) to the FBL switch 162-1. ΔVnoise (FBL1) includes feedthrough and kTC noise of the FBL switch 162-1. Hereinafter, when it is not necessary to distinguish to describe each FBL switch 162 (feedback line (FBL)), this is referred to as ΔVnoise(FBL). In other words, ΔVnoise(FBLn) is potential corresponding to an n-th feedback line (FBLn) and includes feedthrough and kTC noise of the FBI switch 162-n. Then, the description using ΔVnoise (FBL may be applied to any ΔVnoise(FBLn)

Next, the similar process is repeated for the unit pixel 121-21. That is to say, the auto zero process (AZ) is first performed at time T3 as that at time T1.

According to this, as illustrated in FIG. 14, the input and the output of the comparing unit 171 are short-circuited and the power source potential VRST is applied between the VSL switch 161 of the vertical signal line (VSL) and the capacitor 182.

Next, at time T4, the process for the unit pixel 121-21 is performed (steps S124 to S126). At that time, the FBEN connection control signal (φFBEN) is turned on and further a VSL connection control signal (φVSL2) and a FBL connection control signal (φFBL2) corresponding to the unit pixel 121-21 are turned on.

Figure 15:
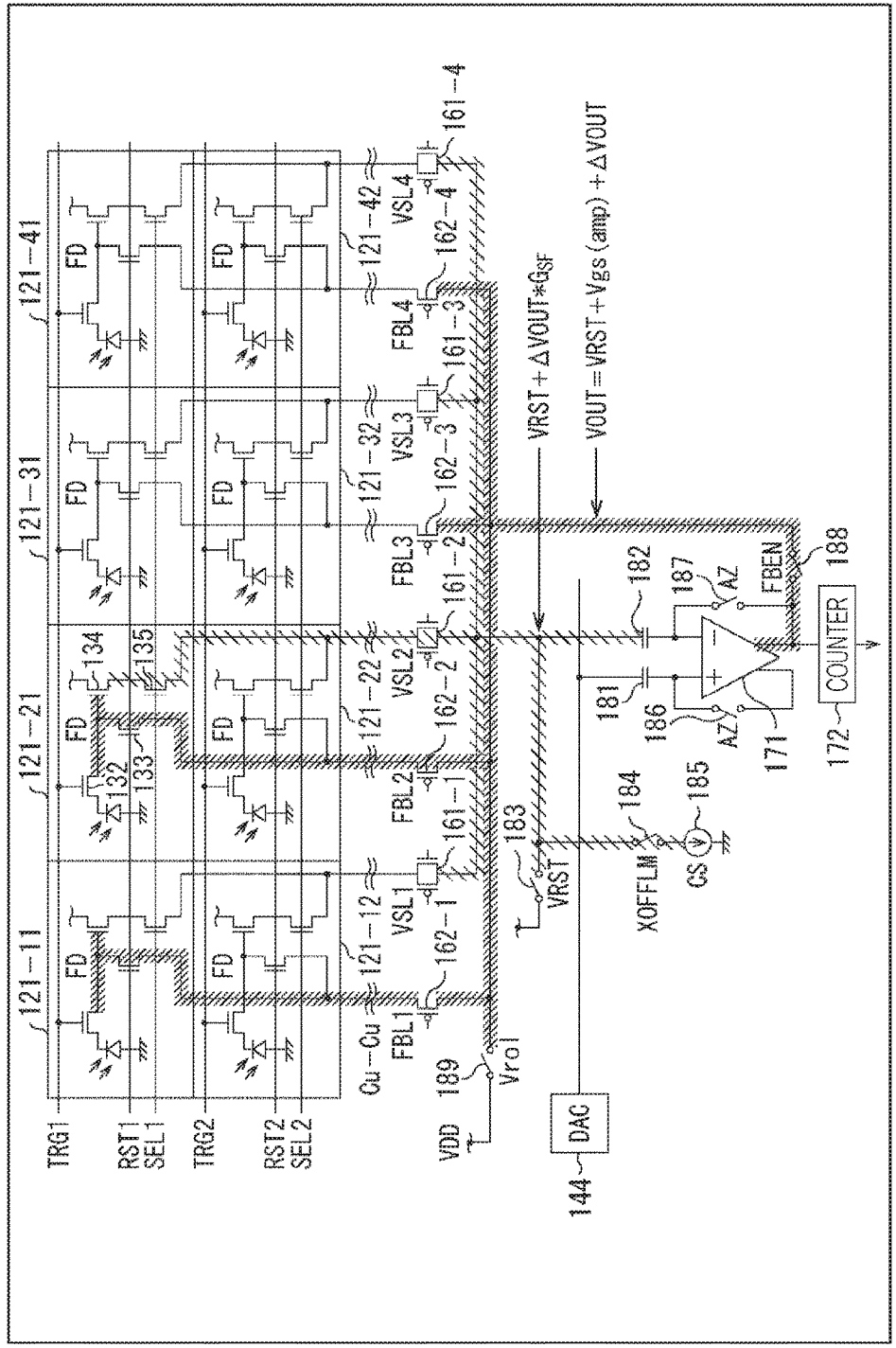
FIG. 15 is a view illustrating an example of a state at time T4.

According to this, as illustrated in FIG. 15, the output of the comparing unit 171 is fed back to the floating diffusion (FD) of the unit pixel 121-21 as the reset level. Also, the reset level is read to be supplied to the VSL side input terminal of the comparing unit 171.

Figure 16:
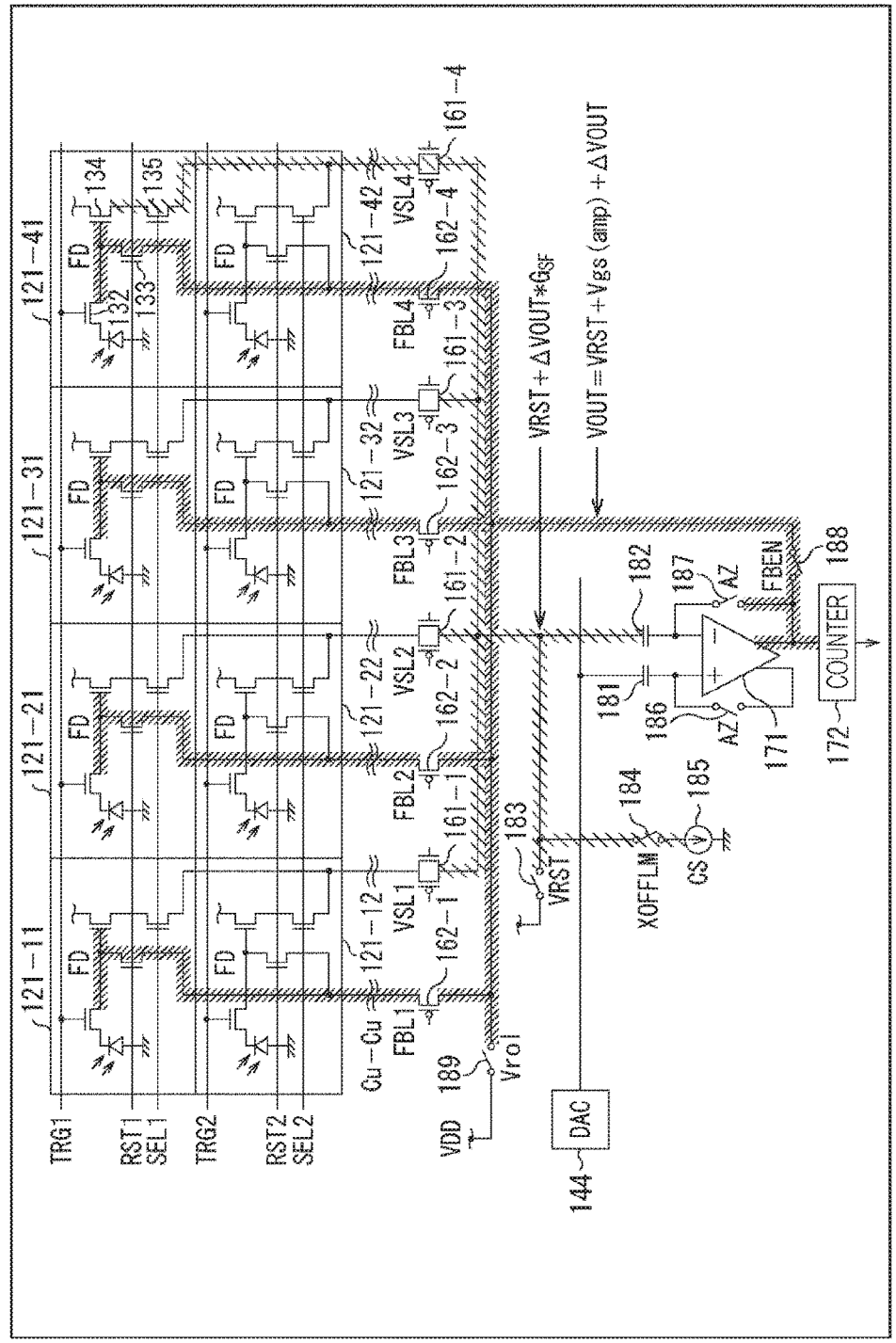
FIG. 16 is a view illustrating an example of a state at time T8.

Furthermore, the similar process is repeated for each of the unit pixels 121-31 and 121-41 from time T5 to time T8. FIG. 16 illustrates a state at time T8. At that time, the output VOUT (that is to say, potential [VRST+Vgs (amp)+ ΔVOUT]) of the comparing unit 171 is fed back to the floating diffusion (FD) of the unit pixel 121-41. Meanwhile, potential [VOUT+ΔVnoise (FBL)] is maintained as the reset level in the floating diffusion (D) and the feedback line (F from the floating diffusion (FD) to the FBL switch 162 in each of the unit pixels 121-11 to 121-31. A value of ΔVnoise(FBL) Includes the feedthrough and the kTC noise of the FBL switch 162 as described above, so that this is independent for each unit pixel 121 (feedback line (FBL)) That is to say, the potential [VOUT+ΔVnoise (FBL)] of the value according to the FBL switch 162 corresponding to the unit pixel (feedback line (FBL)) is maintained in each unit pixel 121 (feedback line (FBL).

As for the unit pixel 121-41 also, by turnoff of the FBL connection control signal (φFBL1) (by turnoff of the FBI switch 162-4) thereafter, potential [VOUT+ΔVnoise (FBL4)] is maintained as the reset level in the floating diffusion (FD) and the feedback line (FBL4) from the floating diffusion (FD) to the FBL switch 162-4.

In this manner, potential [VOUT+ΔVnoise(FBL)] is maintained as the reset level in the floating diffusion (FD) and the feedback line (FBL) from the floating diffusion (FD) to the FBL switch 162 in each of the unit pixels 121-11 to 121-41.

As described above, when the output of the comparing unit 171 is fed back to all the unit pixels 121 of the current row, the reset control signal (φRST1) is turned off (time T9, step S129). According to this, the floating diffusion (FD) of each of the unit pixels 121-11 to 121-41 is reset.

Figure 17:
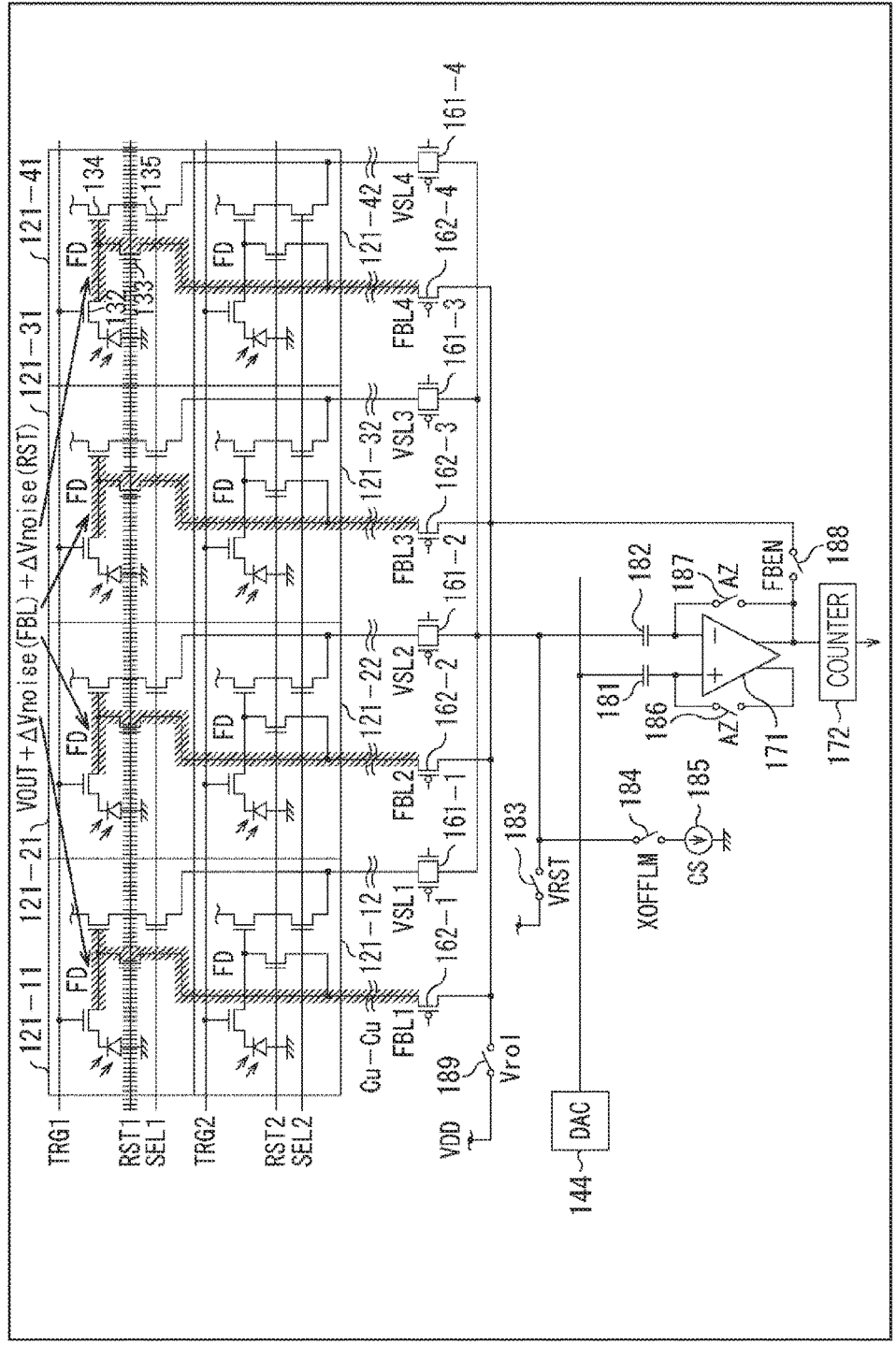
FIG. 17 is a view illustrating an example of a state at time T9.

According to this, as illustrated in FIG. 17, the reset transistor 133 of each unit pixel 121 is turned off and potential [VOUT+ΔVnoise (FBI)+ΔVnoise(RST)] is maintained in the floating diffusion (FD) of each of the unit pixels 121-11 to 121-41. ΔVnoise(RST) includes feedthrough and kTC noise of the reset transistor 133. Therefore, a value of ΔVnoise(RST) is also independent for each unit pixel 121 (feedback line (FBL)). That is to say, potential [VOUT+ ΔVnoise (FBL)+ΔVnoise (RST)] of the value according to the FBL switch 162 and the reset transistor 133 corresponding to the unit pixel (feedback line (FBL)) is maintained in the floating diffusion (FD) of each unit pixel 121. According to this, variation in the threshold voltage Vth of the amplification transistor 134 among the unit pixels 121 decreases.

Figure 18:
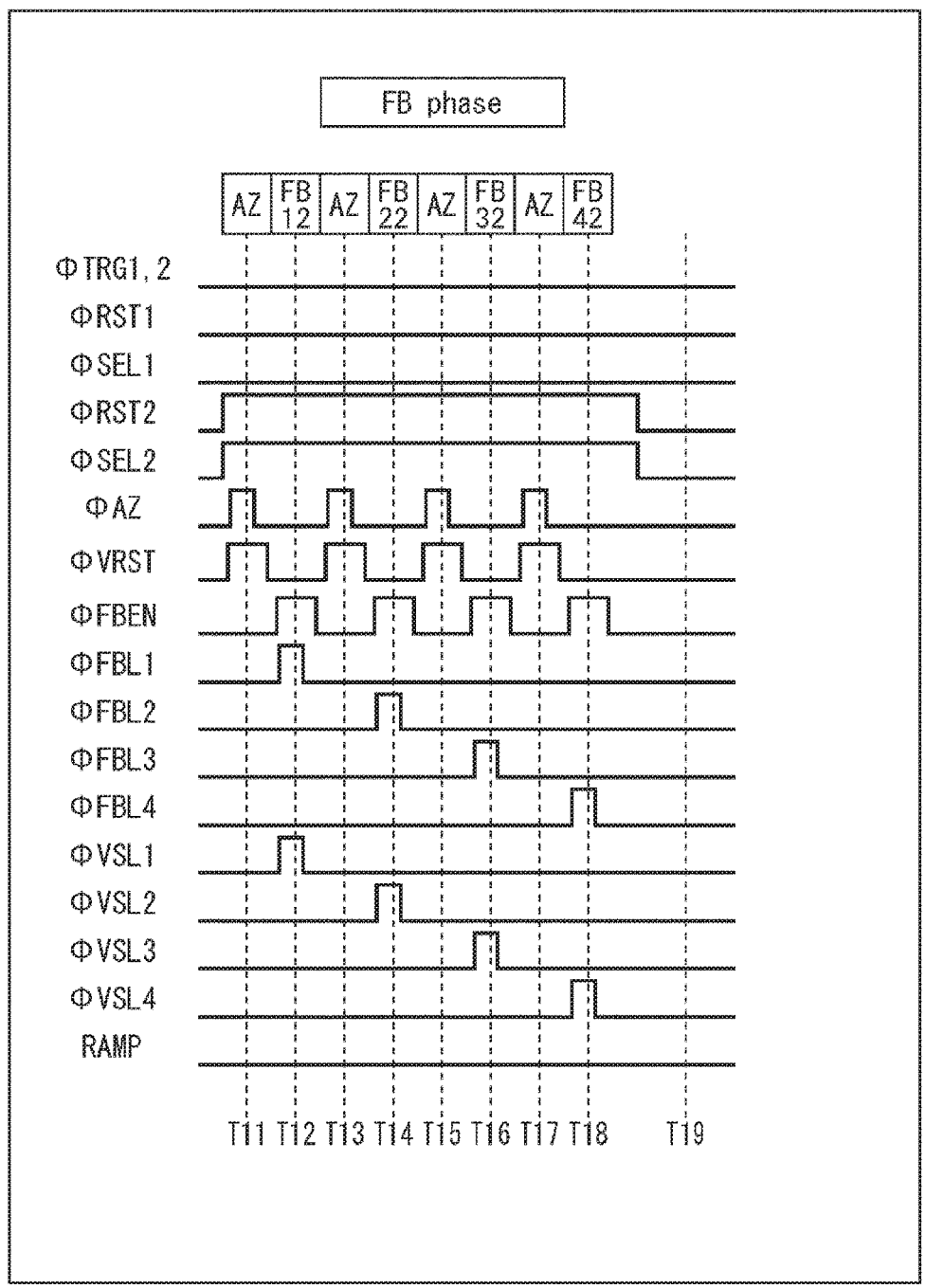
FIG. 18 is a timing chart illustrating an example of the state of the feedback phase.

FIG. 18 is a timing chart illustrating an example of the flow of the feedback phase process for the unit pixel row under the pixel unit 120.

In this case, as illustrated in FIG. 18, the select control signal (SEL2) is turned on (step S121) and the reset control signal (RST2) is turned on (step S122) That is to say, the unit pixel row of the unit pixels 121-12 to 121-42 is to be processed. In this case also, the auto zero process and the process for each unit pixel 121 are performed as in the case described with reference to FIG. 11.

Figure 19:
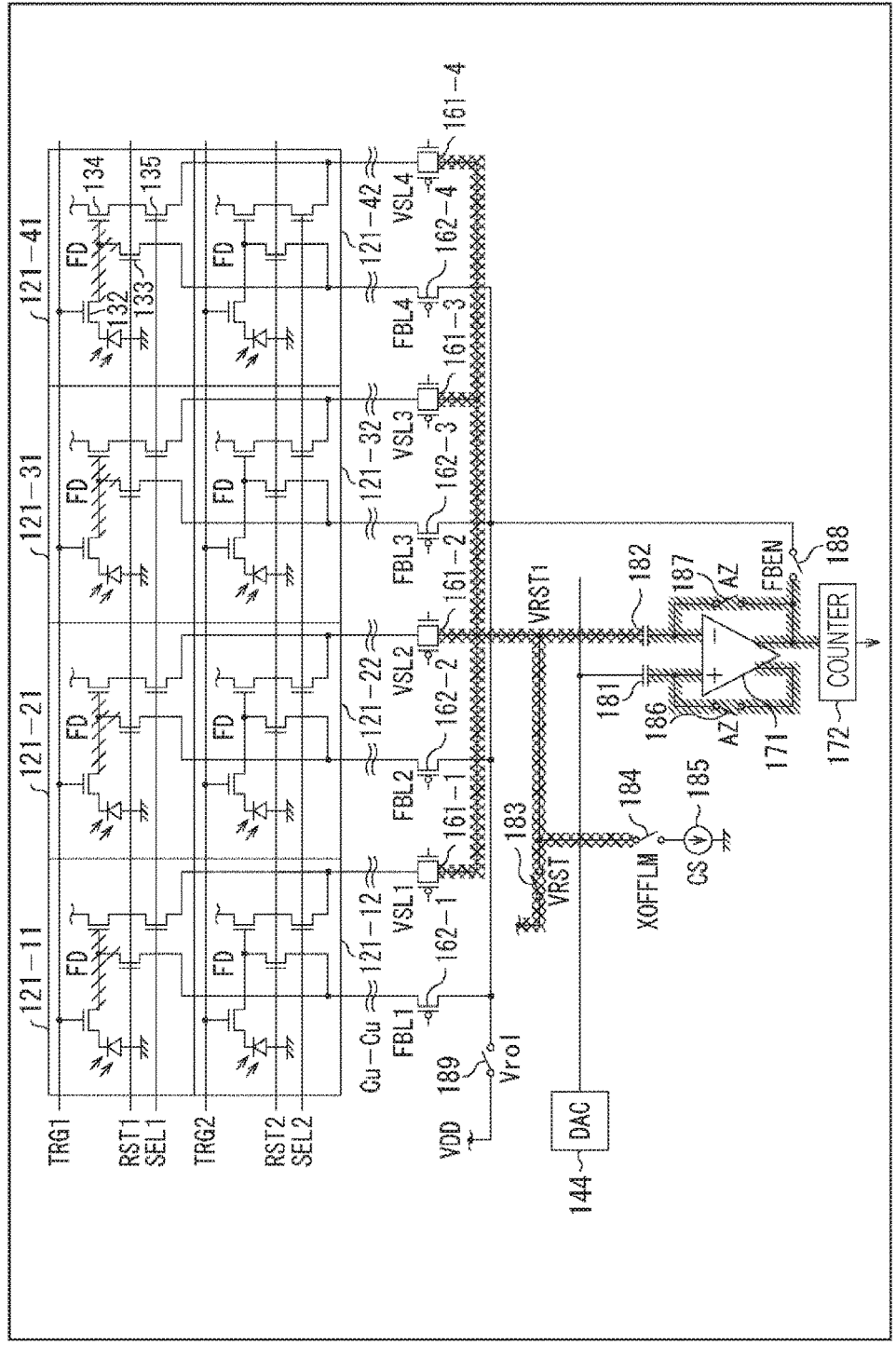
FIG. 19 is a view illustrating an example of a state at time T11.

As illustrated in FIG. 19, when the auto zero process is performed at time T11, the potential [VOUT+ΔVnoise (FBL)+ΔVnoise(RST)] is maintained in the floating diffusion (FD) of each of the unit pixels 121-11 to 121-41 which are previously processed.

Figure 20:
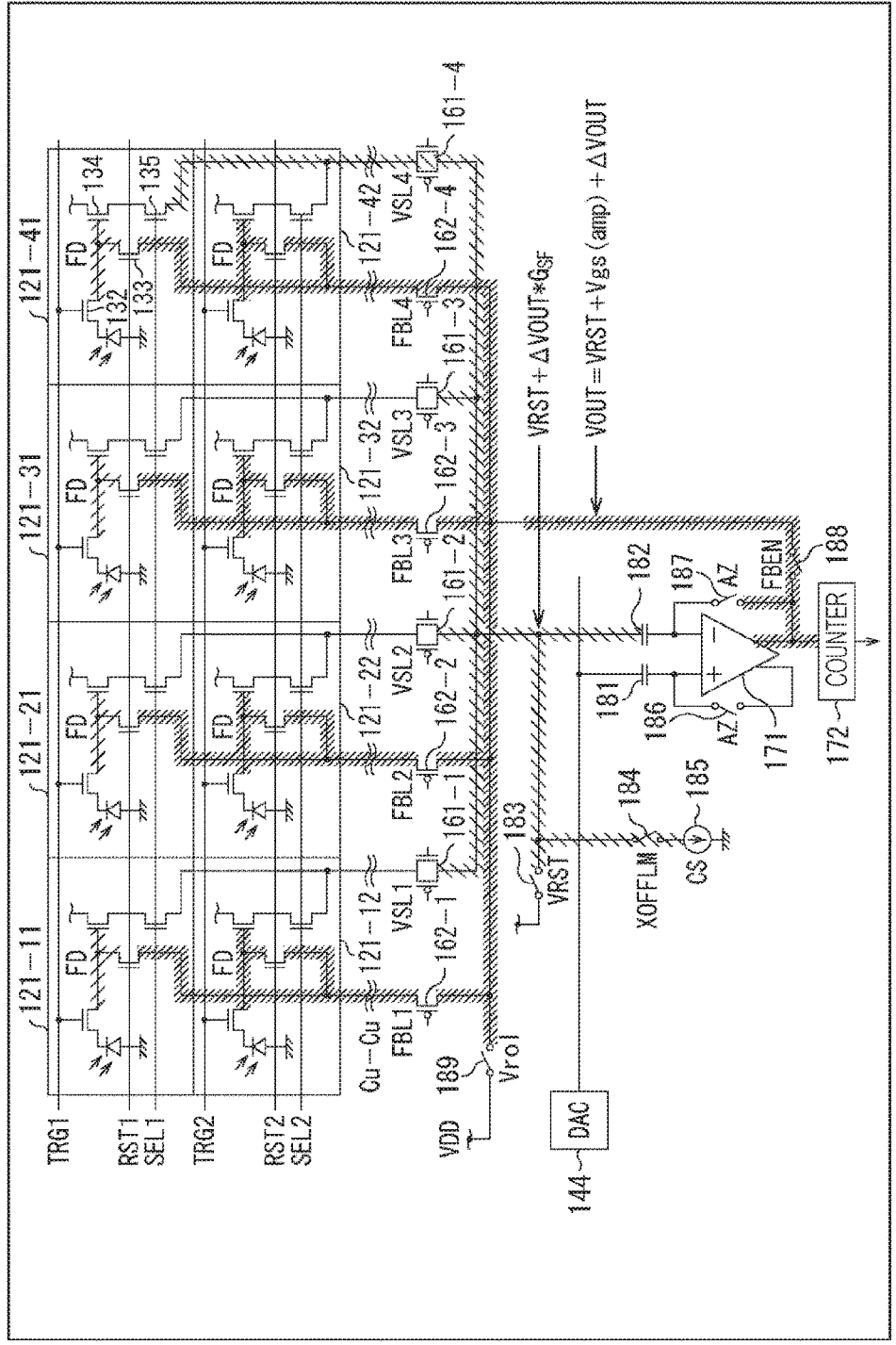
FIG. 20 is a view illustrating an example of a state at time T18.

Then, when the processes from time T11 to time T18 are performed, as illustrated in FIG. 20, the potential [VOUT+ ΔVnoise(FBL)] is maintained as the reset level in the floating diffusion (FD) and the feedback line (FBL) from the floating diffusion (FD) to the FBL switch 162 of each of the unit pixels 121-12 to 121-42.

As described above, when the output of the comparing unit 171 is fed back to all the unit pixels 121 of the current row, the reset control signal (φRST2) is turned off (time T19, step S129). According to this, the floating diffusion (FD) of each of the unit pixels 121-12 to 121-42 is reset.

Figure 21:
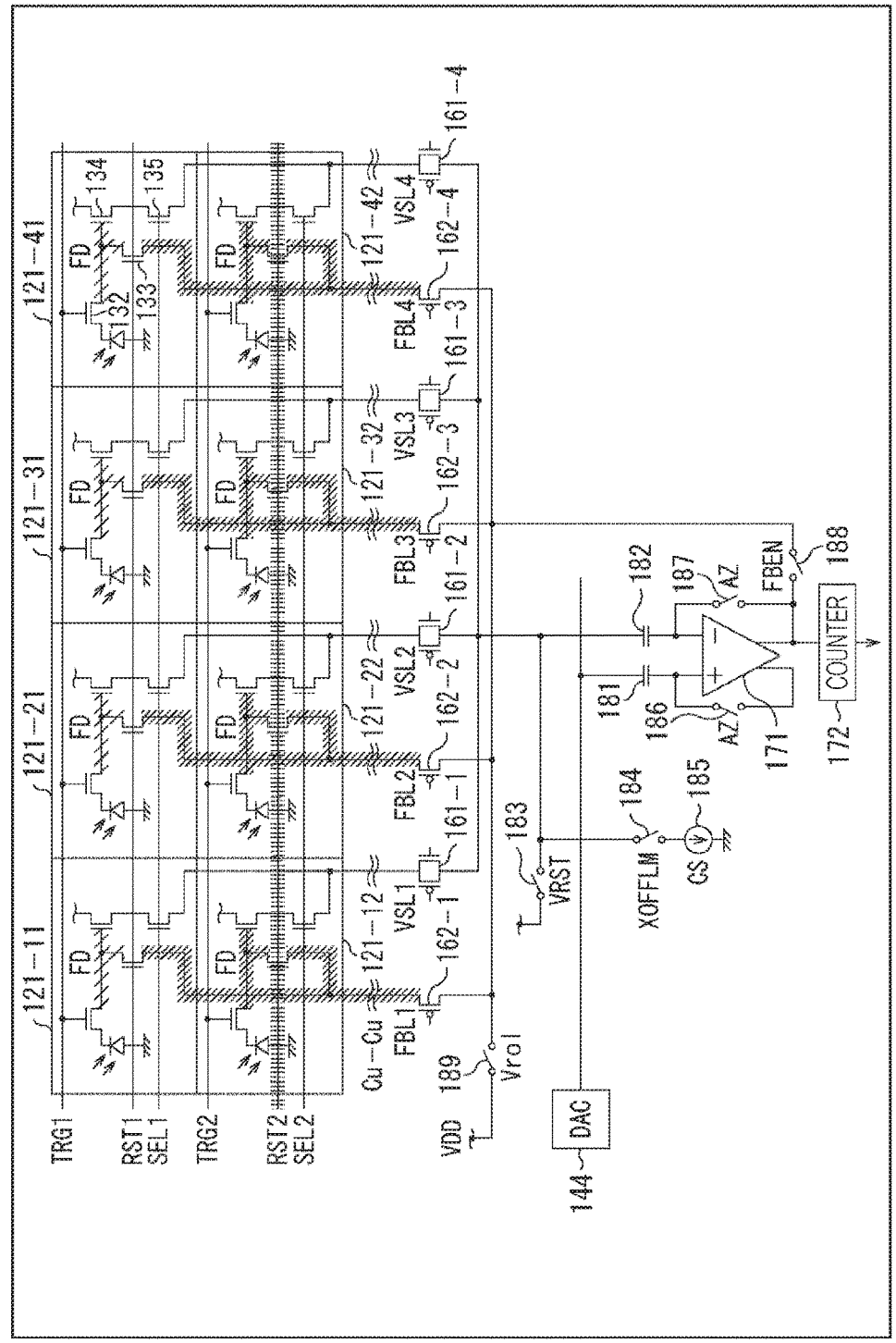
FIG. 21 is a view illustrating an example of a state at time T19.

According to this, as illustrated in FIG. 21, the reset transistor of each unit pixel 121 is turned off and the potential [VOUT+ΔVnoise (FBL)+ΔVnoise(RST)] is maintained in the floating diffusion (FD) of each of the unit pixels 121-12 to 121-42. According to this, the variation in the threshold voltage Vth of the amplification transistor among the unit pixels 121 decreases.

Therefore, the image sensor 100 may inhibit the variation in the threshold voltage Vth of the amplification transistor 134 among the pixels. According to this, the image sensor 100 may inhibit the deterioration in image quality of the captured image. That is to say, the present technology may also be applied to the image sensor including the area A/D converter.

Also, providing the FBL switch 162 makes it unnecessary to prepare as many reset control lines (RST) as the pixel columns, so that it becomes possible to freely set the number of pixel columns to be fed back for one amplifier (comparing unit 171). That is to say, the number of wires becomes significantly small, so that a degree of freedom in layout of a wiring layer may increase.

Furthermore, the present technology may be realized by providing the FBL switch 162 as described above and driving the same as described above, so that the increase in the circuit scale may be inhibited. Also, as illustrated in FIG. 7, the FBL switch 162 may be arranged out of the pixel area (pixel array 101). Therefore, the present technology may be realized without changing the number of transistors in the pixel. Therefore, the present technology may be more easily applied and the increase in the cost may be inhibited.

Also, applying the present technology inhibits the variation in potential among the vertical signal lines (VSLs), so that a D range of a load MOS being the current source may be made narrower.

<Flow of Preset Read Phase Process>

Next, an example of a flow of the preset read phase process executed at step S103 in FIG. 8 is described with reference to a flowchart in FIG. 22.

When the preset read phase process starts, the control unit 110 controls the area scanning unit 111 and selects the unit pixel row (row of the unit pixels 121) not yet processed of the current pixel unit 120 as the target to be processed at step S151. For example, the area scanning unit 111 turns on the select control signal (SEL) of any row out of the unit pixel rows not yet processed.

At step S152, the control unit 110 controls the A/D conversion control unit 113 and the like to execute the auto zero process (AZ). For example, the A/D conversion control unit 113 turns on the AZ connection control signal (AZ) for the area A/D converter 143 corresponding to the current pixel unit 120. Also, the A/D conversion control unit 113 turns on the VRST connection control signal (VRST) of the area A/D converter 143.

At step S153, the control unit 110 controls the A/D conversion control unit 113 to read the kTC noise. For example, the A/D conversion control unit 113 inputs the ramp wave (RAMP) generated by the D/A converter (DAC) 144 to the DAC side input terminal of the comparing unit 171 with the VRST connection control signal (VRST) maintained in the on-state and compares the same with the power source potential VRST.

When the comparison ends, at step S154, the control unit 110 controls the VSL connection control unit 112 to select the unit pixel column (column of the unit pixels 121) not yet processed as the target to be processed. For example, the VSL connection control unit 112 turns on any VSL connection control signal (VSL) of the current pixel unit 120. According to this, one unit pixel 121 out of the current unit pixel row is selected as a target to be processed.

At step S155, the control unit 110 controls the VSL connection control unit 112 and the A/D conversion control unit 113 to read the reset level from the current unit pixel 121. For example, the A/D conversion control unit 113 inputs the ramp wave (RAMP) generated by the D/A converter (DAC) 144 to the DAC side input terminal of the comparing unit 171 as the reference voltage and compares the reset level read from the current unit pixel 121 with the reference voltage (ramp wave (RAMP)).

When the comparison ends, at step S156, the control unit 110 determines whether all the unit pixel columns of the current unit pixel row of the current pixel unit 120 are processed. When it is determined that there is the unit pixel column not yet processed, the procedure returns to step S152 and subsequent processes are repeated. Also, when it is determined that all the unit pixel columns of the current unit pixel row are processed at step S156, the procedure shifts to step S157.

At step S157, the control unit 110 controls the area scanning unit 111 to deselect the current row selected at step S151. For example, the area scanning unit 111 turns off the select control signal (SEL) which is turned on at step S151.

At step S158, the control unit 110 determines whether all the unit pixel rows of the current pixel unit 120 are processed. When it is determined that there is the unit pixel row not yet processed, the procedure returns to step S151 and subsequent processes are repeated. Also, at step S158, when it is determined that all the unit pixel rows of the current pixel unit 120 (that is to say, all the unit pixels 121 of the current pixel unit 120) are processed, the preset read phase process ends and the procedure returns to FIG. 8.

That is to say, the processes at steps S151 to S158 are performed for each unit pixel row of the current pixel unit 120. When all the unit pixel rows are processed, the procedure shifts to a next phase (charge transfer).

<Timing Chart of Preset Read Phase>

Figure 23:
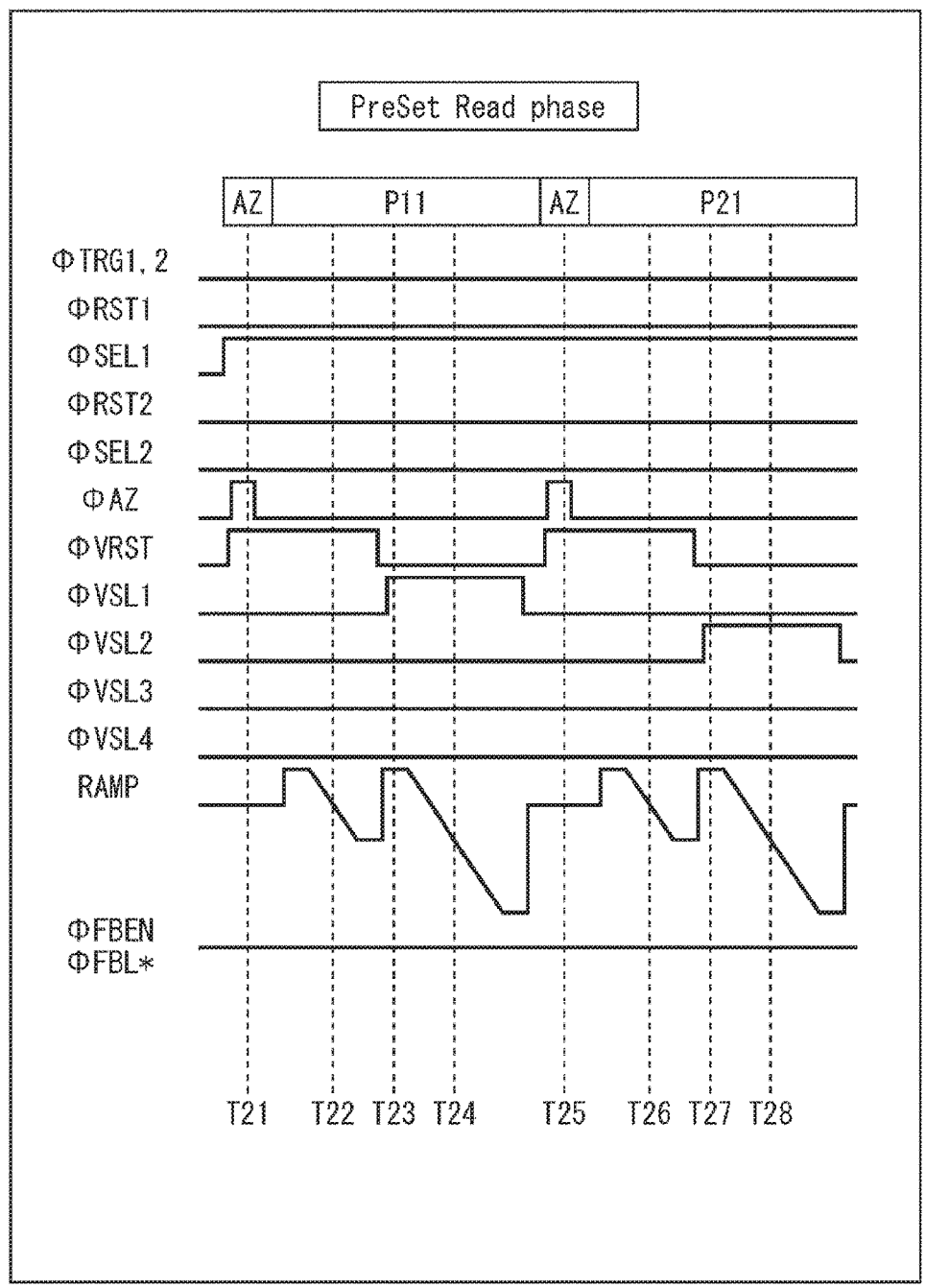
FIG. 23 is a timing chart illustrating an example of a state of a preset read phase.

FIG. 23 is a timing chart illustrating an example of the flow of the preset read phase process for the unit pixels 121-11 and 121-21 of the pixel unit 120.

In this case, as illustrated in FIG. 23, the select control signal (φSEL1) is turned on (step S151)

Thereafter, the auto zero process (AZ) is performance at time T21 (step S152). At that time, the AZ connection control signal (φAZ) and the VRST connection control signal (φVRST) are turned on.

Figure 24:
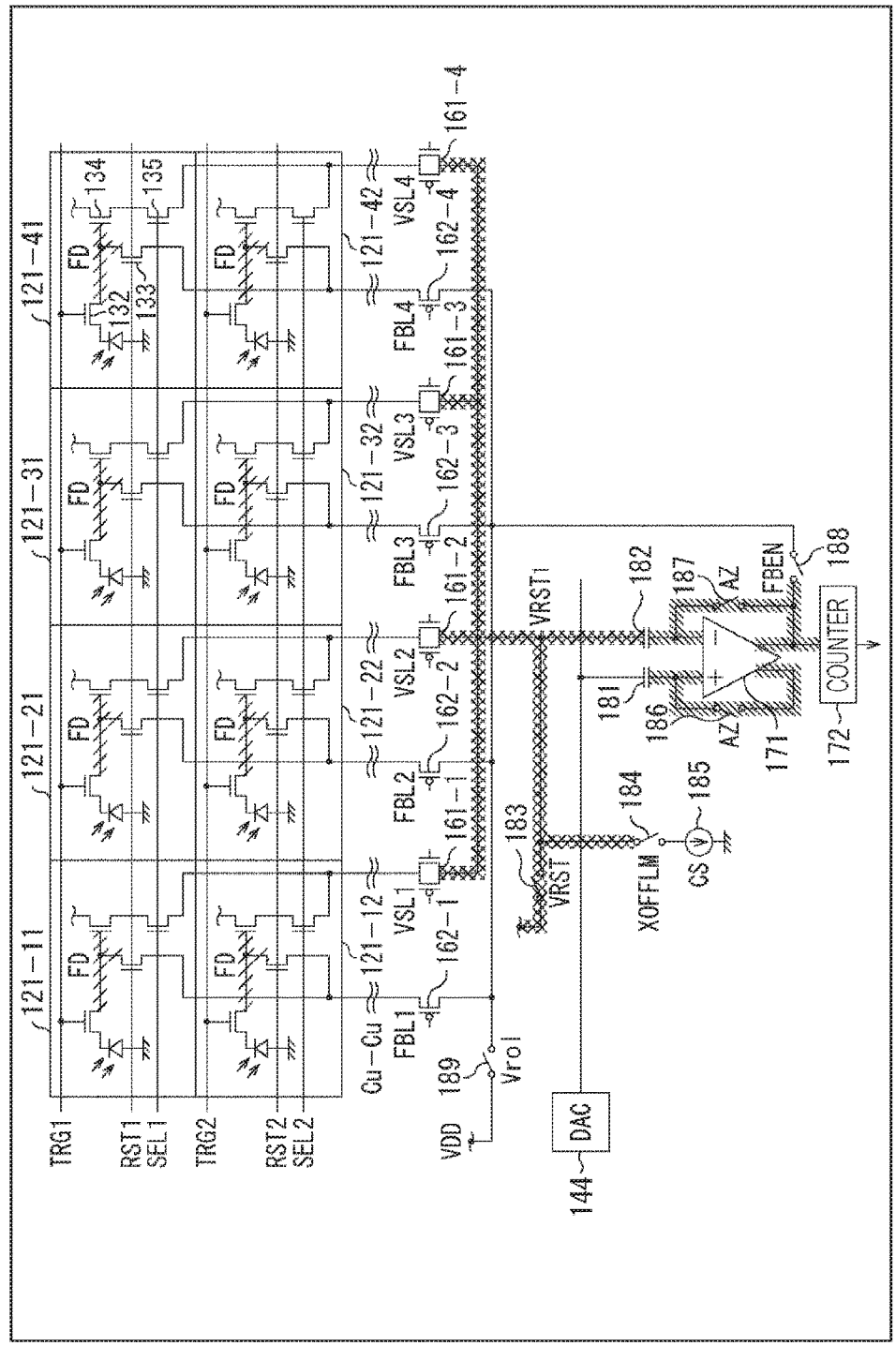
FIG. 24 is a view illustrating an example of a state at time T21.

According to this, as illustrated in FIG. 24, the input and the output of the comparing unit 171 are short-circuited and the power source potential VRST is applied between the VSL switch 161 of the vertical signal line (VSL) and the capacitor 182 (that is to say, to the VSL side input terminal of the comparing unit 171).

Figure 25:
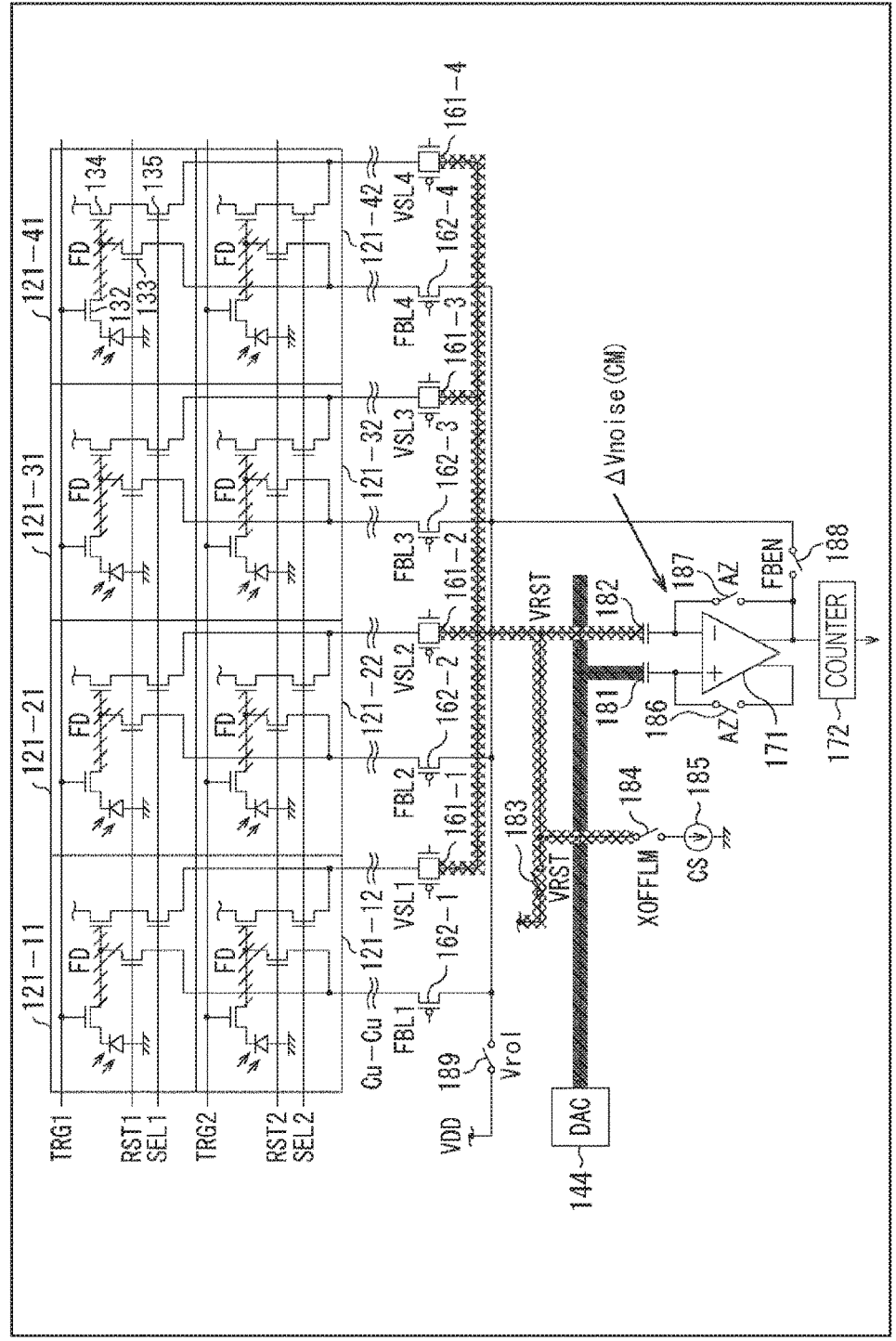
FIG. 25 is a view illustrating an example of a state at time T22.

At time T22, the kTC noise is read (step S153). At that time, the ramp wave (reference voltage) supplied from the D/A converter (DAC) 144 is input to the DAC side input terminal of the comparing unit 171 with the VRST connection control signal (φVRST) maintained in the on-state, that is to say, with the power source potential VRST being applied to the VSL side input terminal of the comparing unit 171 as illustrated in FIG. 25. That is to say, the power source potential VRST is compared with reference potential (ramp wave). According to this, the kTC noise (ΔVnoise(CM)) is read.

Figure 26:
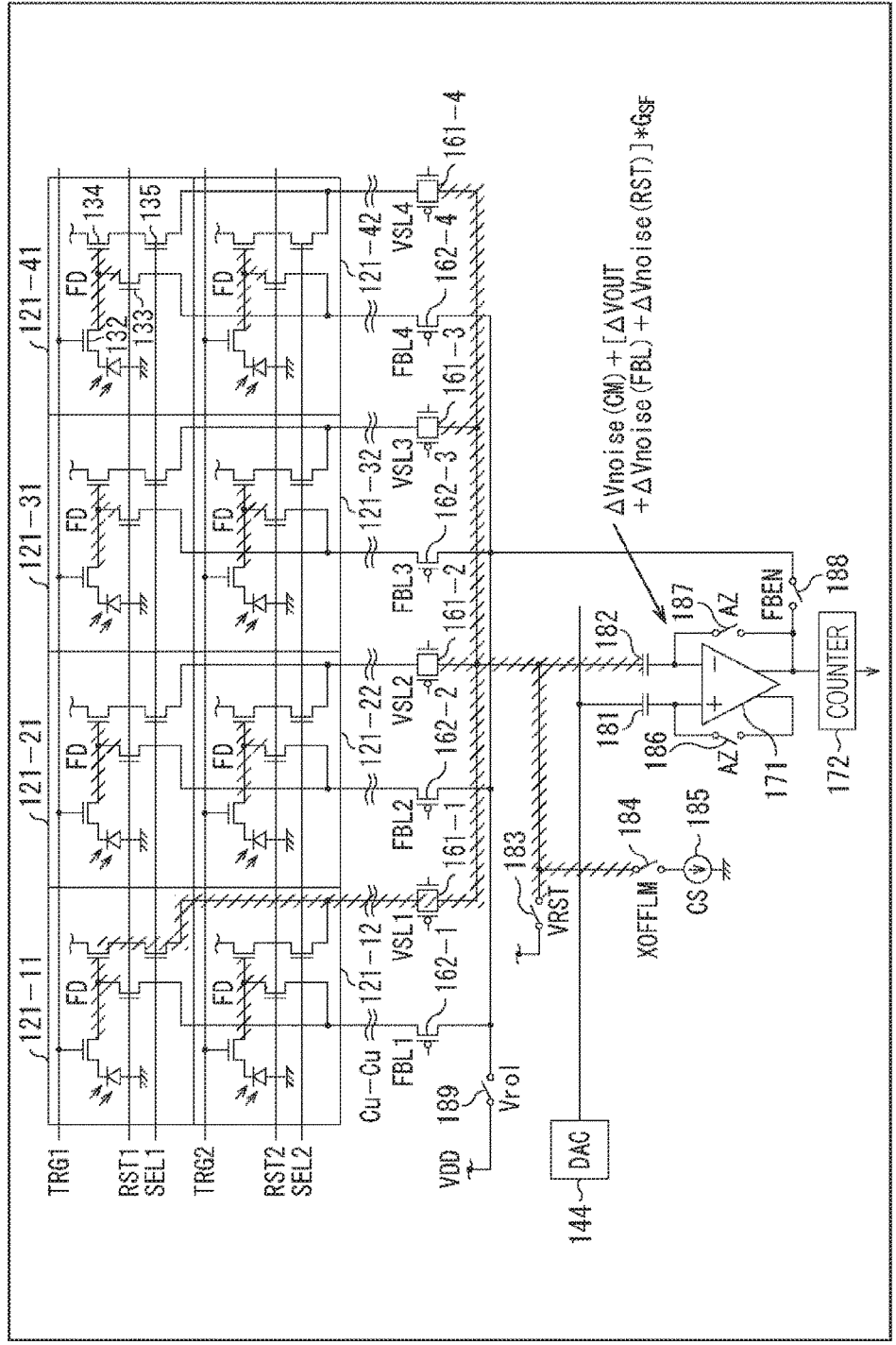
FIG. 26 is a view illustrating an example of a state at time T23.

Next, the current unit pixel column is selected at time T23 (step S154). At that time, the VRST connection control signal (φVRST) is turned off and the VSL connection control signal (φVSL1) corresponding to the current unit pixel 121-11 is turned on. That is to say, as illustrated in FIG. 26, the reset level maintained in the floating diffusion (FD) of the unit pixel 121-11 is transmitted to the VSL side input terminal of the comparing unit 171. Therefore, voltage at the VSL side input terminal of the comparing unit 171 becomes [ΔVnoise (CM)+[ΔVOUT+ΔVnoise(FBL)+ΔVnoise(RST)] *$G_{SF}$]. Meanwhile, although a capacitance ratio is multiplied since the capacitor 182 intervenes, the capacitance ratio is sufficiently close to "1", so that this may be omitted.

Figure 27:
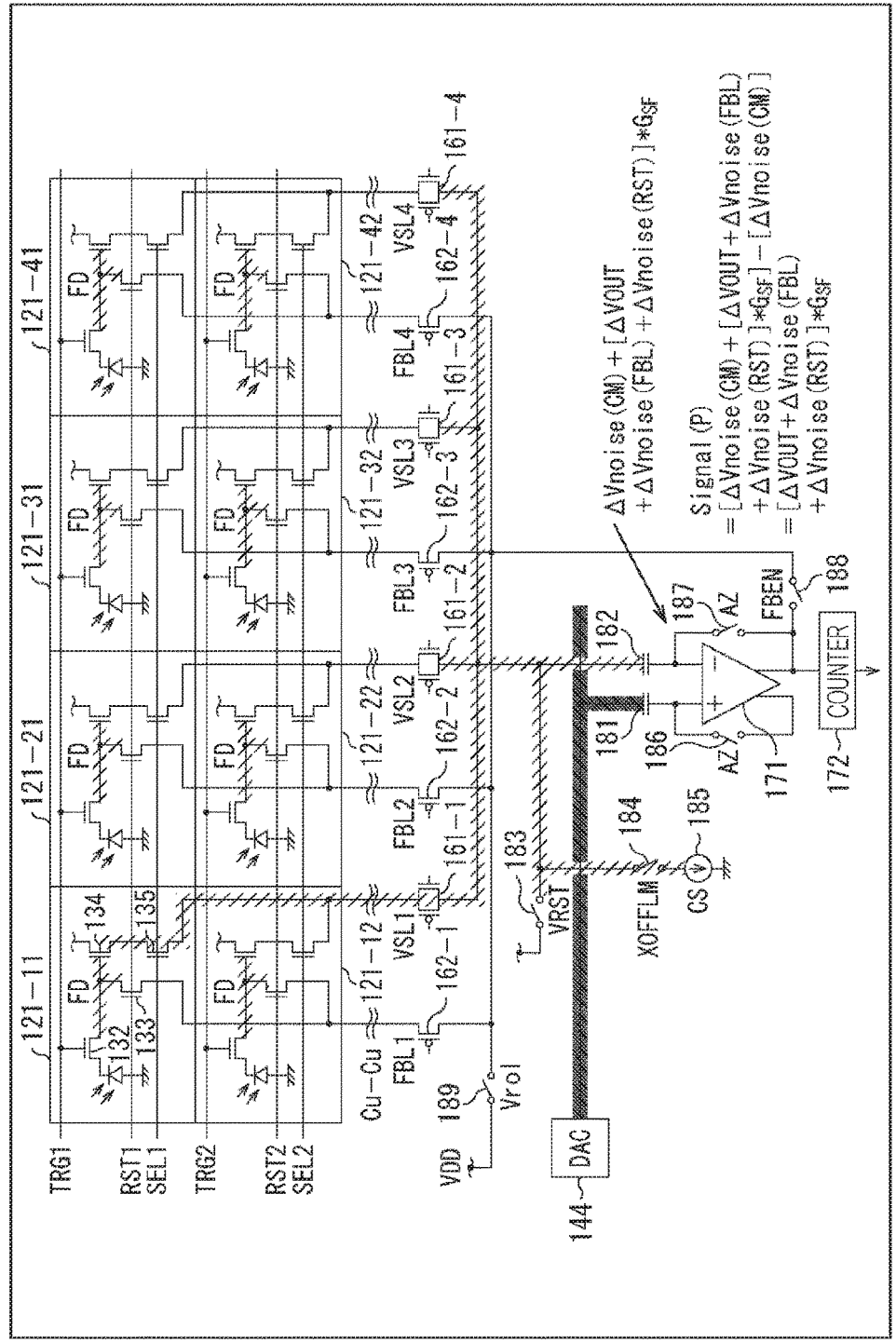
FIG. 27 is a view illustrating an example of a state at time T24.

At time T24, the reset level is read from the current unit pixel (step S155). That is to say, as illustrated in FIG. 27, the ramp wave (reference voltage) supplied from the D/A converter (DAC) 144 is input to the DAC side input terminal of the comparing unit 171 and the reset level of the unit pixel 121-11 is compared with the reference potential (ramp wave).

The voltage at the VSL side input terminal of the comparing unit 171 at that time becomes [ΔVnoise (CM) [ΔVOUT+ΔVnoise(FBL)+ΔV noise (RST)|$G_{SF}$]. Therefore, a signal level (Signal (P)) of the signal read from the unit pixel 121-11 is represented by following equation (3).

$$\text{Signal}(P)=[\Delta V\text{noise}(CM)+[\Delta V\text{OUT}+\Delta V\text{noise}(FBL)+ \\ \Delta V\text{noise}(RST)]^{*}G_{SF}]-[\Delta V\text{noise}(CM)]= \\ [\Delta V\text{OUT}+\Delta V\text{noise}(FBL)+\Delta V\text{noise}(RST)]^{*}G_{SF} \quad (3)$$

Figure 28:
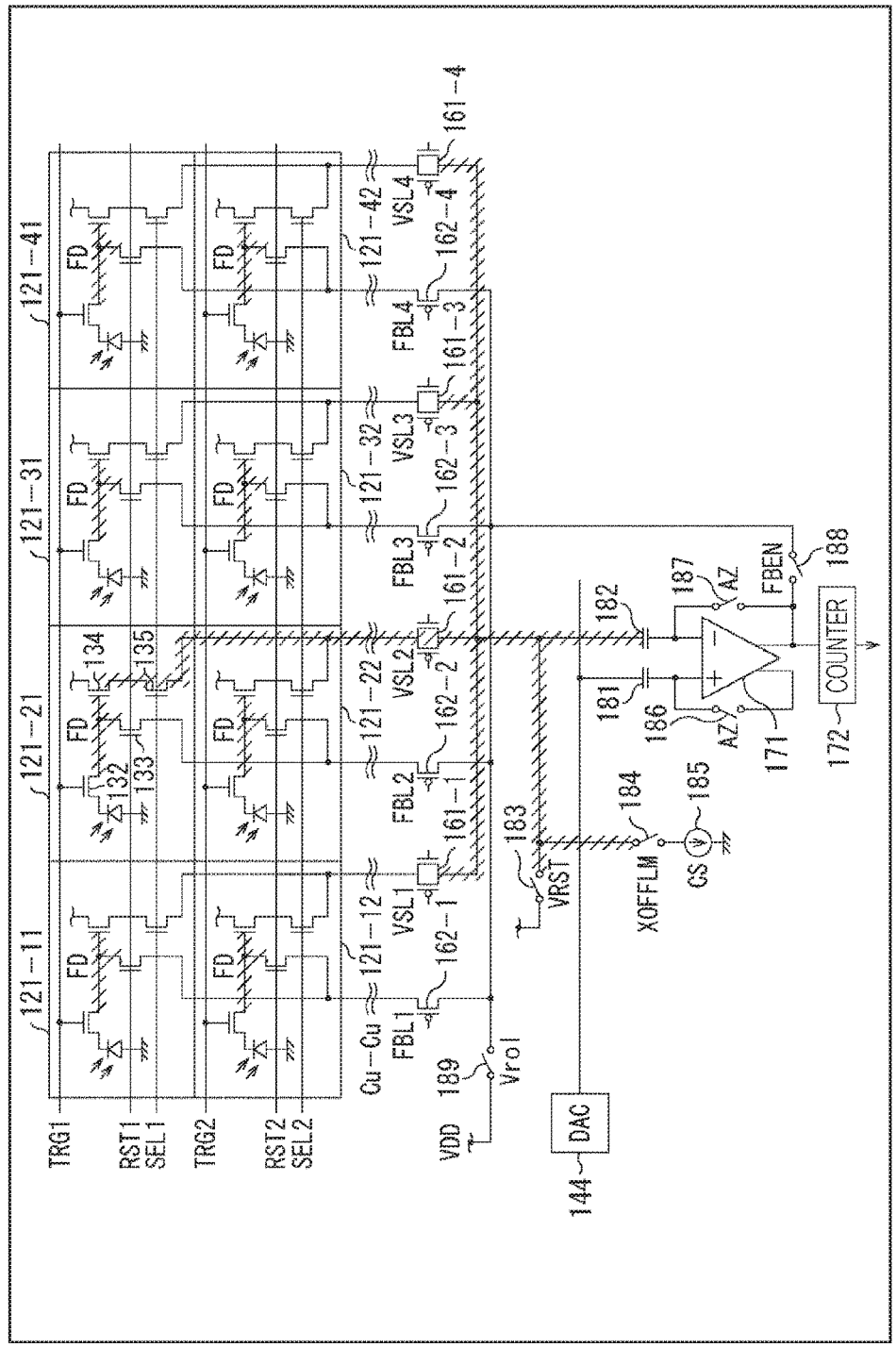
FIG. 28 is a view illustrating an example of a state at time T27.

Next, the similar process is repeated for the unit pixel 121-21 from time T25 to time T28. For example, at time T27, as illustrated in FIG. 28, the VSL connection control signal (φVSL2) is turned on and the reset level maintained in the floating diffusion (FD) of the unit pixel 121-21 is transmitted to the VSL side input terminal of the comparing unit 171.

Figure 29:
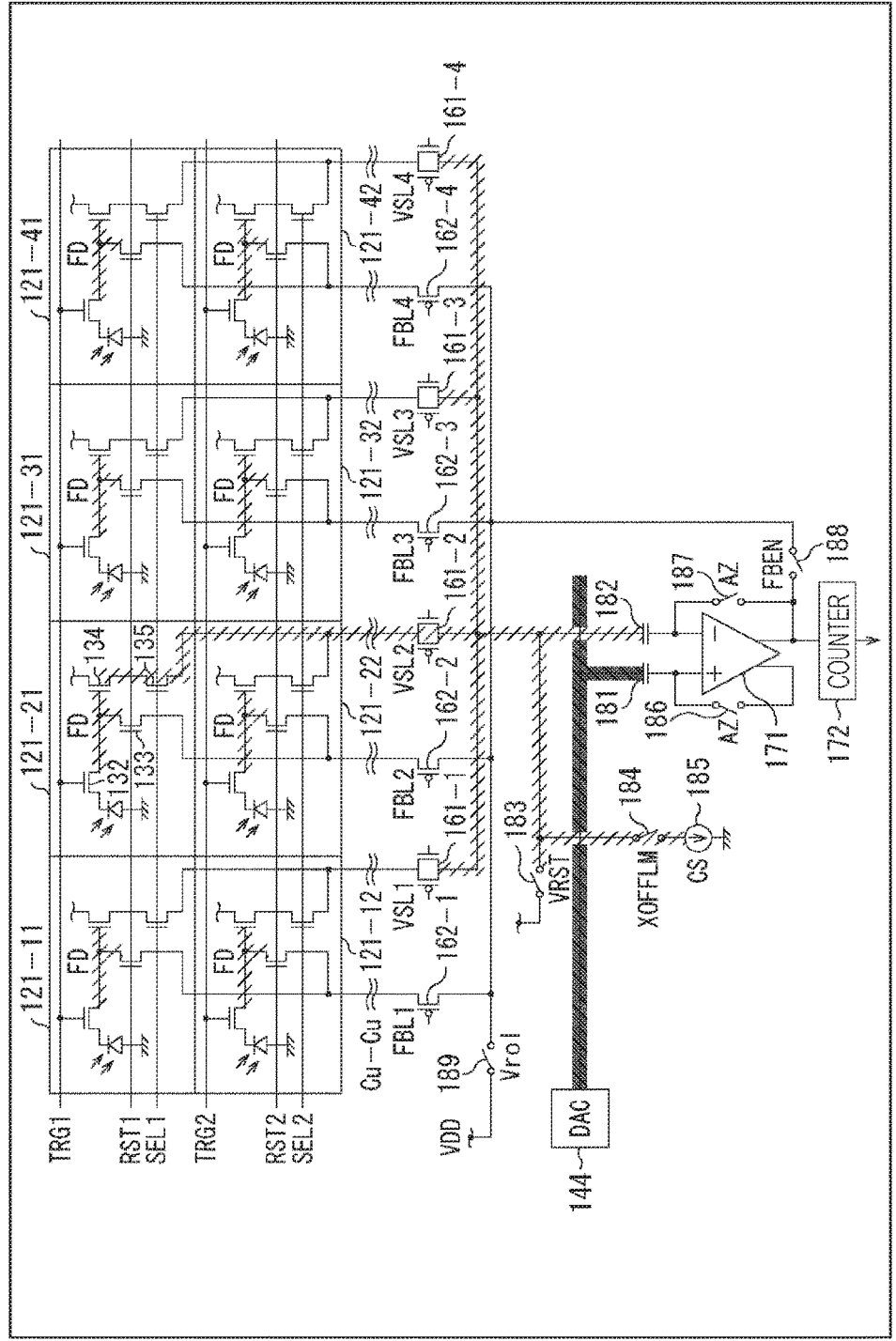
FIG. 29 is a view illustrating an example of a state at time T28.

Then, at time T28, as illustrated in FIG. 29, the ramp wave (reference voltage) supplied from the D/A converter (DAC) 144 is input to the DAC side input terminal of the comparing unit 171 and the reset level of the unit pixel 121-21 is compared with the reference potential (ramp wave).

Figure 30:
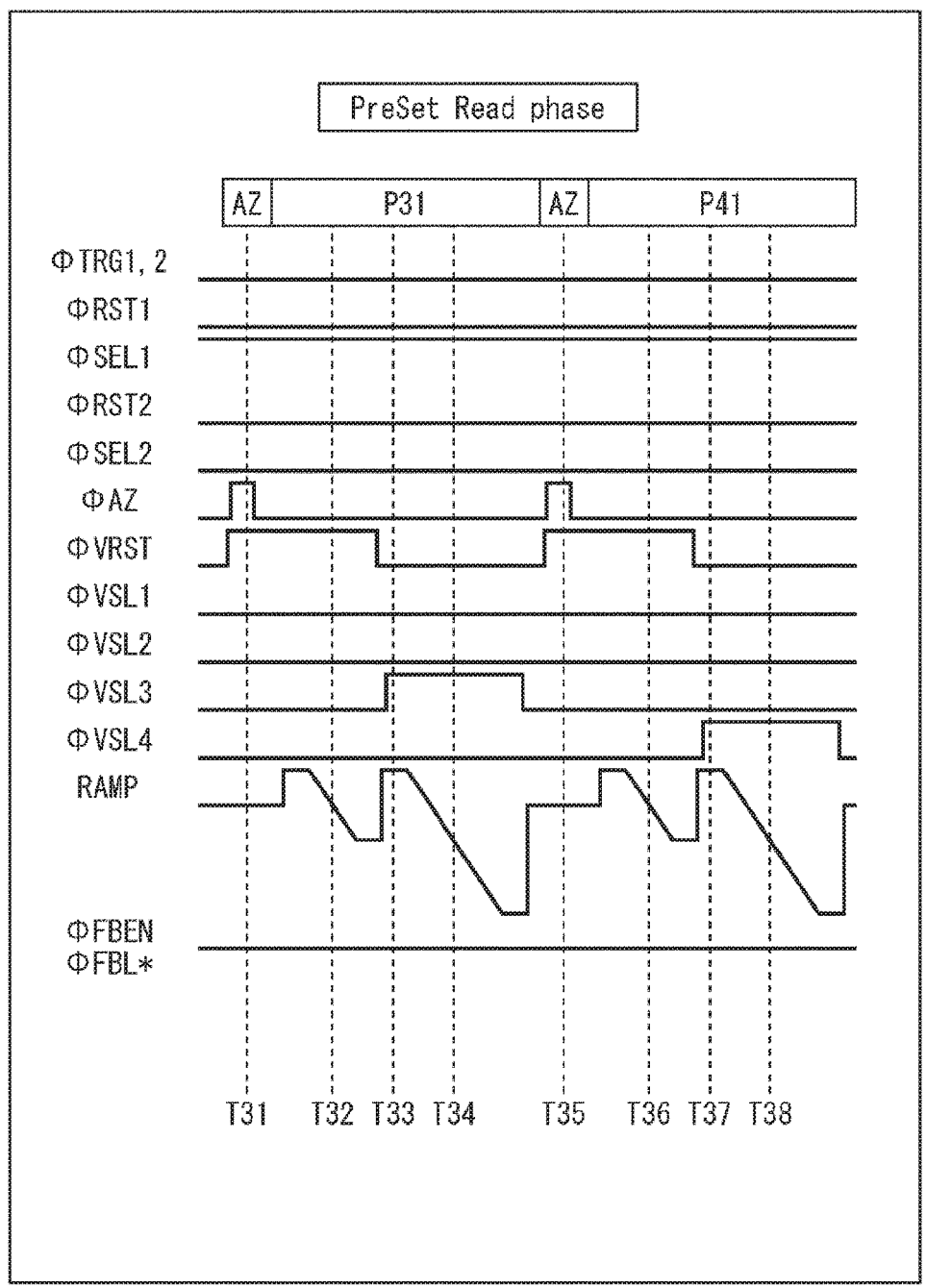
FIG. 30 is a timing chart illustrating an example of the state of the preset read phase.

FIG. 30 is a timing chart illustrating an example of the flow of the preset read phase process for the unit pixels 121-31 and 121-41 of the pixel unit 120. As illustrated in FIG. 30, the process similar to that for the unit pixel 121-11 is repeated for each of the unit pixels 121-31 and 121-41.

Figure 31:
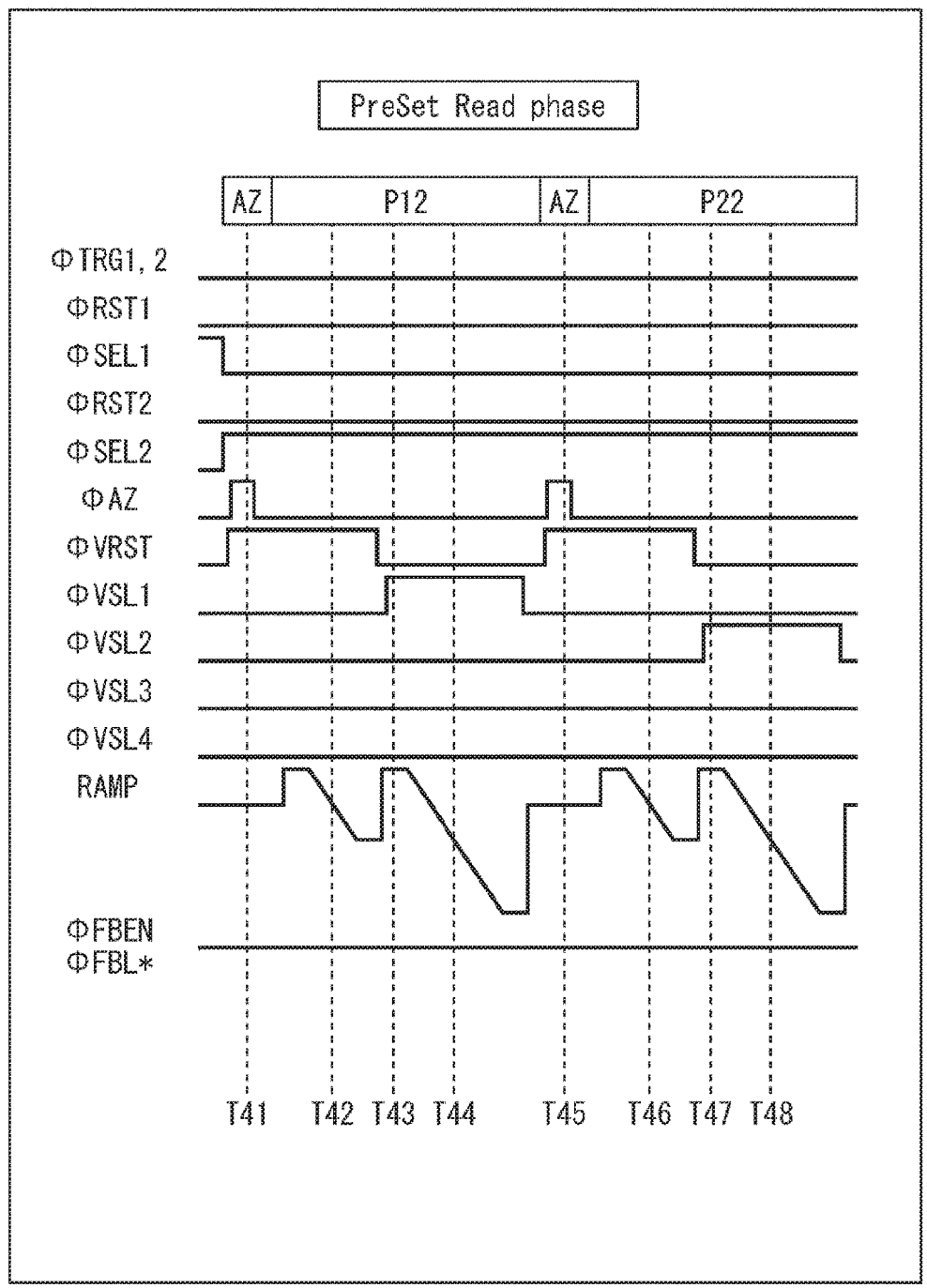
FIG. 31 is a timing chart illustrating an example of the state of the preset read phase.

FIG. 31 is a timing chart illustrating an example of the flow of the preset read phase process for the unit pixels 121-12 and 121-22 of the pixel unit 120. As illustrated in FIG. 31, the process similar to that for the unit pixel 121-11 is repeated for each of the unit pixels 121-12 and 121-22. However, in this case, the select control signal (φSEL2) is turned on (step S151)

Figure 32:
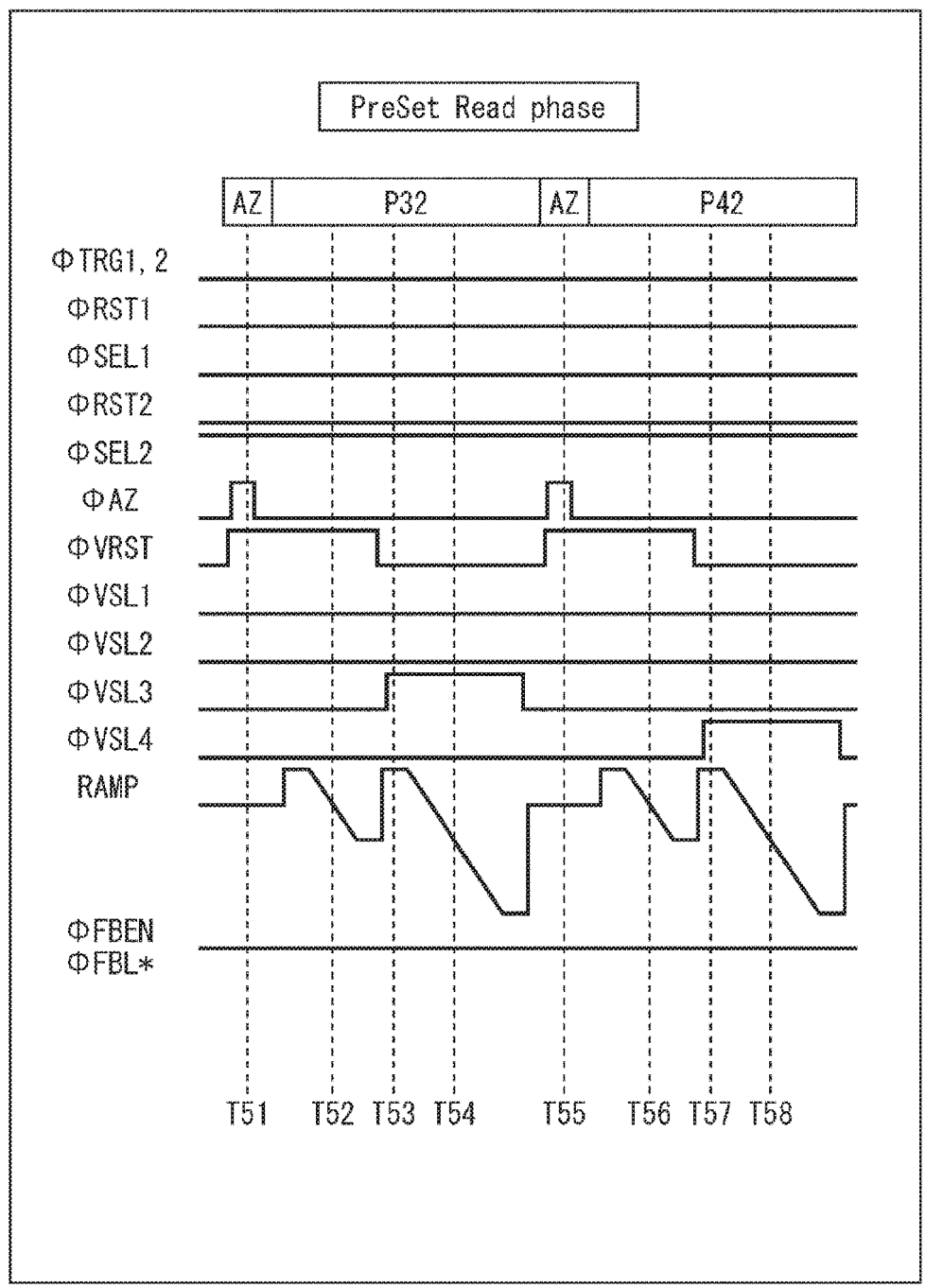
FIG. 32 is a timing chart illustrating an example of the state of the preset read phase.

FIG. 32 is a timing chart illustrating an example of the flow of the preset read phase process for the unit pixels 121-32 and 121-42 of the pixel unit 120. As illustrated in FIG. 32, the process similar to that for the unit pixel 121-12 is repeated for each of the unit pixels 121-32 and 121-42.

<Charge Transfer>

Figure 33:
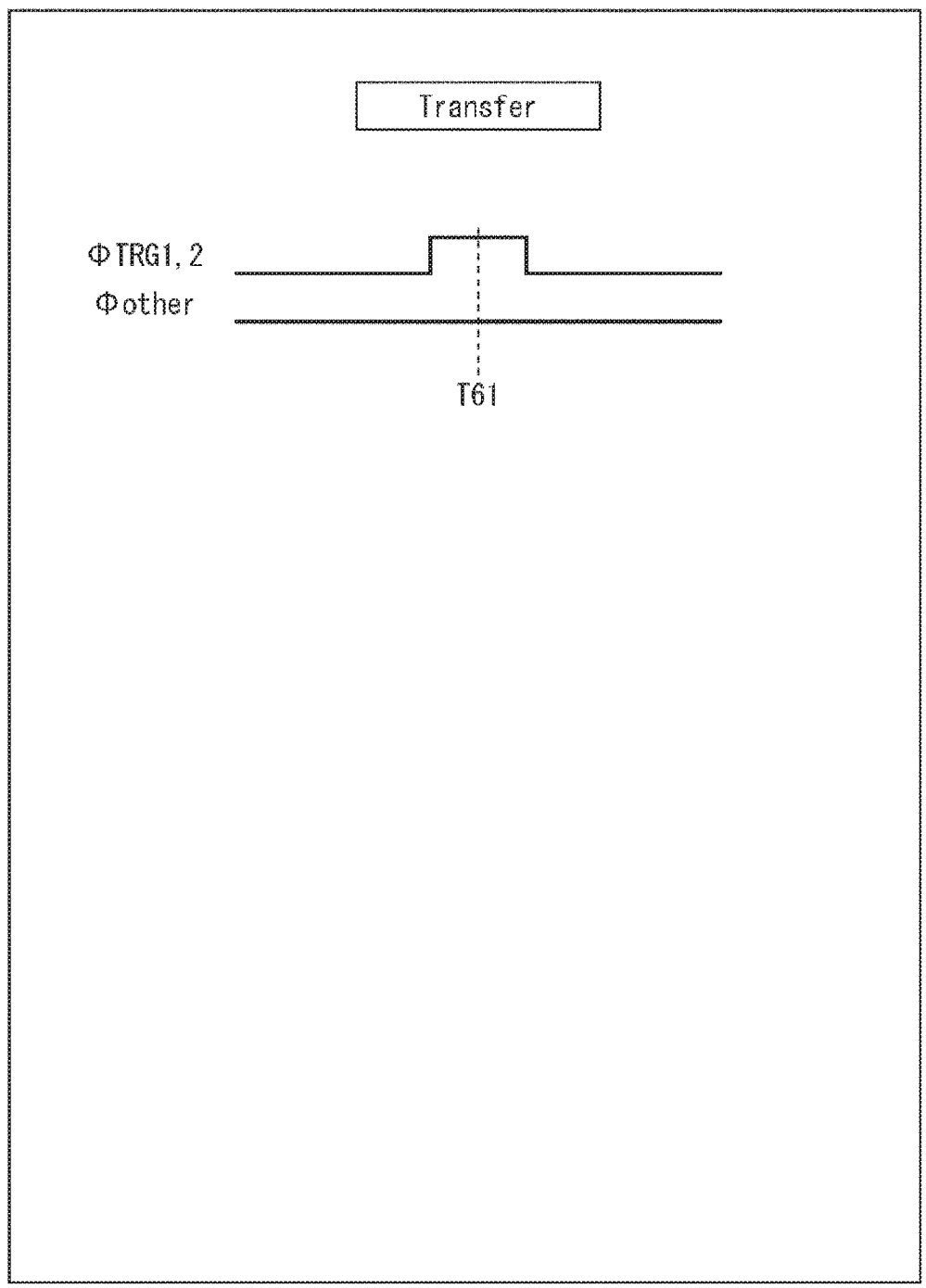
FIG. 33 is a timing chart illustrating an example of a state of transfer.

FIG. 33 is a timing chart illustrating an example of a state of the charge transfer performed at step S104 in FIG. 8.

Figure 34:
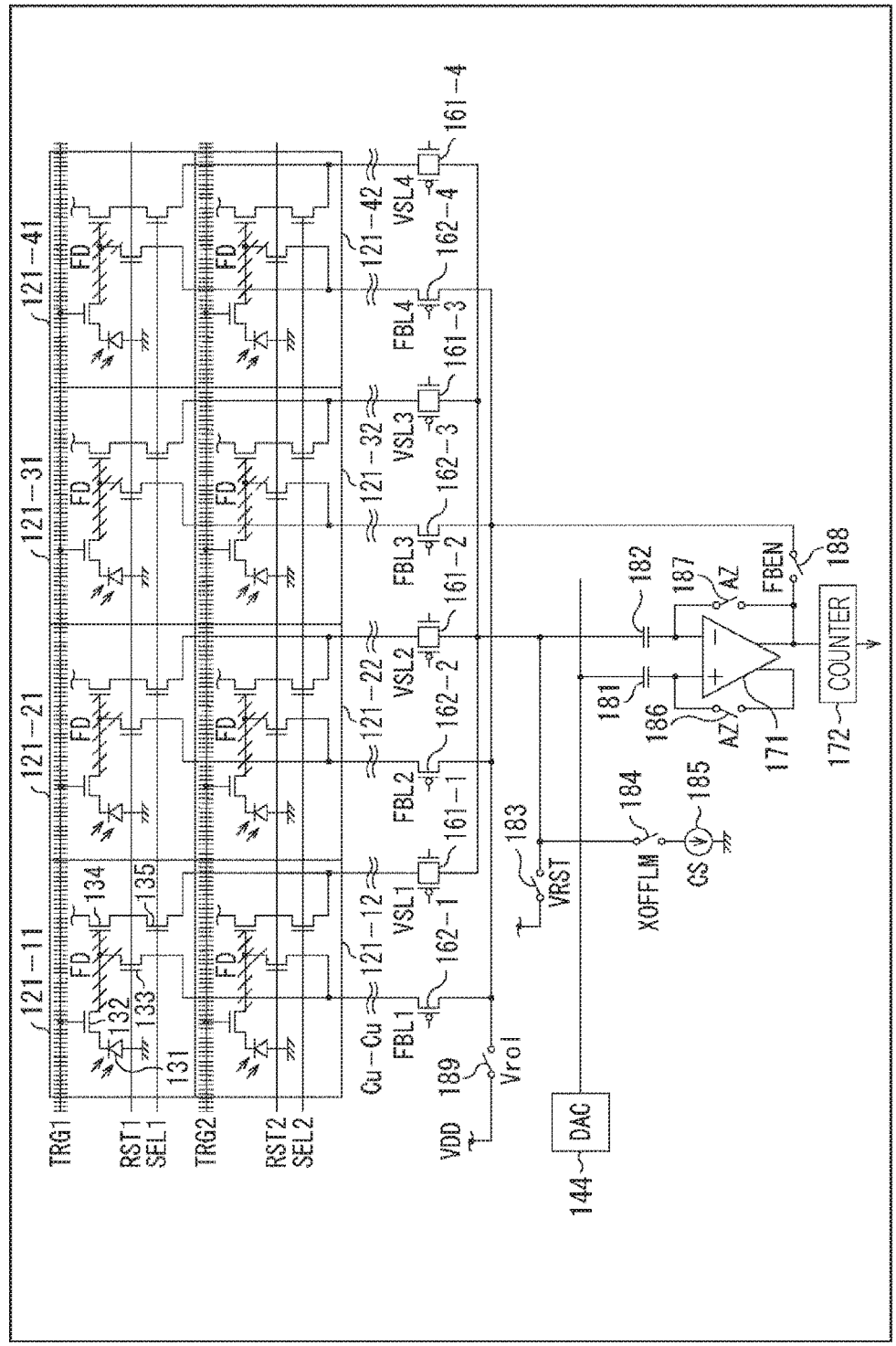
FIG. 34 is a view illustrating an example of a state at time T61.

As illustrated in FIG. 33, at time T61, the area scanning unit 111 turns on transfer control signals (φTRG1 and 2) of the unit pixel rows of the current pixel unit 120 and turns off other control signals. According to this, as illustrated in FIG. 34, the charge accumulated in the photo diode (PD) 131 is transferred to the floating diffusion (FD) in all the unit pixels 121 of the current pixel unit 120.

<Flow of Data Read Phase Process>

Next, an example of a flow of the data read phase process executed at step S105 in FIG. 8 is described with reference to a flowchart in FIG. 35

Figure 22:
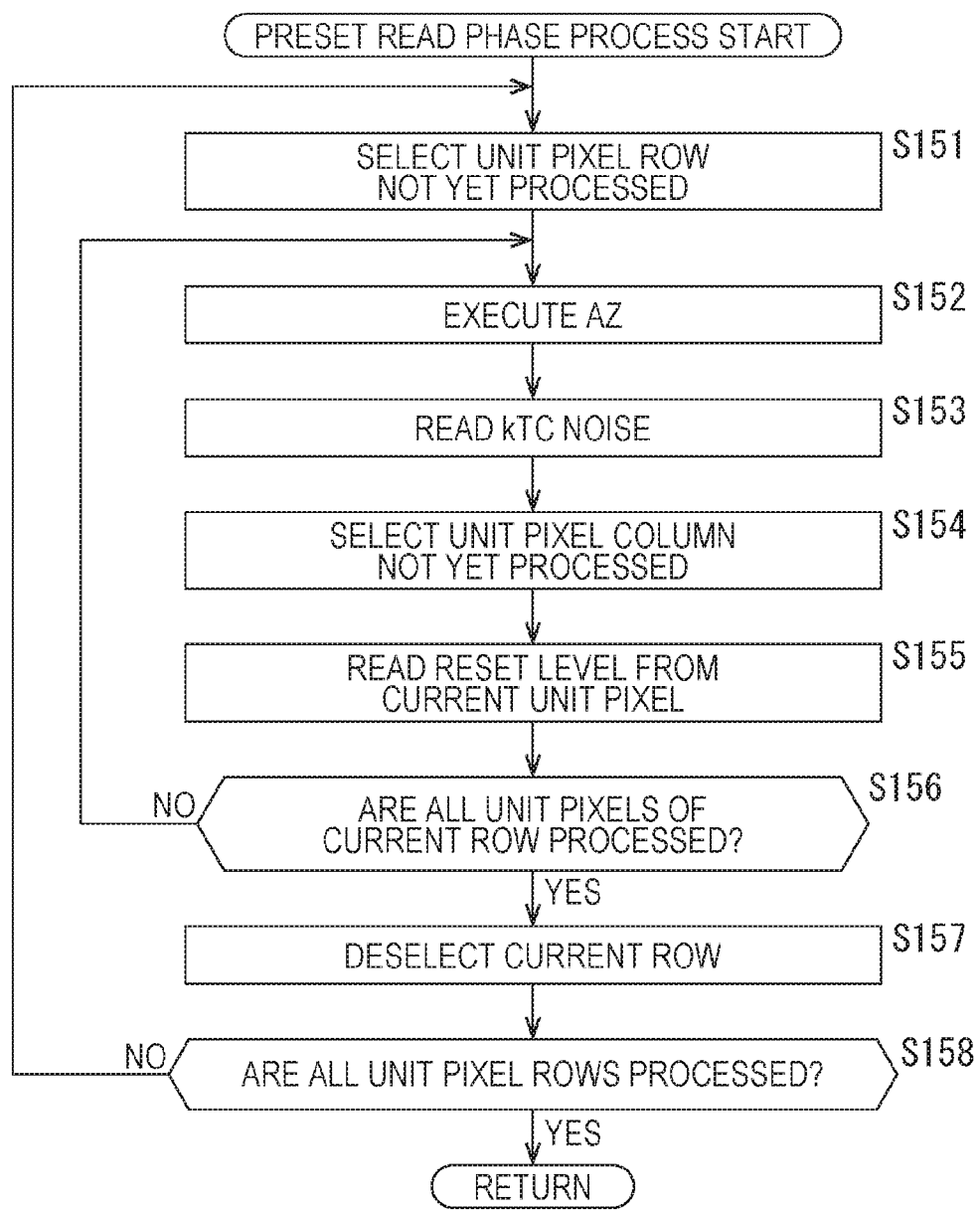
FIG. 22 is a flowchart illustrating an example of a flow of a preset read phase process.
Figure 35:
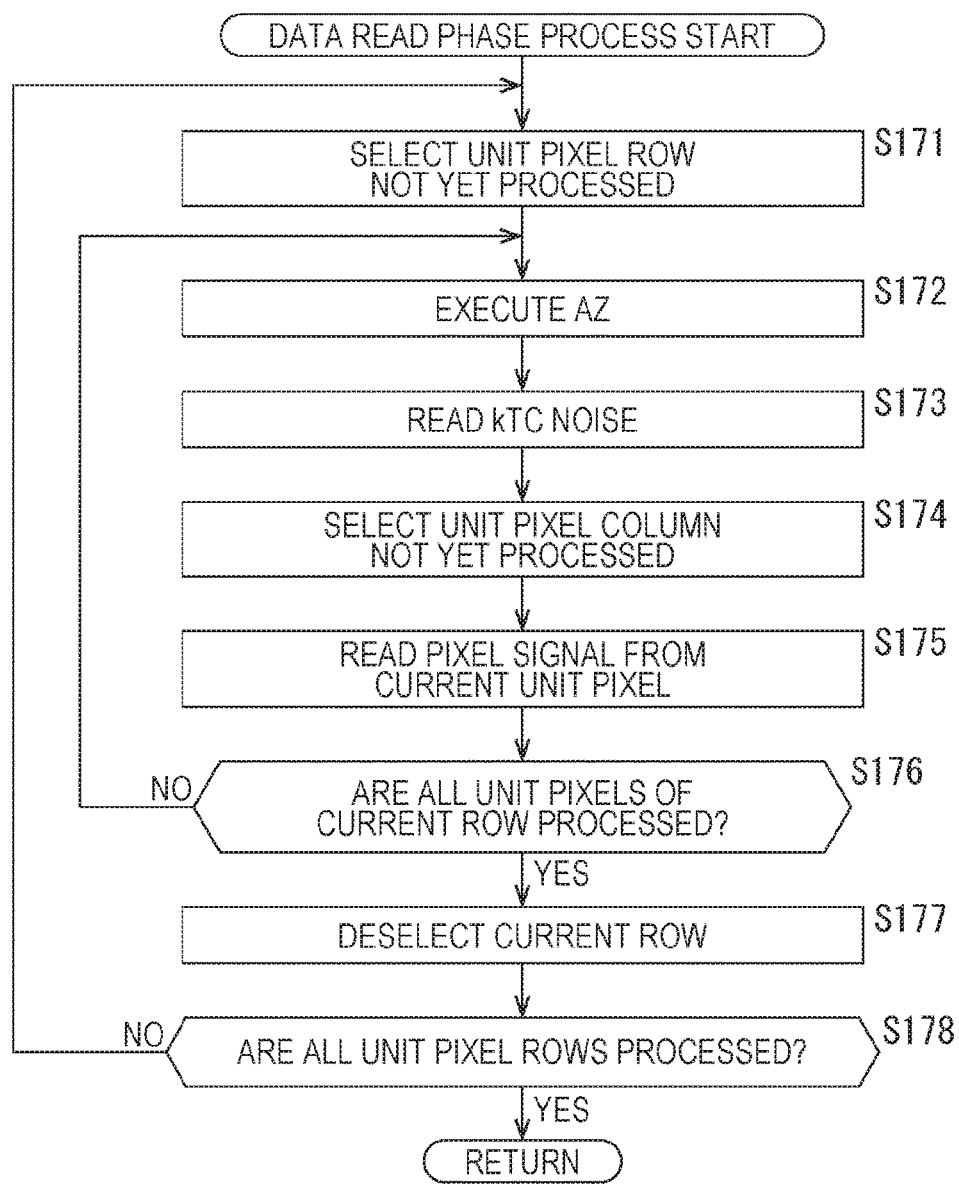
FIG. 35 is a flowchart illustrating an example of a flow of a data read phase process.

As illustrated in FIG. 35, the control unit 110 executes processes (steps S171 to S178) of the data read phase process as the processes (steps S151 to S158) of the preset read phase process (FIG. 22).

However, at step S175, the control unit 110 reads not the reset level but the pixel signal corresponding to the charge transferred from the photo diode (PD) 131 to the floating diffusion (FD) by the process at step S104 in FIG. 8 from the current unit pixel 121 and compares the same with the reference voltage (ramp wave).

<Timing Chart of Data Read Phase>

Figure 36:
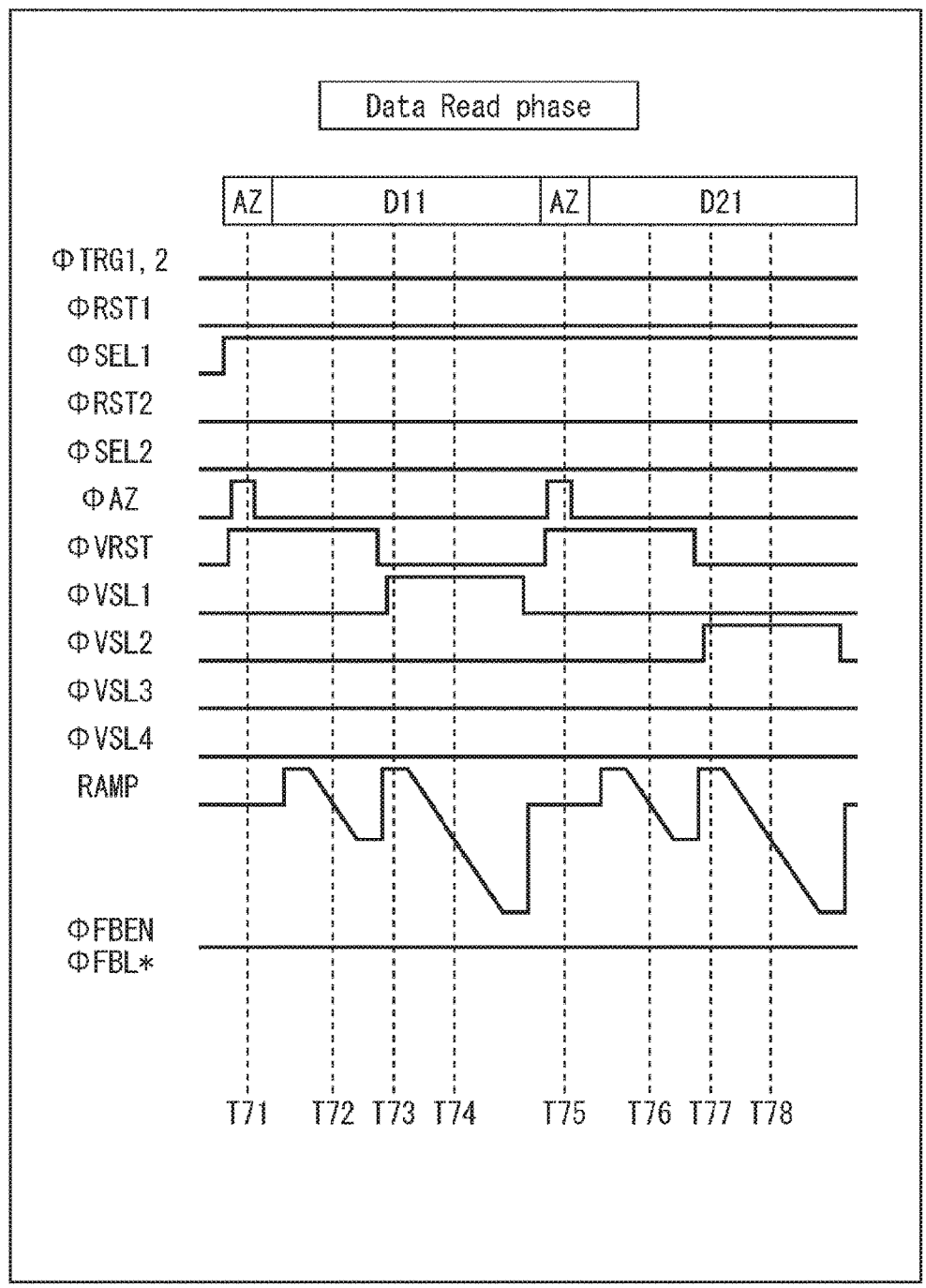
FIG. 36 is a timing chart illustrating an example of a state of a data read phase.

FIG. 36 is a timing chart illustrating an example of the flow of the data read phase process for the unit pixels 121-11 and 121-21 of the pixel unit 120.

As illustrated in FIG. 36, in this case, each process is executed as in the case of the preset read phase process illustrated in FIG. 23.

For example, the select control signal (φSEL1) is turned on (step S171), and the auto zero process (AZ) is performed at time T71 (step S172). At that time, an AZ connection control signal (φAZ) and a VRST connection control signal (φVRST) are turned on.

Figure 37:
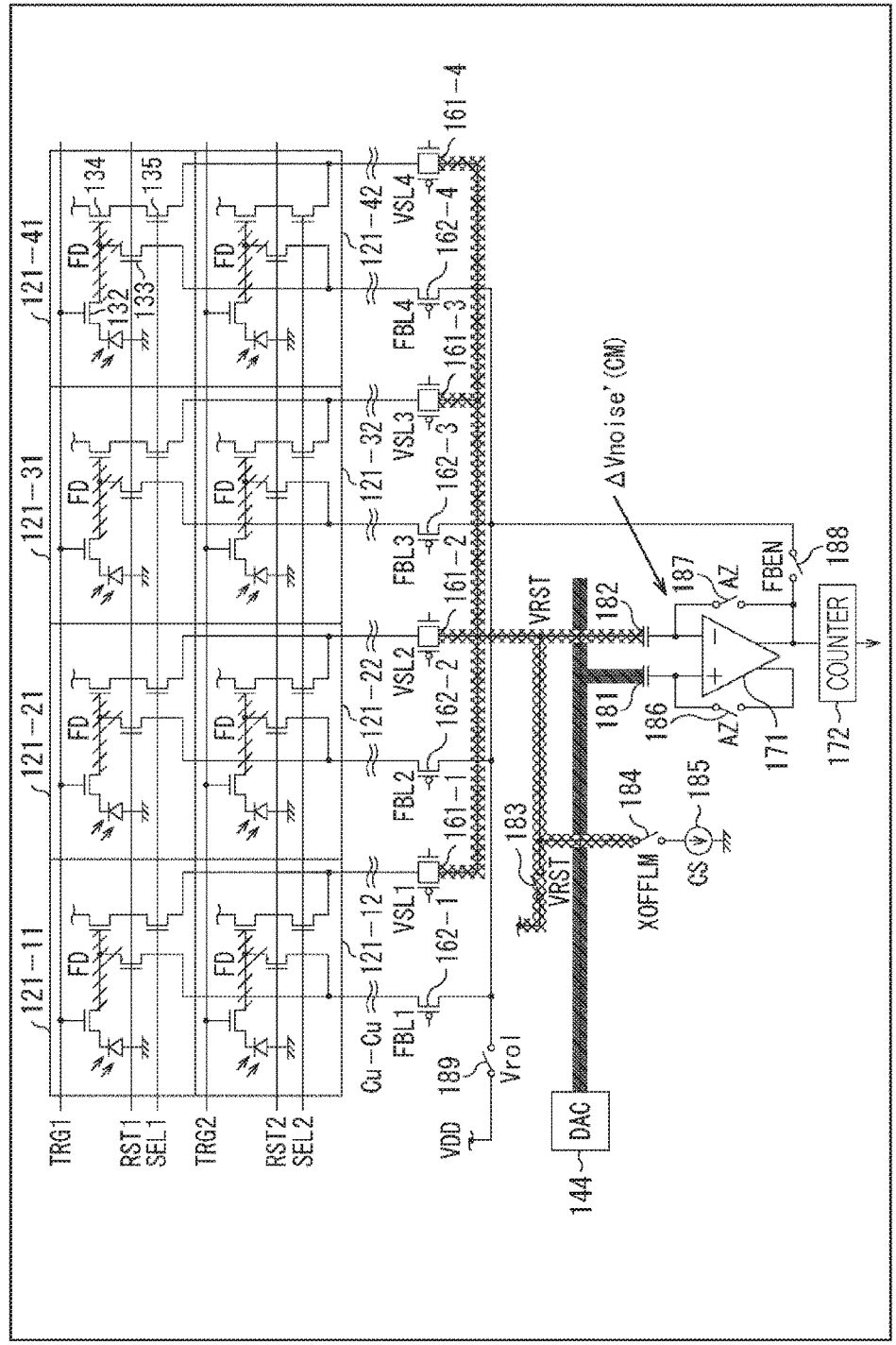
FIG. 37 is a view illustrating an example of a state at time T72.

Then, for example, at time T72, the kTC noise is read as illustrated in FIG. 37 (step S173). That is to say, the power source potential VRST is compared with the reference potential (ramp wave). According to this, kTC noise (ΔVnoise' (CM)) is read.

Figure 38:
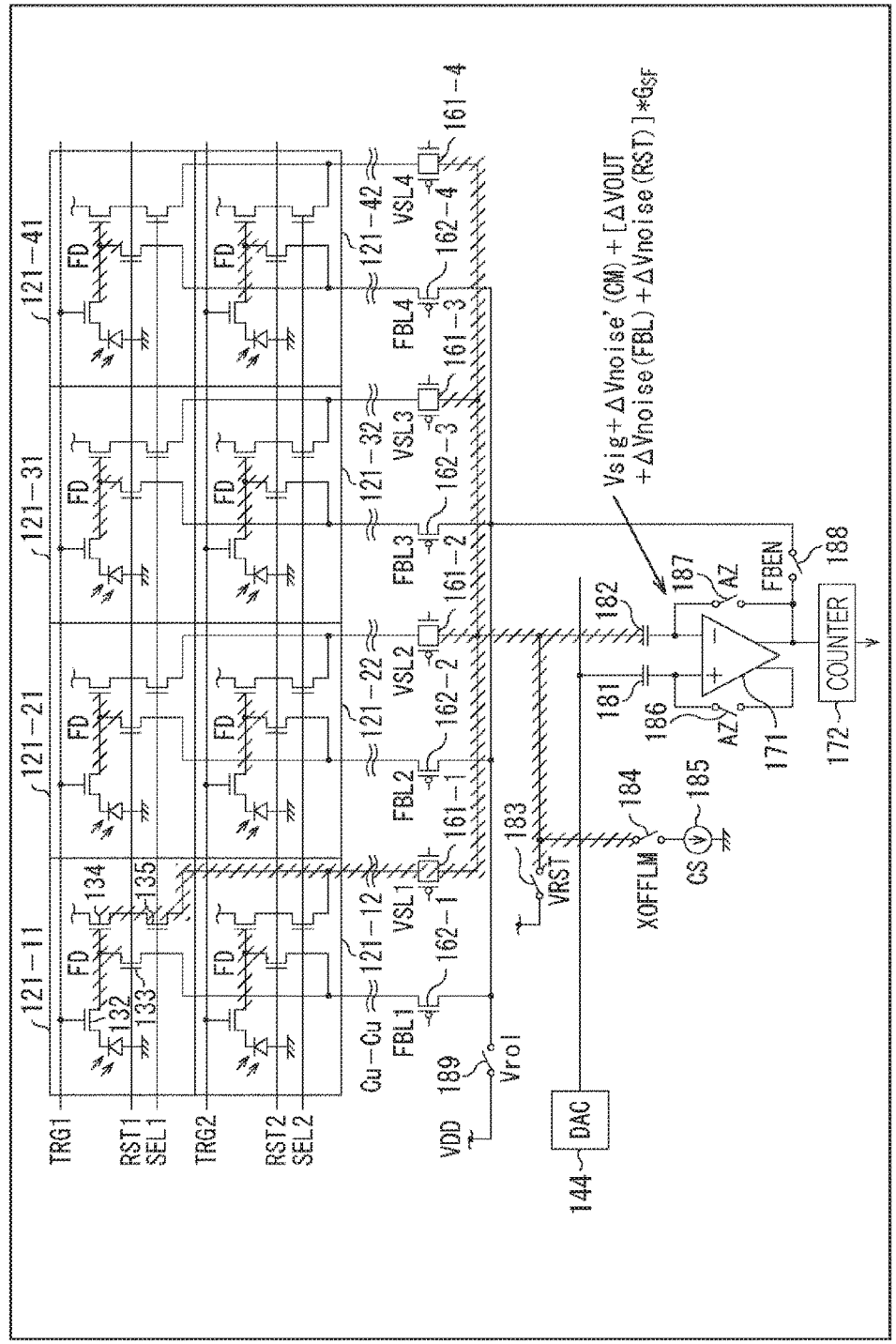
FIG. 38 is a view illustrating an example of a state at time T73.

Also, for example, the current unit pixel column is selected at time T73 (step S174). At that time, the VRST connection control signal (φVRST) is turned off and the VSL connection control signal (φVSL1) corresponding to the current unit pixel 121-11 is turned on. That is to say, as illustrated in FIG. 38, the pixel signal corresponding to the charge maintained in the floating diffusion (FD) of the unit pixel 121-11 is transmitted to the VSL side input terminal of the comparing unit 171. Therefore, the voltage at the VSL side input terminal of the comparing unit 171 becomes [Vsig+ΔVnoise'(CM)+[ΔVOUT+ΔVnoise(FBL)+ΔVnoise (RST)]*$G_{SF}$].

Figure 39:
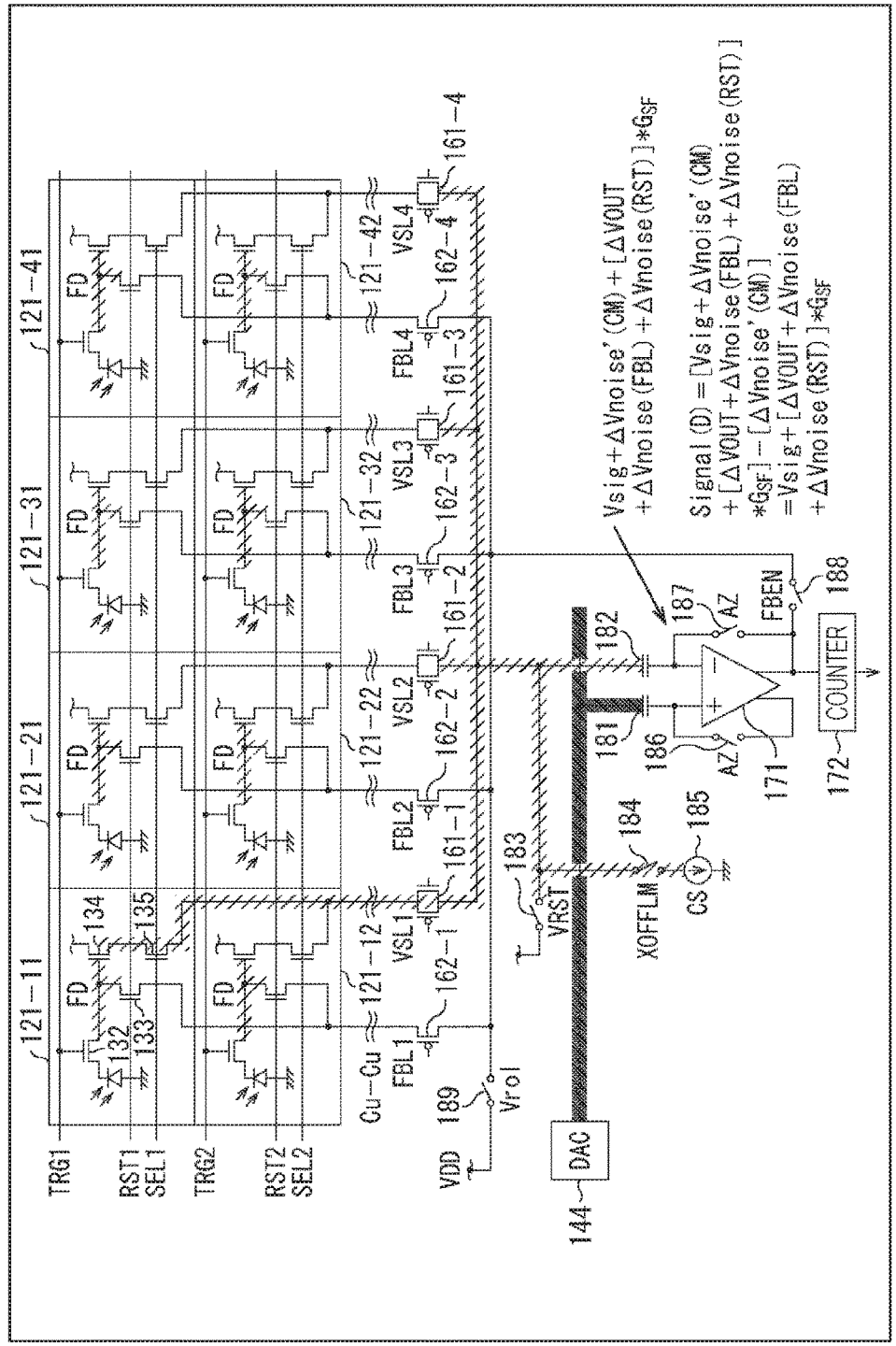
FIG. 39 is a view illustrating an example of a state at time T74.

At time T74, the reset level is read from the current unit pixel (step S175). That is to say, as illustrated in FIG. 39, the ramp wave (reference voltage) supplied from the D/A converter (DAC) 144 is input to the (FD) DAC side input terminal of the comparing unit 171 and the signal level of the pixel signal of the unit pixel 121-11 is compared with the reference potential (ramp wave).

The voltage at the VSL side input terminal of the comparing unit 171 at that time becomes [Vsig+ΔVnoise'(CM)+ [ΔVOUT+ΔVnoise(FBL)+ΔVnoise(RST)]*$G_{SF}$]. Therefore, a signal level (Signal (D)) of the pixel signal read from the unit pixel 121-11 is represented by following equation (4).

$$\text{Signal}(D)=[V\text{sig}+\Delta V\text{noise}(CM)+[\Delta V\text{OUT}+\Delta V\text{noise} \\ (FBL)+\Delta V\text{noise}(RST)]^{*}G_{SF}]-[\Delta V\text{noise}'(CM)] \\ =V\text{sig}+[\Delta V\text{OUT}+\Delta V\text{noise}(FBL)+\Delta V\text{noise}(RST)] \\ ^{*}G_{SF} \quad (4)$$

From time T75 to time T78, the similar process is repeated for the unit pixel 121-21.

Figure 40:
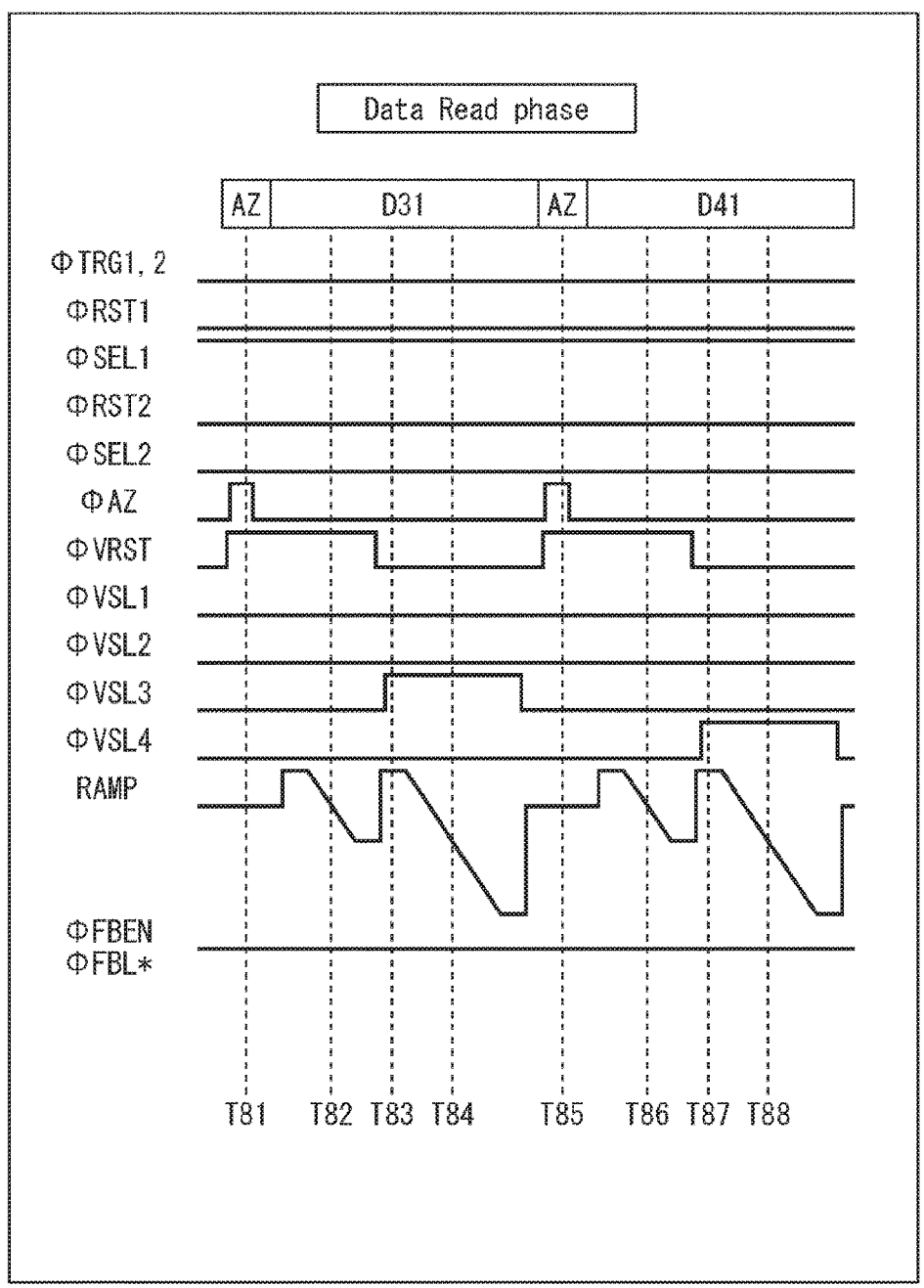
FIG. 40 is a timing chart illustrating an example of the state of the data read phase.

FIG. 40 is a timing chart illustrating an example of the flow of the data read phase process for the unit pixels 121-31 and 121-41 of the pixel unit 120. As illustrated in FIG. 40, the process similar to that for the unit pixel 121-11 is repeated for each of the unit pixels 121-31 and 121-41.

Figure 41:
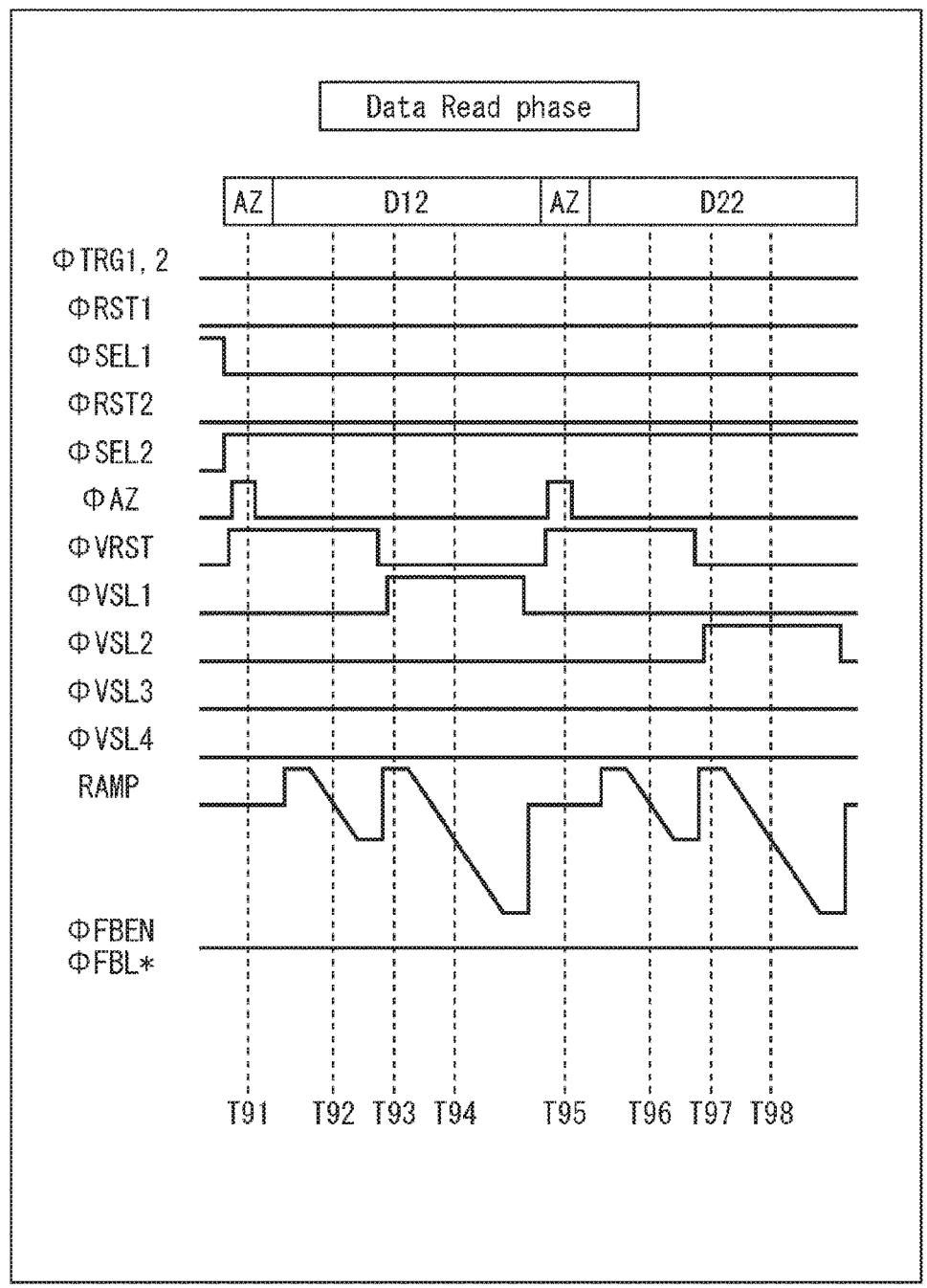
FIG. 41 is a timing chart illustrating an example of the state of the data read phase.

FIG. 41 is a timing chart illustrating an example of the flow of the data read phase process for the unit pixels 121-12 and 121-22 of the pixel unit 120. As illustrated in FIG. 41, the process similar to that for the unit pixel 121-11 is repeated for each of the unit pixels 121-12 and 121-22. However, in this case, the select control signal (ϕSEL2) is turned on (step S171).

Figure 42:
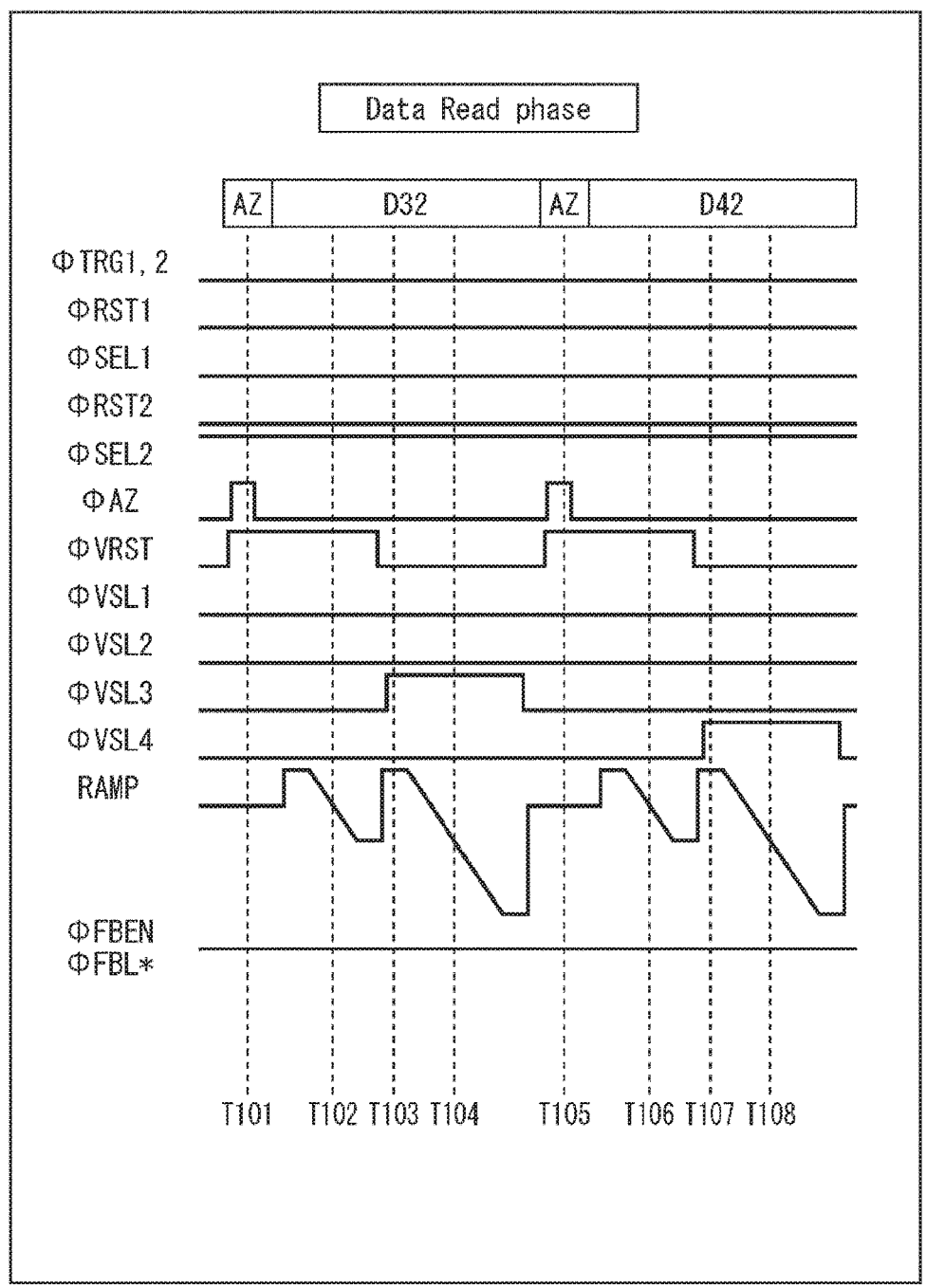
FIG. 42 is a timing chart illustrating an example of the state of the data read phase.

FIG. 42 is a timing chart illustrating an example of the flow of the data read phase process for the unit pixels 121-32 and 121-42 of the pixel unit 120. As illustrated in FIG. 42, the process similar to that for the unit pixel 121-12 is repeated for each of the unit pixels 121-32 and 121-42.

By performing each process as described above, the image sensor 100 may inhibit the deterioration in image quality of the captured image.

2. Second Embodiment

<Imaging Device>

Figure 43:
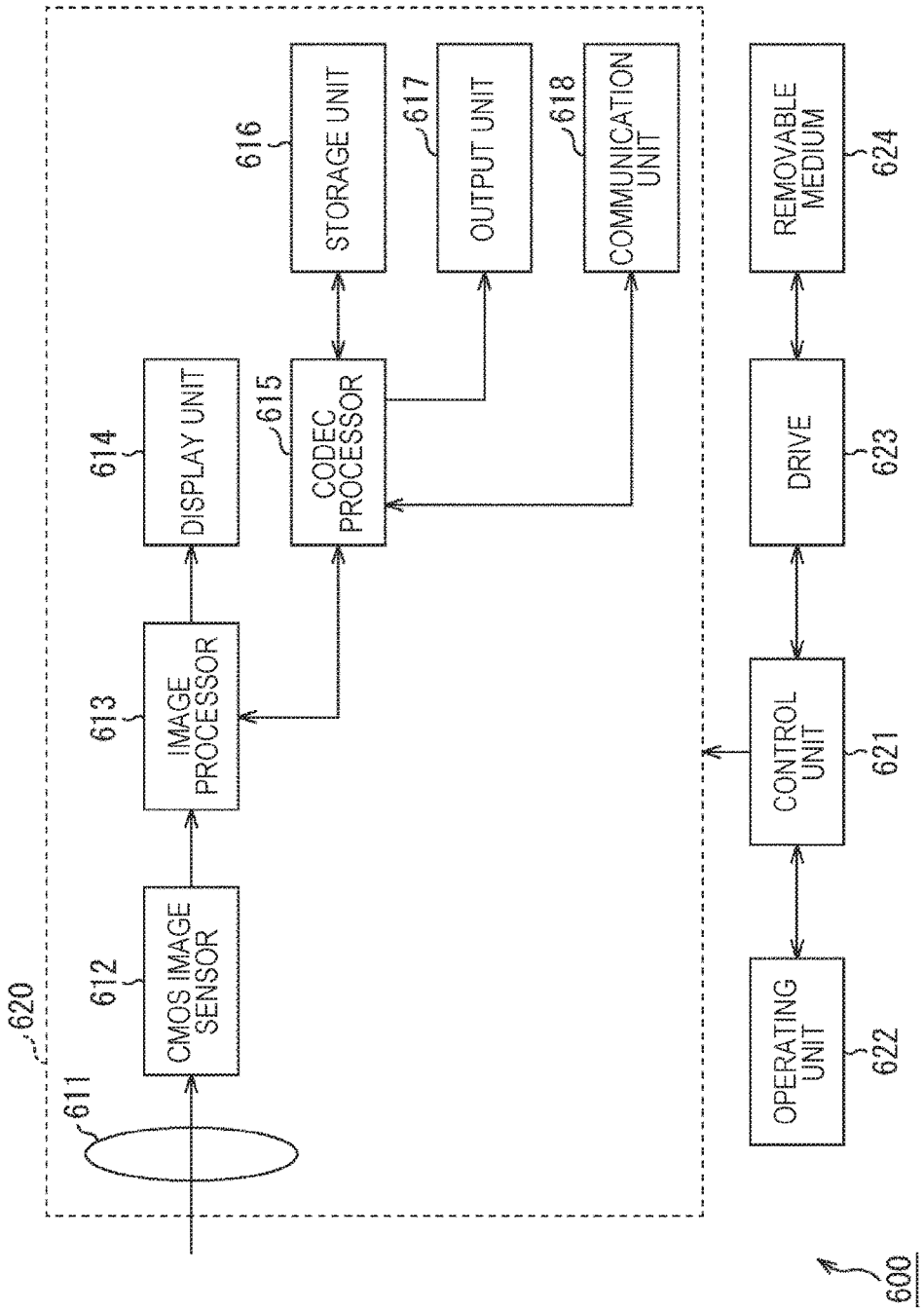
FIG. 43 is a view illustrating a principal configuration example of an imaging device.

Meanwhile, the present technology is applicable to a device other than an image sensing device. For example, the present technology may also be applied to a device having the image sensing device (electronic device and the like) such as an imaging device. FIG. 43 is a block diagram illustrating a principal configuration example of the imaging device as an example of the electronic device to which the present technology is applied. An imaging device 600 illustrated in FIG. 43 is a device which captures an image of a subject and outputs the image of the subject as an electric signal.

As illustrated in FIG. 43, the imaging device 600 includes an optical unit 611, a CMOS image sensor 612, an image processor 613, a display unit 614, a codec processor 615, a storage unit 616, an output unit 617, a communication unit 618, a control unit 621, an operating unit 622, and a drive 623.

The optical unit 611 is formed of a lens which adjusts a focal point to the subject and condenses light from a focal position, a diaphragm which adjusts exposure, a shutter which controls imaging timing and the like. The optical unit 611 transmits the light from the subject (incident light) to supply to the CMOS image sensor 612.

The CMOS image sensor 612 performs photoelectric conversion of the incident light and performs A/D conversion of the signal for each pixel (pixel signal), performs signal processing such as CDS, and supplies captured image data after the processing to the image processor 613.

The image processor 613 performs image processing of the captured image data obtained by the CMOS image sensor 612. More specifically, the image processor 613 performs various pieces of image processing such as color mixture correction, black level correction, white balance correction, demosaic processing, matrix processing, gamma correction, and YC conversion, for example, of the captured image data supplied from the CMOS image sensor 612. The image processor 613 supplies the captured image data to which the image processing is applied to the display unit 614.

The display unit 614 formed as a liquid crystal display and the like, for example, displays an image of the captured image data (for example, the image of the subject) supplied from the image processor 613.

The image processor 613 further supplies the captured image data to which the image processing is applied to the codec processor 615 as needed.

The codec processor 615 applies a coding process of a predetermined system to the captured image data supplied from the image processor 613 and supplies obtained coded data to the storage unit 616. Also, the codec processor 615 reads the coded data recorded in the storage unit 616, decodes the same to generate decoded image data, and supplies the decoded image data to the image processor 613.

The image processor 613 applies predetermined image processing to the decoded image data supplied from the codec processor 615. The image processor 613 supplies the decoded image data to which the image processing is applied to the display unit 614. The display unit 614 formed as the liquid crystal display and the like, for example, displays an image of the decoded image data supplied from the image processor 613.

Also, the codec processor 615 may supply the coded data obtained by coding the captured image data supplied from the image processor 613 or the coded data of the captured image data read from the storage unit 616 to the output unit 617 and output the same out of the imaging device 600. Also, the codec processor 615 may supply the captured image data before the coding or the decoded image data obtained by decoding the coded data read from the storage unit 616 to the output unit 617 and output the same out of the imaging device 600.

Furthermore, the codec processor 615 may also transmit the captured image data, the coded data of the captured image data or the decoded image data to another device through the communication unit 618. The codec processor 615 may also obtain the captured image data and the coded data of the image data through the communication unit 618. The codec processor 615 appropriately codes or decodes the captured image data and the coded data of the image data obtained though the communication unit 618. The codec processor 615 may supply the obtained image data or coded data to the image processor 613 or output to the storage unit 616, the output unit 617, and the communication unit 618 as described above.

The storage unit 616 stores the coded data and the like supplied from the codec processor 6115. The coded data stored in the storage unit 616 is read by the codec processor 615 to be decoded as needed. The captured image data obtained by a decoding process is supplied to the display unit 614 and a captured image corresponding to the captured image data is displayed.

The output unit 617 including an external output interface such as an external output terminal outputs various data supplied through the codec processor 615 out of the imaging device 600 through the external output interface.

The communication unit 618 supplies various pieces of information such as the image data and the coded data supplied from the codec processor 615 to another device being a communication partner of predetermined communication (wired or wireless communication). The communication unit 618 also obtains the various pieces of information such as the image data and the coded data from another device being the communication partner of predetermined communication (wired or wireless communication) and supplies the same to the codec processor 615.

The control unit 621 controls operation of each processor (each processor enclosed by a dotted line 620, the operating unit 622, and the drive 623) of the imaging device 600.

The operating unit 622 formed of an arbitrary input device such as a jog Dial™, a key, a button, or a touch panel, for example, receives an operation input by a user and the like, for example, and supplies a signal corresponding to the operation input to the control unit 621.

The drive 623 reads information stored in a removable medium 624 such as a magnetic disc, an optical disc, a magnetooptical disc, and a semiconductor memory, for example, mounted thereon. The drive 623 reads various pieces of information such as a program and data from the removable medium 624 and supplies them to the control unit 621. Also, when a writable removable medium 624 is mounted on the drive 623, this stores various pieces of information such as the image data and the coded data, for example, supplied through the control unit 621 to the removable medium 624.

As the CMOS image sensor 612 of the imaging device 600 described above, the present technology described above in each embodiment is applied. That is to say, the above-described image sensor 100 is used as the CMOS image sensor 612. According to this, the CMOS image sensor 612 may inhibit deterioration in image quality of the captured image. Therefore, the imaging device 600 may obtain a higher-quality captured image by capturing an image of the subject.

The above-described series of processes may be executed by hardware or by software. When the above-described series of processes is executed by the software, a program which forms the software is installed from a network or a recording medium.

The recording medium is formed of the removable medium 624 in which the program is recorded distributed for delivering the program to the user separately from a device main body as illustrated in FIG. 43, for example. The removable medium 624 includes the magnetic disc (including a flexible disk) and the optical disc (including a CD-ROM and a DVD). The magnetooptical disc (including a Mini Disc (MD)) and the semiconductor memory are further included.

In this case, the program may be installed on the storage unit 616 by mounting of the removable medium 624 on the drive 623.

The program may also be provided through a wired or wireless transmission medium such as a local area network, the Internet, digital satellite broadcasting and the like. In this case, the program may be received by the communication unit 618 to be installed on the storage unit 616.

The program may also be installed in advance on the storage unit 616 and a read only memory (ROM) in the control unit 621.

Meanwhile, the program executed by the computer may be the program of which processes are performed in chronological order in the order described in this specification or may be the program of which processes are performed in parallel or at necessary timing such as when a call is issued.

Also, in this specification, a step of describing the program recorded in the recording medium includes not only the processes performed in chronological order in the described order but also the processes executed in parallel or individually which are not necessarily performed in chronological order.

Also, the process at each step described above may be executed in each device described above or any device other than the above-described device. In this case, the device which executes the process may include a function (function block and the like) required for executing the process. Also, the information required for the process may be appropriately transmitted to the device.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

It is also possible to divide the configuration described above as one device (or processor) into a plurality of devices (or processors). Other way round, it is also possible to put the configurations described above as a plurality of devices (or processors) together as one device (or processor). Also, it is of course possible that a configuration other than the above-described one is added to the configuration of each device (or each processor). Furthermore, it is also possible to include a part of the configuration of a certain device (or processor) in the configuration of another device (or another processor) as long as a configuration and operation as an entire system are substantially the same.

Although preferred embodiments of the present disclosure are described in detail with reference to the attached drawings, the technical scope of the present disclosure is not limited to such examples. It is clear that one of ordinary skill in the art of the present disclosure may conceive of various modifications or corrections within the scope of the technical idea recited in claims and it is understood that they also naturally belong to the technical scope of the present disclosure.

For example, the present technology may be configured as cloud computing in which one function is shared by a plurality of devices to process in combination through the network.

Also, each step described in the above-described flowchart may be executed by one device or by a plurality of devices in a shared manner.

Furthermore, when a plurality of processes is included in one step, a plurality of processes included in one step may be executed by one device or by a plurality of devices in a shared manner.

The present technology is not limited thereto and may also be performed as any configuration mounted on the device forming such device or system, for example, a processor as a system large scale integration (LSI) and the like, a module using a plurality of processors and the like, a unit using a plurality of modules and the like, and a set obtained by adding still another function to the unit (that is to say, a part of configuration of the device).

Meanwhile, the present technology may also have a following configuration.

(1) A signal processing device including:
a connection control unit which controls connection between an output of a comparing unit which compares a signal read from a unit pixel with reference voltage and a floating diffusion of the unit pixel; and
a connection unit which connects or disconnects the output of the comparing unit to or from the floating diffusion of the unit pixel according to control of the connection control unit.

(2) The signal processing device according to (1), wherein the connection unit includes a MOSFET which drives as a switch to connect or disconnect the output of the comparing unit to or from the floating diffusion of the unit pixel on the basis of a control signal supplied from the connection control unit.

(3) The signal processing device according to (1) or (2), wherein
the connection unit connects or disconnects the output of the comparing unit to or from a reset transistor connected to the floating diffusion of the unit pixel according to the control of the connection control unit.

(4) The signal processing device according to any one of (1) to (3), wherein
the connection unit is provided for each column of unit pixels for a pixel array in which a plurality of unit pixels is arranged in a matrix.
(5) The signal processing device according to any one of (1) to (4), wherein
a plurality of unit pixel units formed of some unit pixels of the pixel array is formed in the pixel array, and
the connection unit is provided for each column of the unit pixels for each unit pixel unit.
(6) The signal processing device according to any one of (1) to (5), wherein
the connection control unit controls the connection unit to connect the output of the comparing unit to the floating diffusion of the unit pixel, thereby feeding back the output of the comparing unit to the floating diffusion as a reset level, and thereafter controls the connection unit to disconnect the output of the comparing unit from the floating diffusion of the unit pixel, thereby allowing the floating diffusion to maintain the reset level.
(7) The signal processing device according to any one of (1) to (6), further including:
a reset control unit which controls operation of the reset transistor for each row of the unit pixels, wherein
the reset control unit connects the reset transistor of a current row of the unit pixels of the pixel array,
the connection control unit thereafter controls the connection unit to sequentially connect the output of the comparing unit to the floating diffusion of each column of the unit pixels, thereby sequentially feeding back the output of the comparing unit to the floating diffusion of each column of the unit pixels as the reset level, and thereafter controls the connection unit to disconnect the output of the comparing unit from the floating diffusion of the unit pixel, thereby allowing the floating diffusion to maintain the reset level, and
the reset control unit thereafter further disconnects the reset transistor of the current row of the unit pixels of the pixel array.
(8) The signal processing device according to any one of (1) to (7), further including:
a signal line connection control unit which controls connection between a signal line which transmits the signal read from the unit pixel and an input of the comparing unit; and
a signal line connection unit which connects or disconnects the signal line to or from the input of the comparing unit according to control of the signal line connection control unit.
(9) The signal processing device according to any one of (1) to (8), wherein
the signal line connection unit is provided for each column of the unit pixels for the pixel array in which a plurality of unit pixels is arranged in a matrix.
(10) The signal processing device according to any one of (1) to (9), wherein
when the connection control unit feeds back the output of the comparing unit to the floating diffusion as the reset level, the signal line connection control unit controls the signal line connection unit of the column of the unit pixels to connect the signal line of the column of the unit pixels to the input of the comparing unit.
(11) The signal processing device according to any one of (1) to (10), further including:
the comparing unit; and
a counter which counts until a comparison result of the comparing unit changes.
(12) The signal processing device according to any one of (1) to (11), wherein
the comparing unit and the counter are provided for each of a plurality of unit pixel units formed of some unit pixels of the pixel array formed in the pixel array in which a plurality of unit pixels is arranged in a matrix.
(13) The signal processing device according to any one of (1) to (12), further including:
a unit pixel group formed of a plurality of unit pixels.
(14) The signal processing device according to any one of (1) to (13), wherein
the unit pixel group forms the pixel array in which a plurality of unit pixels is arranged in a matrix, and
the connection unit is provided for each column of the unit pixels for the pixel array.
(15) The signal processing device according to any one of (1) to (14), wherein
a plurality of unit pixel units formed of some unit pixels of the pixel array is formed in the pixel array, and
the connection unit is provided for each column of the unit pixels for each unit pixel unit.
(16) A controlling method including:
connecting an output of a comparing unit which compares a signal read from a unit pixel with reference voltage to a floating diffusion of the unit pixel, thereby feeding back the output of the comparing unit to the floating diffusion as a reset level, and
disconnecting the output of the comparing unit from the floating diffusion of the unit pixel, thereby allowing the floating diffusion to maintain the reset level.
(17) An image sensing device including:
a pixel array in which a plurality of unit pixels is arranged in a matrix;
a connection control unit which controls connection between an output of a comparing unit which compares a signal read from the unit pixel with reference voltage and a floating diffusion of the unit pixel; and
a connection unit provided for each column of the unit pixels for the pixel array which connects or disconnects the output of the comparing unit to or from the floating diffusion of the unit pixel according to control of the connection control unit.
(18) The image sensing device according to (17), further including:
the comparing unit; and
a counter which counts until a comparison result of the comparing unit changes, wherein
a plurality of unit pixel units formed of some unit pixels of the pixel array is formed in the pixel array,
the comparing unit and the counter are provided for each unit pixel unit, and
the connection unit is provided for each column of the unit pixels for each unit pixel unit.
(19) The image sensing device according to (17) or (18), including a plurality of semiconductor substrates, wherein
the connection control unit, the connection unit, the comparing unit, and the counter are formed on a semiconductor substrate different from the semiconductor substrate on which the pixel array is formed.
(20) An electronic device including:
an imaging unit which captures an image of a subject; and
an image processor which performs image processing of image data obtained by imaging by the imaging unit,
the imaging unit including:
a pixel array in which a plurality of unit pixels is arranged in a matrix;

a connection control unit which controls connection between an output of a comparing unit which compares a signal read from the unit pixel with reference voltage and a floating diffusion of the unit pixel; and a connection unit provided for each column of the unit pixels for the pixel array which connects or disconnects the output of the comparing unit to or from the floating diffusion of the unit pixel according to control of the connection control unit.

REFERENCE SIGNS LIST

100 Image sensor
101 Pixel array
102 VSL connection unit
103 A/D converter
104 Horizontal transfer unit
105 FBL connection unit
110 Control unit
111 Area scanning unit
112 VSL connection control unit
113 A/D converter
114 Horizontal scanning unit
115 FBL connection control unit
120 Pixel unit
121 Unit pixel
141 Area FBL connection unit
142 Area VSL connection unit
143 Area A/D converter
144 D/A converter
151 Pixel substrate
152 Circuit substrate
161 VSL switch
162 FBL switch
171 Comparing unit
172 Counter
181 and 182 Capacitor
183 VRST switch
184 XOFFLM switch
185 Current source
186 and 187 AZ switch
188 FBEN switch
189 VROL switch
600 Imaging device
612 CMOS image sensor

What is claimed is:

1. A signal processing device comprising:
a connection control unit which controls connection between an output of a comparing unit which compares a signal read from a unit pixel with reference voltage and a floating diffusion of the unit pixel; and
a connection unit which connects or disconnects the output of the comparing unit to or from the floating diffusion of the unit pixel according to control of the connection control unit, wherein the connection unit connects or disconnects the output of the comparing unit to or from a reset transistor connected to the floating diffusion of the unit pixel according to the control of the connection control unit.

2. The signal processing device according to claim 1, wherein
the connection unit includes a MOSFET which drives as a switch to connect or disconnect the output of the comparing unit to or from the floating diffusion of the unit pixel on a basis of a control signal supplied from the connection control unit.

3. The signal processing device according to claim 1, wherein
the connection unit is provided for each column of unit pixels for a pixel array in which a plurality of unit pixels is arranged in a matrix.

4. The signal processing device according to claim 3, wherein
a plurality of unit pixel units formed of some unit pixels of the pixel array is formed in the pixel array, and
the connection unit is provided for each column of the unit pixels for each unit pixel unit.

5. The signal processing device according to claim 4, wherein
the connection control unit controls the connection unit to connect the output of the comparing unit to the floating diffusion of the unit pixel, thereby feeding back the output of the comparing unit to the floating diffusion as a reset level, and thereafter controls the connection unit to disconnect the output of the comparing unit from the floating diffusion of the unit pixel, thereby allowing the floating diffusion to maintain the reset level.

6. The signal processing device according to claim 5, further comprising:
a reset control unit which controls operation of the reset transistor for each row of the unit pixels, wherein
the reset control unit connects the reset transistor of a current row of the unit pixels of the pixel array,
the connection control unit thereafter controls the connection unit to sequentially connect the output of the comparing unit to the floating diffusion of each column of the unit pixels, thereby sequentially feeding back the output of the comparing unit to a floating diffusion of each column of the unit pixels as the reset level, and thereafter controls the connection unit to disconnect the output of the comparing unit from the floating diffusion of the unit pixel, thereby allowing the floating diffusion of the unit pixel to maintain the reset level, and
the reset control unit thereafter further disconnects the reset transistor of the current row of the unit pixels of the pixel array.

7. The signal processing device according to claim 1, further comprising:
a signal line connection control unit which controls connection between a signal line which transmits the signal read from the unit pixel and an input of the comparing unit; and
a signal line connection unit which connects or disconnects the signal line to or from the input of the comparing unit according to control of the signal line connection control unit.

8. The signal processing device according to claim 7, wherein
the signal line connection unit is provided for each column of unit pixels for a pixel array in which a plurality of unit pixels is arranged in a matrix.

9. The signal processing device according to claim 8, wherein
when the connection control unit feeds back the output of the comparing unit to the floating diffusion as a reset level, the signal line connection control unit controls the signal line connection unit of the column of the unit pixels to connect the signal line of the column of the unit pixels to the input of the comparing unit.

10. The signal processing device according to claim 1, further comprising:
the comparing unit; and a counter which counts until a comparison result of the comparing unit changes.

11. The signal processing device according to claim 10, wherein
the comparing unit and the counter are provided for each of a plurality of unit pixel units formed of some unit pixels of a pixel array formed in the pixel array in which a plurality of unit pixels is arranged in a matrix.

12. The signal processing device according to claim 1, further comprising:
a unit pixel group formed of a plurality of unit pixels.

13. The signal processing device according to claim 12, wherein
the unit pixel group forms a pixel array in which the plurality of unit pixels is arranged in a matrix, and
the connection unit is provided for each column of the unit pixels for the pixel array.

14. The signal processing device according to claim 13, wherein
a plurality of unit pixel units formed of some unit pixels of the pixel array is formed in the pixel array, and
the connection unit is provided for each column of the unit pixels for each unit pixel unit.

15. A controlling method comprising:
connecting an output of a comparing unit which compares a signal read from a unit pixel with reference voltage to a floating diffusion of the unit pixel, thereby feeding back the output of the comparing unit to the floating diffusion as a reset level, and
disconnecting the output of the comparing unit from the floating diffusion of the unit pixel, thereby allowing the floating diffusion to maintain the reset level, wherein a connection unit connects or disconnects the output of the comparing unit to or from a reset transistor connected to the floating diffusion of the unit pixel according to control of a connection control unit.

16. An image sensing device comprising:
a pixel array in which a plurality of unit pixels is arranged in a matrix;
a connection control unit which controls connection between an output of a comparing unit which compares a signal read from the unit pixel with reference voltage and a floating diffusion of the unit pixel; and
a connection unit provided for each column of the unit pixels for the pixel array which connects or disconnects the output of the comparing unit to or from the floating diffusion of the unit pixel according to control of the connection control unit, wherein the connection unit connects or disconnects the output of the comparing unit to or from a reset transistor connected to the floating diffusion of the unit pixel according to the control of the connection control unit.

17. The image sensing device according to claim 16, further comprising:
the comparing unit; and
a counter which counts until a comparison result of the comparing unit changes, wherein
a plurality of unit pixel units formed of some unit pixels of the pixel array is formed in the pixel array,
the comparing unit and the counter are provided for each unit pixel unit, and
the connection unit is provided for each column of the unit pixels for each unit pixel unit.

18. The image sensing device according to claim 17, including a plurality of semiconductor substrates, wherein
the connection control unit, the connection unit, the comparing unit, and the counter are formed on a semiconductor substrate different from a semiconductor substrate on which the pixel array is formed.

19. An electronic device comprising:
an imaging unit which captures an image of a subject; and
an image processor which performs image processing of image data obtained by imaging by the imaging unit, the imaging unit including:
a pixel array in which a plurality of unit pixels is arranged in a matrix;
a connection control unit which controls connection between an output of a comparing unit which compares a signal read from the unit pixel with reference voltage and a floating diffusion of the unit pixel; and
a connection unit provided for each column of the unit pixels for the pixel array which connects or disconnects the output of the comparing unit to or from the floating diffusion of the unit pixel according to control of the connection control unit, wherein the connection unit connects or disconnects the output of the comparing unit to or from a reset transistor connected to the floating diffusion of the unit pixel according to the control of the connection control unit.

* * * * *